US006415276B1

(12) United States Patent
Heger et al.

(10) Patent No.: US 6,415,276 B1
(45) Date of Patent: Jul. 2, 2002

(54) BAYESIAN BELIEF NETWORKS FOR INDUSTRIAL PROCESSES

(75) Inventors: Arlen S. Heger, Tijeras; Hrishikesh B. Aradhye, Albuquerque, both of NM (US)

(73) Assignee: University of New Mexico, Albuquerque, NM (US)

(*) Notice: Subject to any disclaimer, the term of this patent is extended or adjusted under 35 U.S.C. 154(b) by 0 days.

(21) Appl. No.: 09/374,438

(22) Filed: Aug. 13, 1999

Related U.S. Application Data

(60) Provisional application No. 60/096,654, filed on Aug. 14, 1998.

(51) Int. Cl.⁷ .................................................. G06N 7/00
(52) U.S. Cl. ............................ 706/52; 706/24; 702/84; 702/183
(58) Field of Search ....................... 706/24, 52; 702/84, 702/183

(56) References Cited

U.S. PATENT DOCUMENTS

| | | | |
|---|---|---|---|
| 5,130,936 A | | 7/1992 | Sheppard et al. |
| 5,133,046 A | * | 7/1992 | Kaplan ......................... 706/52 |
| 5,148,378 A | | 9/1992 | Shibayama et al. |
| 5,237,518 A | | 8/1993 | Sztipanovits et al. |
| 5,267,277 A | | 11/1993 | Scarola et al. |
| 5,465,321 A | * | 11/1995 | Smyth ......................... 706/20 |
| 5,548,378 A | | 8/1996 | Ogata et al. |
| 5,629,872 A | | 5/1997 | Gross et al. |
| 5,642,296 A | * | 6/1997 | Saxena ......................... 702/84 |
| 5,661,666 A | | 8/1997 | Pawlak |
| 5,680,409 A | | 10/1997 | Qin et al. |
| 5,715,178 A | | 2/1998 | Scarola |
| 5,726,915 A | | 3/1998 | Prager et al. |
| 6,219,626 B1 | * | 4/2001 | Steinmetz et al. .......... 702/183 |

OTHER PUBLICATIONS

Aradhye, H.B., "Sensor Fault Detection, Isolation, and Accommodation Using Neural Networks, Fuzzy Logic, and Bayesian Belief Networks," University of New Mexico, Master of Schience in Chemical Engineering Thesis (Aug. 1997) best copy available.

Karjala, Thomas W., et al., "Dynamic Data Rectification using the Extended Kalman Filter and Recurrent Neural Networks," *Proceedings of the IEE–ICNN,* p–3244–3249 (1994).

Lauritzen, S.L., et al., "Local Computations with Probabilities on Graphical Structures and Their Application to Expert Systems," *J.R. Satistist. Soc. B,* vol. 50, No. 2, pp 157–224 (1998).

Lauritzen, S.L., "Propagation of Probabilities, Means, and Variances in Mixed Graphical Association Models," *J. American Statist. Assn* (*Theory and Methods*), vol. 87, No. 420, pp 1098–1108 (1992).

Spiegelhalter, D.J., et al., "Bayesian Analysis in Expert Systems," *Statistical Science,* vol. 8, No. 3, pp 219–247 (1993).

Spiegelhalter, D.J., et al., "Sequential Updating of Conditional Probabilities on Directed Graphical Structures," *Networks,* vol. 20, No. 5, pp 579–605 (1990).

Pearl, J., *Probabilistic Reasoning in Intelligent Systems,* BOOK, Morgan–Kaufmann, San Mateo, California (1988) no pages provided.

(List continued on next page.)

Primary Examiner—Kakali Chaki
Assistant Examiner—William L. Starks, Jr.
(74) Attorney, Agent, or Firm—Jeffrey D. Myers

(57) ABSTRACT

A method and an apparatus for diagnosis of sensors and/or processes through use of Bayesian belief networks. More specifically, the method and apparatus of the present invention achieve sensor and/or process fault detection, isolation, and accommodation.

18 Claims, 25 Drawing Sheets

OTHER PUBLICATIONS

Spiegelhalter, D.J., "A unified Approach to Imprecision and Sensitivity of Beliefs in Expert Systems," BOOK, *Uncertainty in Artificial Intelligence,* vol. 3, Kanal, L.H., T.S. Levitt and J.F. Lemmer, editors, Elsevier Science Publishers B.V. (North–Holland) 1989, pages not provided.

Smets, P., "The Nature of the Unnormalized Beliefs Encountered in the Transferable Belief Model," Proceedings of the Eighth Conference on Artificial Intelligence, pp 292–297 *1992).

Karjala, T.W., et al., "Data Rectification Using Recurrent (Elman) Neural Networks," Proceedings of the IEEE–IJCNN, pp 901–906 (1992.

Hugin API version 3.0 Reference Manual, Version 2.0 (1995).

* cited by examiner

BAYESIAN BELIEF NETWORKS FOR INDUSTRIAL PROCESSES

CROSS-REFERENCE TO RELATED APPLICATIONS

This application claims the benefit of the filing of U.S. Provisional Patent Application Ser. No. 60/096,654, entitled Bayesian Belief Networks for Sensor Fault Detection, Isolation and Accomodation, filed on Aug. 14, 1998, and the specification thereof is incorporated herein by reference.

GOVERNMENT RIGHTS

The U.S. Government has a paid-up license in this invention and the right in limited circumstances to require the patent owner to license others on reasonable terms as provided for by the terms of Contract No.NCCW-0087 awarded by the National Aeronautics and Space Administration.

BACKGROUND OF THE INVENTION

1. Field of the Invention (Technical Field)

The present invention relates to sensor and process analysis and diagnosis, especially through use of Bayesian Belief Networks (BBNs).

2. Background Art

The following patents discuss control systems:

U.S. Pat. No. 5,726,915, entitled "Automated System for Testing an Imaging Sensor," to Prager, et al., issued Mar. 10, 1998. This patent discloses univariate techniques fortesting imaging sensors. This patent assumes a known signal. The method also uses a frequency-domain analysis step that forces collection of large amounts of data and shifting to a frequency domain. The method is a test suitable to determine if a sensor is suspect, which is likely to involve taking the sensor off-line and then carrying out this procedure.

U.S. Pat. No. 5,629,872, entitled, "System for Monitoring an Industrial Process and Determining Sensor Status, to Gross, et al., issued May 13, 1997 with a terminal disclaimer to U.S. Pat. No. 5,223,207. This patent discloses univariate techniques for system monitoring. The disclosed method also uses a frequency-domain analysis step that forces collection of large amounts of data and shifting to frequency domain. The method is a test suitable to determine if a sensor is suspect, which is likely to involve taking the sensor off-line and then carring out this procedure.

U.S. Pat. No. 5,661,666, entitled "Constant False Probability Data Fusion System," to Pawlak, issued Aug. 26, 1997. The thrust of this patent's disclosed method is to compare input sensor data against the values in a lookup table. The threshold lookup table provides two thresholds. A "data fusion" processor uses the sensor "decisions" to generate a log-likelihood ratio, which is used as a test existence metric. The values of the threshold lookup table appear as weighted sums, which are normalized to represent in the probability domain. The invention provides sensor fault reconciliation only, which is based on a weighted sum and table lookup method. The method does not detect and isolate specific sensor faults.

U.S. Pat. No. 5,223,207, entitled "Expert System for Online Surveillance of Nuclear Reactor Coolant Pumps," to Gross, et al., issued Jun. 29, 1993. This patent disclosed expert system technology for online surveillance of nuclear reactor coolant pumps through use of an artificial intelligence inference engine (an expert system) for early detection of pump or sensor degradation. The degradation is based on a sequential probability ratio test (SPRT). The invention provides sensor fault detection only and serves only as an early alert system to allow an "orderly shutdown of the pump" to avert serious damage to it. The method does not isolate the specific sensor fault. Further, it does not reconcile sensor data.

U.S. Pat. No. 5,548,378, entitled "Image Operating Apparatus Providing Image Stabilization Control," to Ogata, et al., issued Aug. 20, 1996. This patent discloses a simple principle of comparing sensor-input data with certain standard values stored in the sensor controller. With this simple comparative method, a fault is detected as a disagreement between the sensor data and the stored standard values. The method is developed for a specific application, namely, use of photoelectric sensor for conveyor belt control (i.e., spacing of bottles on a conveyor belt).

U.S. Pat. No. 5,267,277, entitled "Indicator System for Advanced Nuclear Plant Control Complex," to Scarola, et al., issued Nov. 30, 1993. This patent discloses a collection of tools to centralized signal display in a central location for a nuclear power plant, having concise information processing and display, reliable architecture and hardware, and easily maintainable components, while eliminating operator information overload. This method provides for a rapid response to changes in plant parameters and component control system. The "complex" includes six major systems: (1) the control center panels, (2) the data processing system, (3) the discrete indication and alarm system, (4) the component control system consisting of the engineered safeguard function component controls, (5) the plant protection system, and (6) the power control system. The six systems collect data from the plant, "efficiently" present the required information to the operator, perform all automatic functions and provide for direct manual control of the plant components.

U.S. Pat. No. 5,680,409, entitled "Method and Apparatus for Detecting and Identifying Faulty Sensors in a Process," to Qin, et al., issued Oct. 21, 1997. This patent discloses a principal component analysis methods to detect a faulty sensor from the signals provided to it through a set of sensors. It also develops a validity index, which is a ratio of two residuals, to isolate the faulty sensor. A residual is calculated from the difference between the sensor output and the average of all sensor output signals. The principal component analysis is a transformation technique that converts a set of correlated sensor measurements into a set of uncorrelated variables. The effect of this transformation is to rotate the coordinate system in a way that results in the alignment of information represented by the sensor measurement on a fewer number of axes than the original coordinate system. This transformation results in a comparison of the variables by allowing those variables that are highly correlated with one another to be treated as a single variable.

U.S. Pat. No. 5,130,936, entitled "Method and Apparatus for Diagnostic Testing Including a Neural Network for Determining Testing Sufficiency," to Sheppard, et al., issued Jul. 14, 1992. This patent discloses a combination of evidence theory and neural networks for improved diagnostic testing and determining the sufficiency of testing in diagnostic testing. The method receives input corresponding to at least one predetermined parameter of the system corresponding to its condition and produces a ranked set of diagnostic signals. Further, the system determines the sufficiency of the signal to ensure the validity of its diagnosis.

U.S. Pat. No. 5,715,178, entitled "Method of Validating Measurement Data of a Process Parameter from a Plurality of Individual Sensor Inputs," to Scarola, et al., issued Feb. 3, 1998. This patent discloses a method to reduce information overload on a plant operator by providing means to display information in a concise, reliable, and easily maintainable manner. This patent's disclosure is aimed at improving overall effectiveness of a control room complex by providing novel designs for the alarm indicators, alarm processors, displays and the like. The patent also discloses a knowledge-based heuristic algorithm based on the explicit calculation of residuals among redundant sensors that measure a same variable.

U.S. Pat. No. 5,237,518, entitled "Optimization Method for Adaptive Sensor Reading Scheduling and Delayed Alarm Evaluation in Real-Time Diagnostic Systems," to Sztipanovits, et al., issued Aug. 17, 1993. This patent discloses an optimization algorithm for use in an automated fault diagnostic system. It aims at scheduling an optimal sequence of evaluations of alarms that may be triggered by the diagnostic system.

None of the preceding patents disclose use of Bayesian belief networks for sensor diagnosis.

SUMMARY OF THE INVENTION
(DISCLOSURE OF THE INVENTION)

The present invention comprises a method for diagnosis of sensors comprising: providing at least one sensor-status node wherein each sensor-status node comprises a known probability table; providing at least one process-variable node wherein each process-variable node comprises a known probability table; providing at least one sensor-reading node wherein each sensor-reading node comprises a probability table conditional on at least two known probability tables; providing the at least one sensor-reading node with at least one sensor reading; inferring a status of at least one sensor. The method of the present invention, more specifically, comprises at least one Bayesian belief network. The method of the present invention is additionally useful for estimating at least one value of at least one process variable.

While relying on at least one Bayesian belief network, the method of the present invention comprises updating at least one known probability table after providing at least one sensor-reading node with at least one sensor reading. Monitoring of at least one updated table is within the scope of the present invention and is useful for assessing sensor fault detection, sensor fault classification, process fault detection, and/or process fault classification.

The method of the present invention also comprises inferring through process modeling wherein process modeling comprises continuous-value models, discrete-value models, linearized models, neural network models, fuzzy logic models, steady-state models, unsteady-state models, static models, and/or dynamic models.

According to the method of the present invention, inputting of data, i.e., information of any sort, can be through an external observer. Of course, providing at least one sensor reading comprises providing a reading from any type of sensor. More specifically, sensors such as, for example, but not limited to, are suitable: temperature sensors, concentration sensors, pH sensors, level sensors, flowrate sensors, and/or volume sensors.

The present invention also comprises an apparatus for sensor and/or process diagnosis. The apparatus comprises calculation means, input means, storage means, and output means. Calculation means comprises means for processing data, such as, for example, calculating probabilities of a Bayesian belief network wherein the network comprises at least one sensor-status node, at least one process-variable node, and at least one sensor-reading node. Digital and/or analog computers are suitable for providing for a calculation means for processing data. Input means comprises means for inputting information to the calculation means. Input means is achieved, for example, through connections for transmission of digital and/or analog information, through wire, fiber, radiowaves and the like. Information input to the apparatus includes information or data related to, but not limited to, processes, sensors, feedback, measurements, and the like. Such information can comprise data from an external observer and/or information from a reading from any sensor, for example, but not limited to, information from at least one of the following: temperature sensors, concentration sensors, pH sensors, level sensors, flowrate sensors, and volume sensors. Storage means comprises at least one manner for storing information, such as, but not limited to, digital and/or analog devices commonly used in the digital and/or analog computer industry. For example, RAM, floppy drives, hard drives, optical drives, and the like and their associated storage medium are suitable for use with the apparatus of the present invention. Output means comprises at least one means for transmitting information to, for example, an operator, a display device, a printer, a radio transmitter, and the like. In some instances, such information is used to change at least one process parameter or setting, thereby achieving feedback to a process.

The apparatus of the present invention comprises calculation means that also comprise solution means for solving at least one process model; estimating means for estimating at least one value of at least one process variable; updating means for updating at least one known probability table; monitoring means for monitoring of at least one updated probability table for assessing at least one member selected from the group consisting of sensor fault detection, sensor fault classification, process fault detection, and process fault classification; and, in general, process modeling. According to preferred embodiments of the present invention, process modeling comprises at least one of the following: continuous-value models, discrete-value models, linearized models, neural network models, fuzzy logic models, steady-state models, unsteady-state models, static models, and/or dynamic models.

A primary object of the present invention is to diagnose sensor and/or process faults through use of a Bayesian belief network.

A primary advantage of the present invention is sensor and/or process fault detection, isolation and accommodation.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention.

The drawings are only for the purpose of illustrating a preferred embodiment of the invention and are not to be construed as limiting the invention. In the drawings.

DESCRIPTION OF THE PREFERRED EMBODIMENTS

BEST MODES FOR CARRYING OUT THE INVENTION

Figure 1:
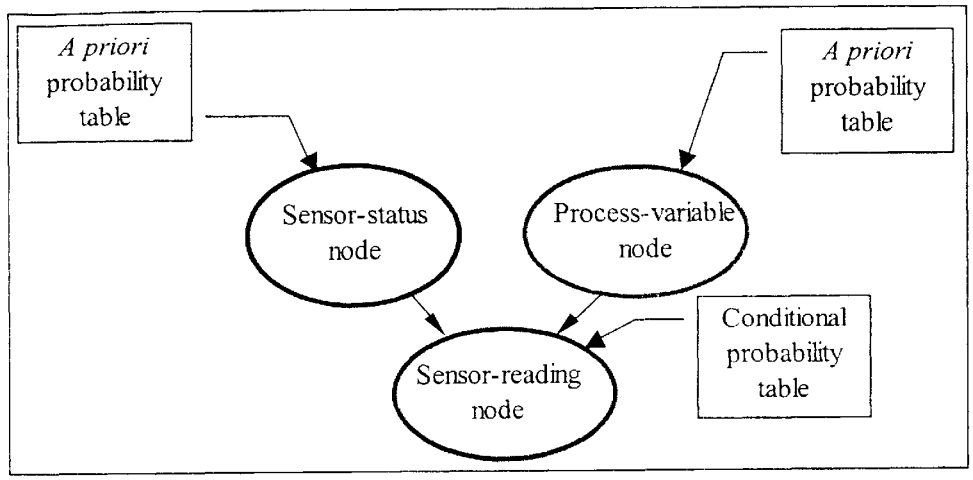
FIG. 1 is a diagram of three basic BBN nodes.

The method of the present invention achieves sensor and/or process fault detection, isolation, and accommodation (SFDIA and/or PFDIA) through use of Bayesian Belief Networks (BBNs). For a discrete, steady-state domain, hardware and software redundancies detect, isolate, and accommodate sensor and/or process faults using a single, unified method. The method of the present invention extends to:

1. Handling continuous variables—Continuous-valued representation removes the need for discretization and the subsequent approximation of process model;
2. Classifying faults—This feature allows the operator to diagnose the cause of the fault and thus take necessary corrective action;
3. Detection of short term and long term faults—A normally operating sensor is susceptible to noise and, thus, could occasionally result in an aberrant reading. It is necessary to progressively build a belief about sensor faults; and
4. Discrimination between process faults and sensor faults—Unusual or unforeseen sensor readings could be caused by process faults in addition to sensor faults. A BBN-based integrated scheme for both process and sensor fault detection accommodates both of these faults.
5. Complex systems, such as chemical plants, rely on sensor readings for better control, optimum yield, and safe plant operation. Faulty sensor readings may mask process malfunctions, and can have serious on sequences on economics and/or human health effects. SFDIA ascertains that data coming from sensors are free of faults before using them for subsequent control or monitoring purposes. A main objective, thus, is to detect sensor faults, recognize the faulty sensor, and classify the fault. In the presence of a faulty sensor, reconstruction of the sensor reading (fault accommodation), along with reduction in noise, form a part of the task. Development of methodology, results of experiments, and analyses are disclosed herein to demonstrate that the present invention achieves these objectives.

Sensor fault detection, isolation, and accommodation aim at accurate estimation of process variables, with and without the presence of sensor faults. To this end, SFDIA also touches upon the areas of multi-sensor fusion, data reconciliation, dynamic modeling, process fault detection, and control. A good SFDIA scheme will achieve as many of these goals with minimum basic assumptions and restrictions. This design philosophy has been incorporated in the development of a method based on Bayesian Belief Networks (BBN). Specifically, methods of the present invention, as elaborated in the embodiments, have the following features: handling of both dynamic and steady state sensor validation; allowing for continuous as well as discrete-valued representation; incorporation of analytical as well as knowledge-based, system-specific information; and learning and adapting from experience.

Contributions of the present invention include: methods that detect, isolate, and accommodate sensor faults and classify faults into possible modes of fault for a given sensor and having a foundation based on an evidence propagation method for a continuous-valued Bayesian belief network. The methods of the present invention present a generic, object-oriented framework for synthesis of a BBN for the purpose of sensor fault and/or process fault detection, isolation, and accommodation for both steady-state and dynamic processes; incorporation of strategies for adaptation to the changing environment, including changing process correlation and changes in sensor characteristics; and integration of methodologies of recurrent neural networks and BBNs for Bayesian modeling of the task of sensor fault and/or process fault diagnosis in a system with unknown process correlations.

Bayesian Belief Networks For SFDIA

Bayesian belief networks (BBN) networks are an effective tool to show flow of information and to represent and propagate uncertainty based on a mathematically sound platform (see, e.g., Pearl, J., *Probabilistic Reasoning in Intelligent Systems,* Morgan Kaufmann, San Mateo, Calif. (1988); Spiegelhalter, D. J., A. P. Dawid, S. L. Lauritzen, and R. G. Cowell, "Bayesian Analysis in Expert Systems", Statistical Science, 8(3), 219 (1993); Lauritzen S. L. and Spiegelhalter D. J., "Local Computations with Probabilities On Graphical Structures And Their Application To Expert Systems", *Journal of Royal Statistical Society, Series B (methodological),* 50(2), 157 (1988). Through use of provable schemes of inference and evidence propagation, a Bayesian network modeling a system help to detect, isolate, and accommodate sensor faults and/or process faults in a single, unified scheme. Such a system alleviates the need to construct separate modules to perform each of these detection, isolation, and accommodation functions. BBN systems of the present invention handle uncertain instantiations and unavailable data implicitly. Addition, removal, or replacement of one or more sensors can be handled by changing accordingly the nodes corresponding to the sensors in question and does not affect the entire network.

Development of a BBN-Based Basic SFDIA Unit

The present invention uses a Bayesian network structure for SFDIA as a means to identify basic types of nodes and corresponding links and to satisfy prescribed system conditions. In most industrial SFDIA systems, a "basic unit" is developed and further used as a component of a bigger and more general Bayesian network or system of networks. The BBN achieves the goals of SFDIA via an evidence propagation process. The process of ascertaining physical meaning and functionality of identified nodes completes setup of the basic unit.

Construction of Nodes, Links, and Associated Functions

For a BBN representation of SFDIA, three basic types of nodes are associated with each sensor.

1. "Sensor-reading" nodes that represent mechanisms by which information is communicated to a BBN;
2. "Sensor-status" nodes that convey status of corresponding sensors at any given time; and
3. "Process-variable" nodes that conceptually represent actual values of process variables, which are unknown.

To define the communication of information among the basic types of nodes, specification of the links among them is necessary. In a BBN, a link exists between each cause and its direct effect, directed from the former to the latter. A sensor reading reflects the value of a process variable that it is measuring. Hence a parent process-variable node exists for each sensor-reading node. Also, normal or faulty mode of operation of a sensor affects the sensor reading, and hence the sensor-status node is a parent of a sensor-reading node.

In addition to directed links, dependence of each child node on its parent nodes is specified by each child node's conditional probability table. Distributions of the root variables are defined in terms of a priori, or known, probabilities. The network structure and the probability tables completely define the knowledge about how the basic unit models an SFDIA system.

FIG. 1 shows a BBN representing the basic SFDIA unit. Three nodes of the three basic types—sensor-reading, sensor-status, and process-variable are shown. The sensor-status node, a root node, has a known probability table associated with it. The same is true for the process-variable node. The sensor-reading node is a common child of sensor-status and process-variable nodes, and it has a conditional probability table.

After the identification of the basic types of nodes, further developments are based on the following prescribed conditions:

1. Given the parent process-variable, the sensors are independent of each other;
2. The status of one sensor is independent of the status of any other sensor; and
3. The status of a sensor is independent of the state of the process, i.e., the values of the process variables.

A complete BBN for an SFDIA application typically involves several sensor-reading, sensor-status, and process-variable nodes. The primary functions associated with the task of SFDIA are divided between these nodes. Primary functions include providing input to the network, fault detection, fault classification, and fault accommodation. In SFDIA, evidence consists of sensor readings available at any particular instant. The process of evidence gathering is achieved via instantiations of the sensor-reading nodes. Once desired sensor readings are collected, status of each sensor is inferred along with estimates of actual values of the process variables that the particular sensors are measuring. Updated beliefs (i.e., probabilities) are formulated about the sensor-status and process-variable nodes and represent inferred knowledge. After evidence propagation, updated beliefs of the sensor-status nodes are monitored, which, in tumn, leads to information regarding fault detection and classification. In preferred embodiments of the present invention, updated beliefs about process-variable nodes result from multi-sensor fusion and fault accommodation functions. Thus, though functions associated with each node may differ, the functions are achieved via a single unified evidence propagation and inference scheme. Next, a system that uses a BBN consisting of a single basic unit is described.

Example: A Single-Variable, Single-Sensor System

Figure 2:
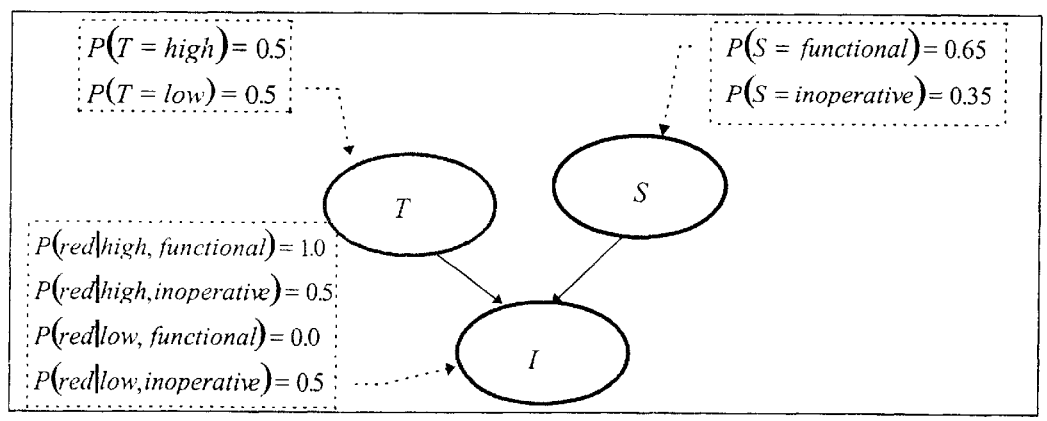
FIG. 2 is a diagram of three basic BBN nodes showing known (a priori) and conditional probabilities.

This particular preferred embodiment of the present invention uses a temperature sensor or indicator. The temperature sensor has two states: high temperature, i.e., equal to or above a threshold temperature, represented by a red indicator, and not high, i.e., below the threshold temperature, represented by a blue indicator. A network representation of this system comprises three discrete-valued nodes, one for the indicator reading (node I), one for the status of the sensor (node S), and another (node T) for temperature, whose actual value is unknown at any given time. The causal relationships and dependencies between the nodes are shown in FIG. 2. In reference to the temperature sensor, node I has two possible values "red" and "blue". Node S is either "functional" or "inoperative" depending on the status of the sensor. Node T represents the actual temperature: "high" if it is equal to or above the threshold or "low" otherwise.

As shown in FIG. 2, the Bayesian network representation of the single-sensor single-variable problem consists of a single basic unit, as shown in FIG. 1. In this embodiment, all three nodes are binary-valued. Nodes S and T are root nodes, and both have associated probability tables of known values as shown in the attached boxes; whereas, node I has an associated probability table whose values are conditional on the values of the root nodes. For example, when T=low and S=functional, the probability of I=red is 0.0.

To elaborate further, assume that the known probability of the functional state of node S is 0.65. Consequentially, the probability of the sensor being inoperative or faulty is 0.35. This is referred to as the sensor fault probability and is typically specified by the sensor manufacturer. Because each node is binary-valued, a total of four conditional probability statements uniquely define the dependence of I on T and S. These values are shown in boxes attached to each node in FIG. 2. At this point, a known distribution for node T needs to be provided for the network to be completely defined. As a starting point, assume uninformed equal probabilities of 0.5 for the two possible states. Next, an observation about the indicator reading is presented to the network via instantiation of the node I. Given this evidence, the network updates its beliefs about the other two nodes, S and T. For example, if the indicator is red, the probability of a high temperature increases from 50% to 82.5%. Beliefs about node S remain unchanged, due to the lack of prior information, i.e., a "non-informative prior." Calculations showing propagation of probabilities in the network and the resultant inference about the status of the sensor are shown in detail in a section that follows.

As demonstrated by the foregoing example, any statement about the value of temperature is a logical consequence of knowledge about the sensor. Logically, the higher the reliability of the sensor, the stronger the effect of the indicator reading on the belief about temperature. The values of belief about the actual value of temperature as a function of a known sensor fault probability are summarized in Table 1. As the known sensor fault probability increases, the sensor becomes less reliable; hence, the actual value of the temperature has a lower contribution from the sensor reading. Therefore, the updated probability of P(T=high) is lower, reflecting a lower belief in the sensor reading. For example, as shown in Table 1, as the known sensor fault probability goes from 0.45 to 0.05, the updated probability of T=high increases from 0.775 to 0.995. More definitive statements about the known temperature distribution result in stronger statements about sensor status, as shown in Table 2. When the known P(T=high) is low, the network concludes that the sensor is inoperative. When P(T=high) is high, it is more probable that the sensor is functional. For example, as shown in Table 2, as the a prior P(T=high) is increased from 0.02 to 0.90, updated P(S=functional) rises from 0.07 to 0.77.

Table 1: Updated belief about node T as a function of the known fault probability of the sensor, given that a sensor reading of high has been observed. A known temperature distribution remains constant at equal values of 0.5.

TABLE 1

| A Priori Sensor Fault Probability | Updated Probability Of T = high |
|---|---|
| 0.45 | 0.775 |
| 0.35 | 0.525 |
| 0.15 | 0.925 |
| 0.05 | 0.975 |

Table 2: The effect of prior knowledge on the inference of the network, given that a sensor reading of high has been observed. The known P(S=functional) is kept constant. Note that when known P(T=high) is low, the network concludes that the sensor is inoperative and thus the sensor reading is invalid. When P(T=high) is high, there is a high degree of belief in the sensor being operational and thus the sensor reading is considered valid.

TABLE 2

| Prior Probability Distribution | Posterior Probability Distribution |
|---|---|
| P(T = high) = 0.02 | P(T = high) = 0.09 |
| P(S = functional) = 0.65 | P(S = functional) = 0.07 |
| P(T = high) = 0.20 | P(T = high) = 0.54 |
| P(S = functional) = 0.65 | P(S = functional) = 0.46 |
| P(T = high) = 0.50 | P(T = high) = 0.825 |
| P(S = functional) = 0.65 | P(S = functional) = 0.65 |
| P(T = high) = 0.90 | P(T = high) = 0.98 |
| P(S = functional) = 0.65 | P(S = functional) = 0.77 |

Sample Calculation

Through evidence propagation and inference, evidence affects the beliefs about the uninstantiated nodes in the network. For the preceding example, the process of propagation of evidence and inference are described below:

Initialization—The objective of this stage is to initialize the BBN such that the network becomes ready to accept evidence. Probabilities for all nodes and all $\pi$ and $\lambda$ messages are initialized for this purpose.

1. Set all $\pi$ and $\lambda$ messages and $\lambda$ values to 1.

$$\pi(S)=P(S)=(0.65\ 0.35)$$

$$\pi(T)=P(T)=(0.5\ 0.5)$$

II. Calculate $\pi$ messages, exchange messages between S and I, and calculate updated probabilities for I.

A. Calculate $\pi$ message from $I$ to $S$:

$$\pi_I(S = \text{functional}) = \frac{P'(S = \text{functional})}{\lambda_I(S = \text{functional})} = \frac{0.65}{1} = 0.65 \quad (1)$$

where P' denotes the updated (posterior) probability, which at this point are equal to the known probability P for the root nodes.

$$\pi_I(S = \text{inoperative}) = \frac{P'(S = \text{inoperative})}{\lambda_I(S = \text{inoperative})} = \frac{0.35}{1} = 0.35$$

B. Calculate $\pi$ values for node $I$:

$$\pi(I = \text{red}) = P(\text{red} | \text{high, functional}) \cdot \pi_I(S = \text{functional}) \cdot \quad (2)$$
$$\pi_I(T = \text{high}) + \ldots + P(\text{red} | \text{low, inoperative}) \cdot$$
$$\pi_I(S = \text{inoperative}) \cdot \pi_I(T = \text{low})$$
$$= 1.0 \times 0.65 \times 1.0 + 0.0 + 0.5 \times 0.35 \times 1.0 +$$
$$0.5 \times 0.35 \times 1$$
$$= 1.0$$
$$\pi(I = \text{blue}) = 0.0 + 1.0 \times 0.65 \times 1.0 + 0.5 \times 0.35 \times 1.0 +$$
$$0.5 \times 0.35 \times 1$$
$$= 1.0$$

C. Update probabilities for I based on its $\pi$ and $\lambda$ values and a proportionality constant $\alpha$.

$$P'(I = \text{red}) = \alpha \cdot \lambda(I = \text{red}) \cdot \pi(I = \text{red}) \quad (3)$$
$$= \alpha \times 1.0 \times 1.0$$
$$= \alpha$$

$$P'(I = \text{blue}) = \alpha \cdot \lambda(I = \text{blue}) \cdot \pi(I = \text{blue})$$
$$= \alpha \times 1.0 \times 1.0$$
$$= \alpha$$

$$P'(I = \text{red}) + P'(I = \text{blue}) = 1.0 \quad (4)$$
$$\therefore \alpha + \alpha = 1.0 \Longrightarrow \alpha = 0.5$$
$$\therefore P'(I = \text{red}) = P'(I = \text{blue}) = 0.5$$

I has no children to send any $\pi$ messages. Hence, this branch of the propagation algorithm terminates.

III. Repeat step II for node T, i.e., calculate $\pi$ messages, exchange messages between T and I, and calculate updated probabilities for I.

A. Calculate $\pi$ messages from $I$ to $T$:

$$\pi_I(T = \text{high}) = \frac{P'(T = \text{high})}{\lambda_I(T = \text{high})} = \frac{0.5}{1} = 0.5$$

$$\pi_I(T = \text{low}) = \frac{P'(T = \text{low})}{\lambda_I(T = \text{low})} = \frac{0.5}{1} = 0.5$$

B. Calculate $\pi$ values for node I:

$$\pi(I = \text{red}) = P(\text{red} | \text{high, functional}) \cdot \pi_I(S = \text{functional}) \cdot$$
$$\pi_I(T = \text{high}) + \ldots + P(\text{red} | \text{low, inoperative}) \cdot$$
$$\pi_I(S = \text{inoperative}) \cdot \pi_I(T = \text{low})$$
$$= 1.0 \times 0.65 \times 0.5 + 0.0 + 0.5 \times 0.35 \times 0.5 +$$
$$0.5 \times 0.35 \times 0.5$$
$$= 0.5$$
$$\pi(I = \text{blue}) = 0.0 + 1.0 \times 0.65 \times 0.5 + 0.5 \times 0.35 \times 0.5 +$$
$$0.5 \times 0.35 \times 0.5$$
$$= 0.5$$

C. Update probabilities for I based on its $\pi$ and $\lambda$ values and a proportionality constant $\alpha$.

$$P'(I = \text{red}) = \alpha \cdot \lambda(I = \text{red}) \cdot \pi(I = \text{red})$$
$$= \alpha \times 1.0 \times 0.5$$
$$= 0.5\alpha$$

$$P'(I = \text{blue}) = \alpha \cdot \lambda(I = \text{blue}) \cdot \pi(I = \text{blue})$$
$$= \alpha \times 1.0 \times 0.5$$
$$= 0.5\alpha$$

$$\therefore \alpha = 1.0$$
$$\therefore P'(I = \text{red}) = P'(I = \text{blue}) = 0.5$$

I has no children to send any $\pi$ messages. Hence this branch of the propagation terminates.

Since all branches of the propagation scheme have terminated, the computation stops. The network is now completely initialized and is ready to accept new evidence.

Instantiation—The observed indicator is red and hence I is instantiated to red. This instantiation causes node I to send $\lambda$ messages to its parents and $\pi$ messages to its children.

I. Change the posterior probabilities and $\lambda$ values of I to reflect the evidence.

A.

$P'(I=\text{red})=1.0$ $P'(I=\text{blue})=0.0$ $\lambda(I=\text{red})=1.0$ $\lambda(I=\text{blue})=0.0$ B. Calculate $\lambda$ messages from I to its parents:

$$\lambda_I(S = \text{functional}) = \pi_I(T = \text{high}) \cdot (P(\text{red} | \text{high, functional}) \cdot \quad (5)$$
$$\lambda(I = \text{red}) + P(\text{blue} | \text{high, functional}) \cdot$$
$$\lambda(I = \text{blue})) + \pi_I(T = \text{low}) \cdot$$
$$(P(\text{red} | \text{low, functional}) \cdot \lambda(I = \text{red}) +$$
$$P(\text{blue} | \text{low, functional}) \cdot \lambda(I = \text{blue}))$$
$$= 0.5(1.0 \times 1.0 + 0.0) + 0.5(0.0 + 0.0)$$
$$= 0.5$$

$$\lambda_I(S = \text{inoperative}) = 0.5(0.5 + 0.0) + 0.5(0.5 + 0.0)$$
$$= 0.5$$

$$\lambda_I(T = \text{high}) = 0.65(1.0 + 0.0) + 0.35(0.5 + 0.0)$$
$$= 0.825$$

$$\lambda_I(T = \text{low}) = 0.65(0.0 + 0.0) + 0.35(0.5 + 0.0)$$
$$= 0.175$$

I has no children to send any $\pi$ messages. Hence this branch of propagation terminates.

Propagation—Receiving $\lambda$ messages from node I triggers nodes S and T into the appropriate updating procedure.

I. S receives a $\lambda$ message from I.
   A. Update $\lambda$ values for S:

$\lambda(S=\text{functional})=\lambda_I(S=\text{functional})=0.5$ $\lambda(S=\text{inoperative})=\lambda_I(S=\text{inoperative})=0.5$ B. Update probabilities for S:

$$P'(S = \text{functional}) = \alpha \cdot \lambda(S = \text{functional}) \cdot \pi(S = \text{functional})$$
$$= \alpha \times 0.5 \times 0.65$$
$$= 0.325\alpha$$

$$P'(S = \text{inoperative}) = \alpha \cdot \lambda(S = \text{inoperative}) \cdot \pi(S = \text{inoperative})$$
$$= \alpha \times 0.5 \times 0.35$$
$$= 0.175\alpha$$

$$0.325\alpha + 0.175\alpha = 1.0$$
$$\therefore \alpha = 2$$
$$\therefore P'(S = \text{functional}) = 0.65$$
$$P'(S = \text{inoperative}) = 0.35$$

S has no parents to send $\lambda$ messages. Hence this branch of propagation terminates. Also, S has no other children to send new $\pi$ messages. Hence this branch of propagation terminates.

II. T receives a $\lambda$ message from I.

A. Update $\lambda$ values for $T$:

$$\lambda(T = \text{high}) = \lambda_I(T = \text{high}) = 0.825$$
$$\lambda(T = \text{low}) = \lambda_I(T = \text{low}) = 0.175$$

B. Update probabilities for $S$:

$$P'(T = \text{high}) = \alpha \cdot \lambda(T = \text{high}) \cdot \pi(T = \text{high})$$
$$= \alpha \times 0.825 \times 0.5$$
$$= 0.4125\alpha$$

$$P'(T = \text{low}) = \alpha \cdot \lambda(T = \text{low}) \cdot \pi(T = \text{low})$$
$$= \alpha \times 0.175 \times 0.5$$
$$= 0.0875\alpha$$

$$0.4125\alpha + 0.0875\alpha = 1$$
$$\therefore \alpha = 2$$
$$\therefore P'(T = \text{high}) = 0.825$$
$$P'(T = \text{low}) = 0.175$$

T has no parents to send $\lambda$ messages. Hence this branch of propagation terminates. Also, T has no other children to send new $\pi$ messages. Hence this branch of propagation terminates.

Since all branches of the propagation scheme have terminated, the computation stops. The arrival of evidence has resulted in updating the probabilities that are stored as posterior probabilities with each node.

Incorporation of Redundancies in Network Structure

The basic unit of the present invention as developed in the previous section is devoid of any redundant information and its function as an SFDIA unit is limited. As discussed supra, hardware and analytical redundancies are typically used for SFDIA. Here, the basic unit is modified to construct BBNs that incorporate these redundancies. The following discussion progressively develops a general network structure for a system with hardware and analytical redundancy and applies the network structure to an example system.

Hardware Redundancy—the Five-Sensor Problem

Figure 3:
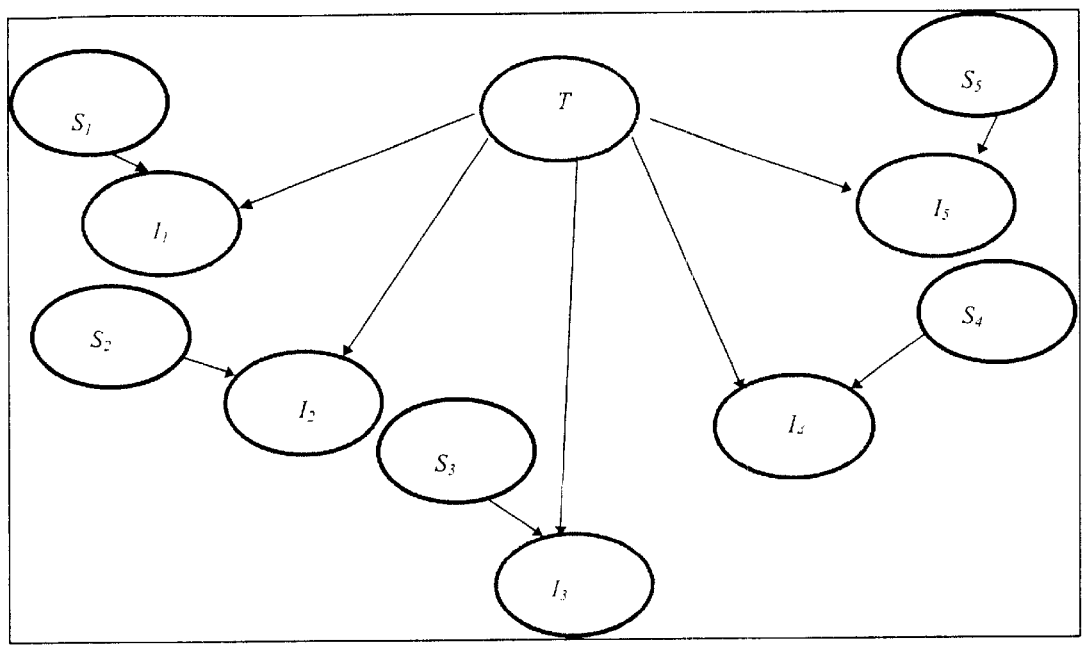
FIG. 3 is a diagram of a BBN having five sensors.

FIG. 3 shows a Bayesian network model of a system comprising one process variable and five sensors. Nodes $I_1$ through $I_5$ are sensor-reading nodes. Nodes $S_1$ through $S_5$ are corresponding sensor status nodes. Node T represents the temperature.

Hardware redundancy is a direct means of sensor fault accommodation. A BBN representation of a system with multiple sensors measuring the same process variable should contain multiple sensor-reading nodes for each process-variable node. Each sensor-reading node has its own sensor-status node, which is one of its parent nodes. In this embodiment of the present invention, sensor-reading nodes share a common parent: a process variable node representing the process variable that the sensors are measuring.

For an ensemble of five indicators, $I_1$ through $I_5$, assigned to measure and report the temperature of a given process (see, e.g., Smets, P., "The Nature of the Unnormalized Beliefs Encountered in the Transferable Belief Model", *Proceedings of the eighth conference on Artificial Intelligence,* 292 (1992)), the description of operational characteristics of the sensors are similar to those for the single-sensor case, i.e., fault probabilities of all sensors are known. Given the sensors readings, a statement is made about the actual value of the process variable. FIG. 3 shows the BBN model of the system, where node T represents the measured temperature. The actual temperature influences the sensor reading as reported by its indictor. This influence is shown in form of the directed link from node T to any indicator node, I. If the sensor is operational, there is a correlation between its value and the temperature. The lack of correlation in the case of a faulty sensor is represented as a uniform probability distribution in the conditional probability table of the indicator node, i.e., both high and low are equally probable values for sensor reading, irrespective of the high or low value of the temperature. The status of the sensor, as represented by node S, influences the corresponding indicator node and this influence is represented as a directed link from nodes S to nodes I.

In the five sensor example of this embodiment, node, $I_1$ represents a sensor with a relatively high reliability having a 1% probability of being faulty or inoperative; whereas sensors represented by nodes $I_2$ through $I_5$ are not as reliable—each having a 65% chance of being faulty. To demonstrate the system of the present invention, numerical experiments are performed. For instance, in one experiment, $I_1$ indicates red corresponding to a high temperature warning. The rest of the sensors indicate blue. The system next assesses whether each sensor is reporting the correct value of temperature or if it is faulty (i.e., sensor validation) (again, see, e.g., Smets, P., "The Nature of the Unnormalized Beliefs Encountered in the Transferable Belief Model", *Proceedings of the eighth conference on Artificial Intelligence,* 292 (1992)) and makes an informative statement about the actual value of temperature. Combining the information imbedded in the network and the evidence presented above, the BBN shows that the probability of a low temperature rises from 50% to 71.28%. Correspondingly, the revised belief that the sensor $I_1$ is functional at that particular instant decreases from the known value of 99% to 28.57%. The updated probabilities for functional operation of all other sensors are equal to 56.16%. These statements support the belief that sensor $I_1$ is faulty, sensors $I_2$ through $I_5$ are operational (i.e., a process of sensor fault detection and isolation), and the temperature is low (i.e., a process of combining results of fault accommodation and multi-sensor fusion). Therefore, this particular process of the present invention, comprising Bayesian inference, achieves fault detection, isolation, accommodation, and multi-sensor fusion in a single operation.

Analytical Redundancy: Construction of a Discrete, Steady-State Knowledge-Base In another preferred embodiment of the present invention, correlation among process variables is used for enhancing sensor fault detection and accommodation. A process model of the present invention encompasses correlative relationships that exist between different process variables. In a BBN representation, each variable is represented as a process-variable node. Thus, a model is represented as having conditional dependence of one or more process-variable nodes on the rest of the process-variable nodes.

A BBN representation of the aforementioned system requires separation of the process variables into parent, intermediate, and terminal nodes. In many instances, differential and/or algebraic equations adequately represent an actual process model. If this is the case, state-space type reorganization of the characteristic equation(s) allows for segregation of independent and dependent variables thereby facilitating a causal representation of dependencies.

In addition to constructing the part of the BBN representing the process model, formulation of the conditional probability tables for the dependent variables is required along with knowledge of probability tables for independent variables. Although the present invention encompasses analog systems wherein all information is collected and handled in a continuous manner, discrete representation of the process-variables, facilitates operation of digital components of the system. In otherwords, often, the systems of the present invention are implemented using digital computers, which are not capable of operating in a true analog sense; however, use of analog computers and/or elements are not excluded from the scope of this invention.

In the process of discretization, each parent variable is assigned one of its possible values. The value of a child process variable is then calculated and also discretized. This process is then repeated until all possible combinations of parent variables are covered. This data is then used to construct a conditional probability table for a child variable.

Discretized Network for a Continuous Stirred Tank Reactor ("CSTR")

Figure 4:
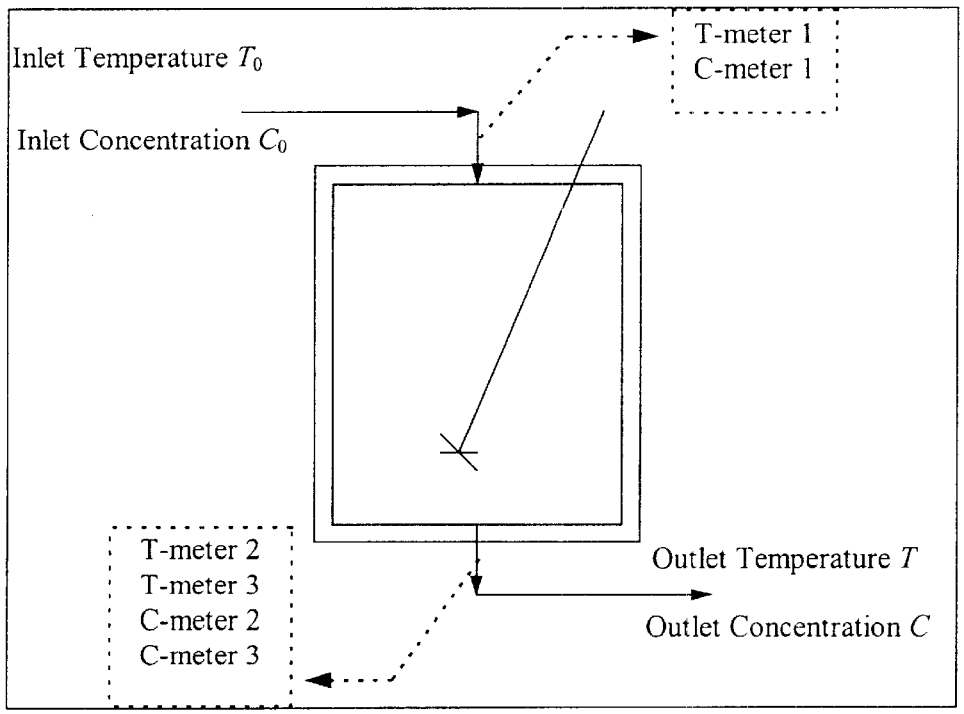
FIG. 4 is a diagram of a continuous stirred tank reactor.

FIG. 4 shows a schematic diagram of a CSTR having partial hardware redundancy. Sensors T-meter 1 and C-meter 1 measure inlet temperature and concentration, respectively. Outlet temperature is reported by two sensors: T-meter 2 and T-meter 3. Similarly, sensors C-meter 2 and C-meter 3 report on the value of outlet concentration. For simplicity of explanaton, this example relies on a model for a well-defined adiabatic CSTR as described in Kaqala, T. W. and D. M. Himmelblau, "Dynamic Data Rectification Using the Extended Kalman Filter and Recurrent Neural Networks", *Proceedings of the IEEE-ICNN*, 3244 (1994), incorporated herein by reference. Through a mathematical description of this particular CSTR and its definition in terms of characteristic equations, a BBN model is progressively developed and discussed. The CSTR system comprises a first order, exothermic reaction. The reactor is provided with a cooling jacket or coil for temperature control. The process variables of this example are the temperature and concentration of the inlet stream and the temperature and concentration inside the CSTR.

The steady-state equations that model this system are as follows:

$$\frac{dT}{dt} = \frac{q}{V}(T_0 - T) - \frac{\Delta H_r}{\rho C_p}k_0 C \exp\left(\frac{-E_a}{T}\right) - \frac{UA_r}{\rho C_p V}(T - T_c) = 0 \quad (6)$$

$$\frac{dC}{dt} = \frac{q}{V}(C_0 - C) - k_0 C \exp\left(\frac{-E_a}{T}\right) = 0. \quad (7)$$

All variables except T, C, $T_0$, and $C_0$ are assumed constant. A brief description of some of the physical meanings of the variables involved and their typical values and units are provided in Table 3. To facilitate numerical experiments, i.e., simulations, the equations are made dimensionless by substituting the following dimensionless variables:

$$T' = \frac{T}{T_r}, C' = \frac{C}{C_r}, T_0' = \frac{T_0}{T_r}, \text{ and } C_0' = \frac{C_0}{C_r}. \quad (8)$$

Substituting in the Equations 6 and 7, $$\frac{dT'}{dt} = \frac{q}{V}(T_0' - T') - \frac{\Delta H_r}{\rho C_p T_r}k_0 C' C_r \exp\left(\frac{-E_a}{T'T_r}\right) - \frac{UA_r}{\rho C_p V}(T' - T_c') = 0 \quad (9)$$

$$\frac{dC'}{dt} = \frac{q}{V}(C_0' - C') - k_0 C' \exp\left(\frac{-E_a}{T'T_r}\right) = 0 \quad (10)$$

Table 3: CSTR model parameters (See, e.g., Karjala, T. W. and D. M. Himmelblau, "Dynamic Data Rectification Using the Extended Kalman Filter and Recurrent Neural Networks", *Proceedings of the IEEE-ICNN*, 3244 (1994))

TABLE 3

| Parameter | Value | Units |
|---|---|---|
| Flow rate (q) | 10.0 | $cm^3 \cdot s^{-1}$ |
| Volume (V) | 1,000.0 | $cm^3$ |
| Heat of Reaction ($\Delta H_r$) | −27,000.0 | $cal \cdot mol^{-1}$ |
| Density ($\rho$) | 0.001 | $g \cdot cm^{-3}$ |
| Specific Heat ($C_p$) | 1.0 | $cal \, (g \cdot K)^{-1}$ |
| Heat Transfer Coefficient (U) | $5.0 \times 10^{-4}$ | $cal(cm^2 \cdot s \cdot K)^{-1}$ |
| Heat Transfer Area ($A_r$) | 10.0 | $cm^2$ |
| Coolant Temperature ($T_c$) | 340.0 | K |
| Arrhenius Constant ($k_0$) | $7.86 \times 10^{12}$ | $s^{-1}$ |
| Activation Energy ($E_a$) | 14,090.0 | K |
| Reference Concentration ($C_r$) | $1.0 \times 10^{-6}$ | $mol \cdot cm^{-3}$ |
| Reference Temperature ($T_r$) | 100.0 | K |

Figure 5:
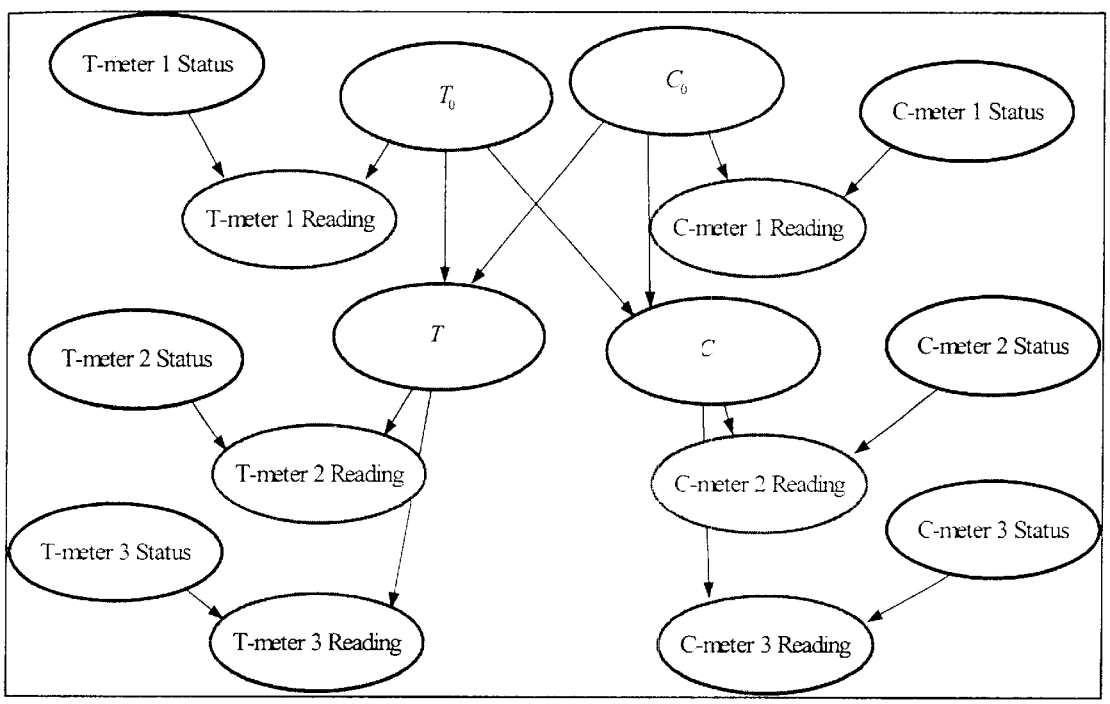
FIG. 5 is a BBN corresponding to an instrumented continuous stirred tank reactor.

According to Equations 9 and 10, C' and T' are dependent variables while $C_0'$ and $T_0'$ are independent variables. As shown in FIG. 5, the central structure of the BBN representing the CSTR contains four process-variable nodes wherein independent variables are parent nodes of the dependent variables child nodes. For computational stability of numerical experiments, random perturbations in the input variables were restricted to within approximately ±3% of steady-state values. Such restrictions are for numerical experimentation only and do not limit application of the present invention to real-process situations. Fractional deviation about steady-state, for each variable, was discretized into five equal bins or slots: Very Low (VL), Low (L), Medium (M), High (H), and Very High (VH). This manner of discretization enables approximation of steady-state correlation in the form of conditional probability tables for dependent variables. Representative values according to this example are provided as Tables 4(a) and 4(b).

In this example of the present invention, as applied to a CSTR, each of the process-variable nodes is linked, as a parent, to a number of sensor-reading nodes. Furthermore, the number of sensor-reading nodes is equal to the number of sensors measuring a particular variable. Each sensor-reading node has, in turn, its own sensor-status node as the other parent. Known fault probabilities are available for each sensor and these known probabilities enable prediction of the conditional dependence of the corresponding sensor-status node. For purpose of numerical experimentation, known probabilities for all process-variable nodes are represented with normal distributions and readings of faulty sensors are based on uniformly distributed random values. Table 5 lists three simulated instances of steady-state data, each involving a sensor fault.

Table 4(a): Representation of conditional probability table for node T (Outlet temperature). This table shows various values taken for T corresponding to different combinations of the values of the parent nodes. For example, when $C_0$=M and $T_0$=H, T=H with a probability of 1.0.

TABLE 4(a)

| | $C_0$ | | | | |
|---|---|---|---|---|---|
| $T_0$ | VL | L | M | H | VH |
| VL | VL | VL | L | L | L |
| L | L | L | L | M | M |
| M | L | M | M | H | H |
| H | M | H | H | H | VH |
| VH | H | H | VH | VH | VH | these nodes. As demonstrated, the network is capable of correctly inferring the status of each sensor, and the actual value of the process variable. Thus, the network can model a system comprising both hardware and analytical redundancies. Because sensor faults are effectively detected and isolated, in a discrete, steady-state domain, the network is capable of fault detection, isolation, and accommodation via a single, unified scheme. Examples and explanations that follow extend the scope of the present invention's BBN process.

Table 5: Simulated steady-state data and sensor readings for the CSTR example. Three sets of data are presented in this table. Values of the independent variables (i.e., $T_0$ and $C_0$) are generated randomly. Values of variables T and C are then calculated. Sensor readings are then generated for each variable. These sensor-readings are used to instantiate the BBN in FIG. 5. Each experiment involves one faulty sensor. The rest of the sensors are assumed to be working in the normal mode. For example, T-meter 1 reading in experiment 1 shows a faulty reading H (High). Its response in the normal mode would have been L (Low), which is the actual value of $C_0$.

TABLE 5

| | $T_0$ | | $C_0$ | | T | | | C | | |
|---|---|---|---|---|---|---|---|---|---|---|
| Expt. No. | Actual Value | T-meter 1 Reading | Actual Value | C-meter 1 Reading | Actual Value | T-meter 2 Reading | T-meter 3 Reading | Actual Value | C-meter 2 Reading | C-meter 3 Reading |
| 1 | L | H | M | M | L | L | L | M | M | M |
| 2 | H | H | L | L | H | H | H | VL | H | VL |
| 3 | VH | VH | VL | H | VH | VH | VH | VL | VL | VL |

Table 4(b): Representation of conditional probability table for node C (Outlet concentration). Similar to Table 4(a), this table shows various values taken by C corresponding to different combinations of the values of the parent nodes.

TABLE 4(b)

| | $C_0$ | | | | |
|---|---|---|---|---|---|
| $T_0$ | VL | L | M | H | VH |
| VL | VH | H | H | M | M |
| L | H | M | M | L | L |
| M | M | L | L | VL | VL |
| H | L | VL | VL | VL | VL |
| VH | VL | VL | VL | VL | VL |

Figure 6A:
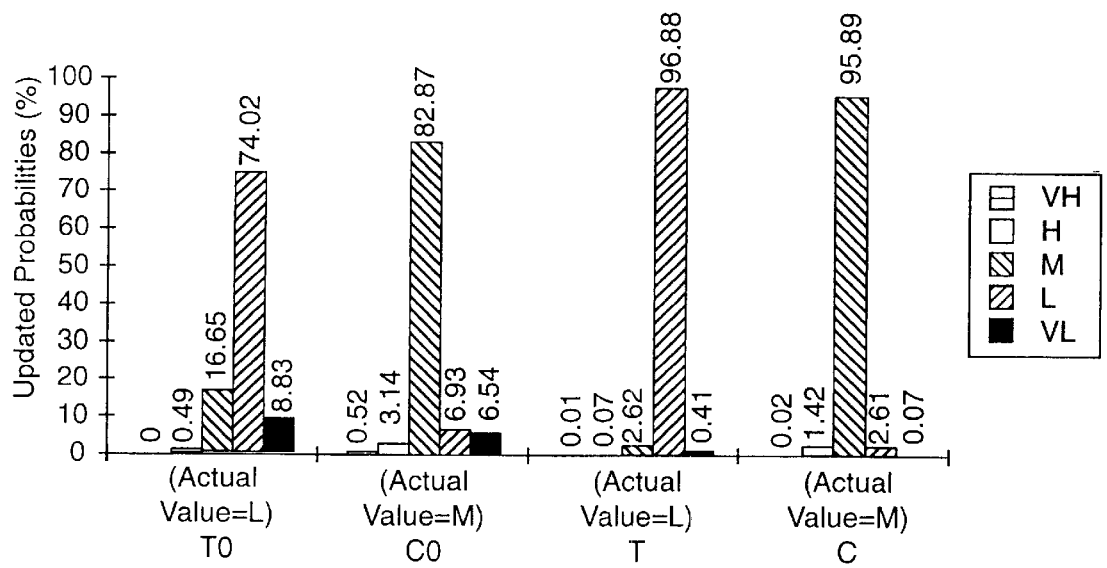
FIG. 6 are two plots, FIG. 6(a) and FIG. 6(b), of results corresponding to Experiment No.1, see also Table 5.
Figure 6B:
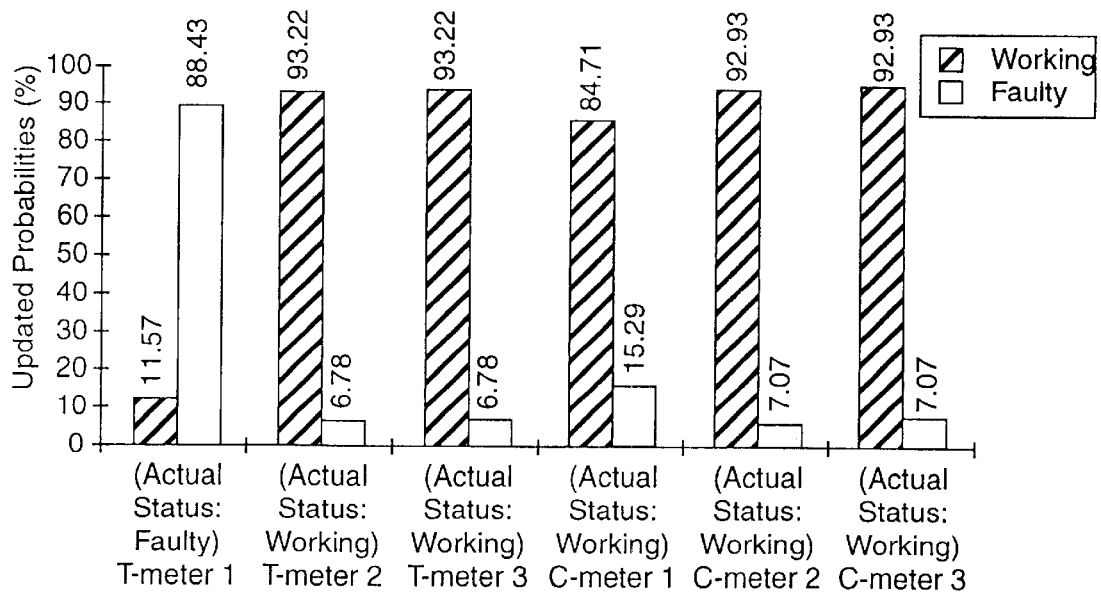
Figure 7A:
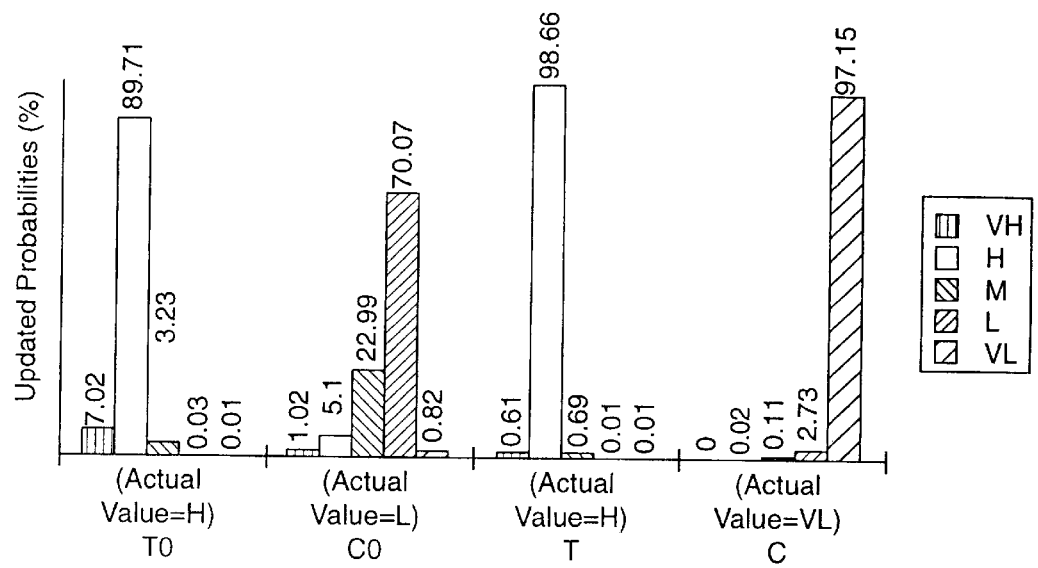
FIG. 7 are two plots, FIG. 7(a) and FIG. 7(b), of results corresponding to Experiment No. 2, see also Table 5.
Figure 7B:
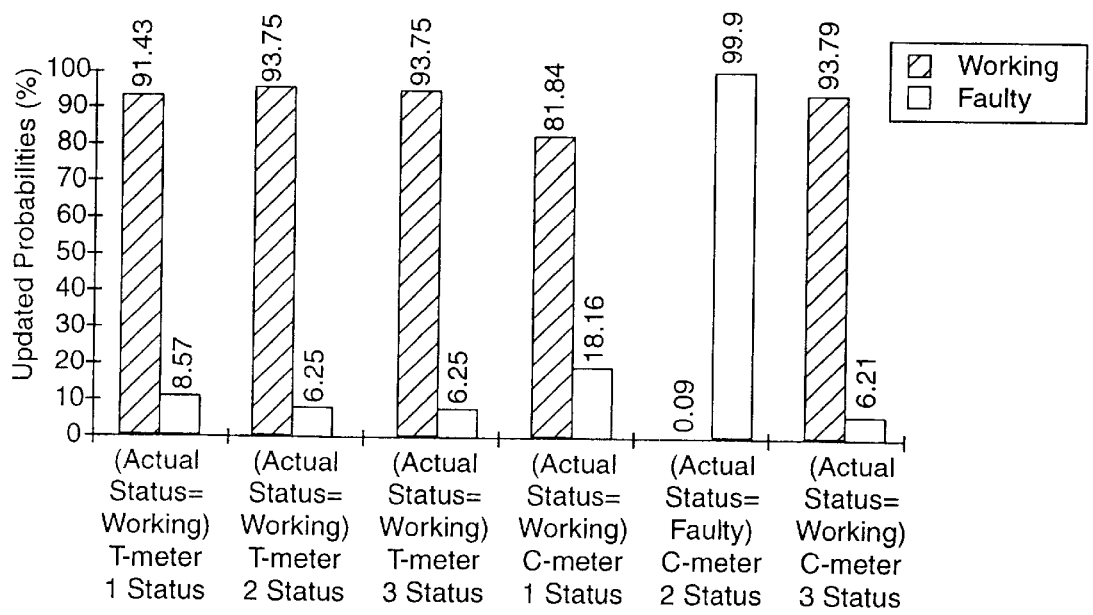
Figure 8A:
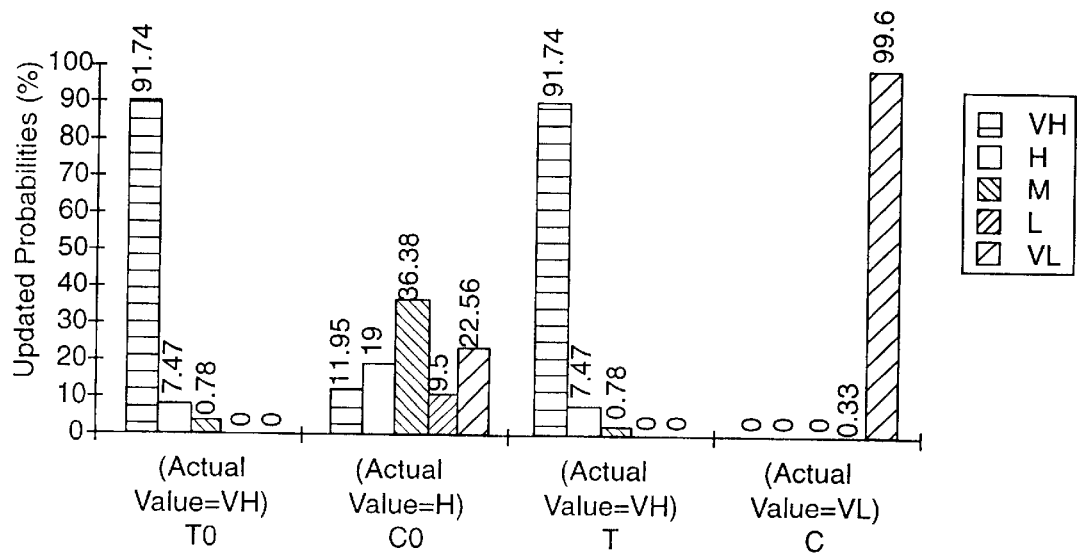
FIG. 8 are two plots, FIG. 8(a) and FIG. 8(b), of results corresponding to Experiment No. 3, see also Table 5.
Figure 8B:
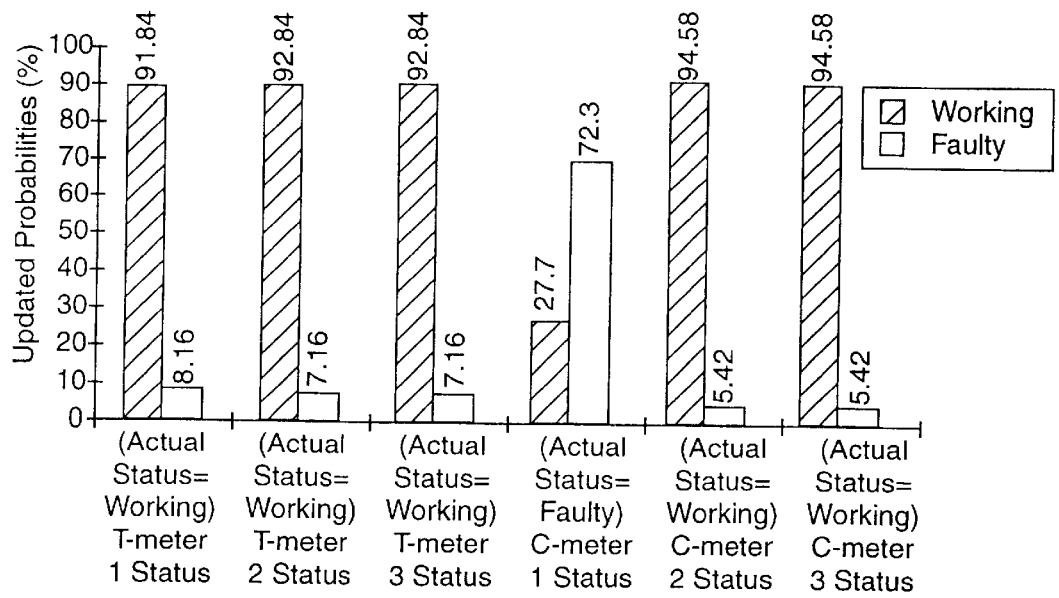

Each entry in Table 5 contains simulated sensor readings for a given steady-state of the CSTR (note that the CSTR can have more than one steady-state). The simulated sensor readings are provided as input to the network via instantiations of the corresponding sensor-reading nodes. The BBN responds to this evidence by updating the probabilities of all the uninstantiated nodes, i.e., the process-variable and sensor-status nodes. FIGS. 6, 7, and 8 show the results corresponding to the input from Table 5. Each figure shows the updated probability distributions and actual values of Extensions to the BBN Approach The method of the present invention also extends to the concept of BBN representation of redundancies and their utilization for SFDIA at more advanced level. At this advanced level, the BBNs of the present invention use a combination of qualitative as well as quantitative knowledge about a system. A variety of embodiments of the present invention comprise the following advances:

Continuous variables—A discrete representation allows only a finite number of possible values, whereas a continuous-valued variable can take infinite values. So naturally, a continuous representation has better precision. Mathematical relationships like process models have to be approximated in order to fit a discrete scheme, which can be avoided via a continuous-valued representation. In general, real-life process variables and sensor readings are continuous-valued, therefore, a continuous representation is more flexible in modeling sensor noise and faults. While continuous-valued representation removes the need for discretization and the subsequent approximation of process model, some other assumptions are helpful, as discussed infra.

Fault classifcation—While the primary goal of SFDIA is to detect, isolate, and accommodate sensor faults, a classification of the detected fault into one of the possible modes is desirable. This feature, discussed infra, allows an operator to diagnose the cause of the fault and thus take necessary corrective action.

Short term vs. long term fault detection—Even a normally operating sensor is susceptible to noise and, thus, could occasionally result in an aberrant reading. It is necessary to recognize the presence of a deviant reading and provide a corrected estimate for the variable in question. An approach that takes into consideration the status of the past readings and raises an alarm only after the detection of persistently faulty readings is presented infra.

Process faults in addition to sensor faults—In addition to the possibility of malfunctioning sensors, several other components in a system can undergo faults causing safety hazards or violation of the operating limits. Examples of this type of fault include leaks in pipelines, missing or broken insulation, and corroded or malformed equipment. Unusual or unforeseen sensor readings could be caused by such faults, henceforth referred to as "process faults", in addition to the various types of sensor faults discussed previously. The BBN-based fault detection scheme limited to sensor faults can detect such anomalies; however, it fails to diagnose appropriate causes. Diagnosis leads to proper isolation and accommodation-related inference. A BBN-based integrated scheme for both process and sensor fault detection is discussed infra.

Dynamic modeling—Transients in the state of the process may cause the process variables to deviate from a correlation followed during steady-state operation. BBNs of the present invention are modifiable to incorporate process dynamics, discussed infra.

Continuous-Valued Process Variables and Readings

Recent developments by Lauritzen S. L. "Propagation of Probabilities, Means, and Variances in Mixed Graphical Association Models", Journal of American Statistical Association (Theory and Methods), 87(420), 1098 (1992) in the theory for evidence propagation and inference in BBNs allow the incorporation of continuous-valued nodes. These developments are incorporated herein by reference. Implementation of continuous-valued nodes requires certain restrictions for analytical solutions of the probabilistic expressions resulting from the process of evidence propagation. These restrictions are as follows:

1. a discrete node cannot have a continuous-valued node as a parent;
2. functional dependency among continuous-valued nodes must be linear; and
3. the probability distribution function for continuous variables must be Gaussian.

If the above restrictions are obeyed, then a continuous-valued node A with discrete parents $B_1, B_2, \ldots$ (represented together as B) and continuous-valued parents $C_1, C_2, \ldots$ (represented together as C) has a conditional probability distribution of the following form:

$$P(A|B=b, C=c) = N(\alpha(b) + \beta(b)^T c, \gamma(b)), \quad (11)$$

where b and c are column vectors containing the values of nodes in sets B and C, respectively. Note that vector c consists of real numbers, whereas vector b consists of indices to discrete values. $N(v, \sigma)$ denotes a normal (i.e., Gaussian) probability distribution with mean $\mu$ and standard deviation $\sigma$. The quantities $\alpha$, $\beta$, and $\gamma$ are functions of the vector b. The values of $\alpha$ and $\gamma$ are real numbers, whereas $\beta$ is a column vector consisting of real numbers, its length being the same as that of the vector c. Thus, the mean of the conditional probability distribution is linearly dependent on the values of the continuous-valued parents. A node with no discrete parent will have $\alpha$, $\gamma$, and elements of vector $\beta$ as constants. Thus, the tables providing the values of $\alpha$, $\beta$, and $\gamma$ represent the conditional probability distribution for node A.

Schemes for SFDIA developed herein do not violate the first restriction. The second restriction enforces the linearization of the process model representing the dependency between variables. Step-by-step explanation of the linearization process for the CSTR model is discussed infra. Since the error distributions are often represented as Gaussian, the third restriction is not too limiting, as discussed herein, for the development of a known Gaussian and conditional probability distributions for the CSTR example.

Linearization of Process Model

The system of equations representing the CSTR, as discussed supra, represents a discrete BBN structure for this particular system. The network structure for a continuous-valued BBN is the same as shown in FIG. 5, with all the process-variable and sensor-reading nodes being continuous-valued. The steady-state equations characterizing the process are $$\frac{q}{V}(T_0' - T') - \frac{\Delta H_r}{\rho C_p T_r} k_0 C' C_r \exp\left(\frac{-E_a}{T'T_r}\right) - \frac{UA_r}{\rho C_p V}(T' - T_c') = 0 \quad (12)$$

$$\frac{q}{V}(C_0' - C') - k_0 C' \exp\left(\frac{-E_a}{T'T_r}\right) = 0. \quad (13)$$

These equations are linearized for incorporating continuous-valued nodes for the process variables $T_0'$, $C_0'$, $T'$, and $C'$. In this particular example, this was achieved via the following steps, although other methods are possible:

1. Apply the differential operator to the steady-state equations:

$$\frac{q}{V}(dT_0' - dT') - \quad (14)$$

$$\frac{\Delta H_r}{\rho C_p T_r} k_0 C_r \exp\left(\frac{-E_a}{T'T_r}\right)\left(dC' + C' \cdot \frac{-E_a}{T_r} \cdot \frac{-dT'}{T'^2}\right) - \frac{UA_r}{\rho C_p V} dT' = 0$$

$$\frac{q}{V}(dC_0' - dC') - k_0 \exp\left(\frac{-E_a}{T'T_r}\right)\left(dC' + C' \cdot \frac{-E_a}{T_r} \cdot \frac{-dT'}{T'^2}\right) = 0 \quad (15)$$

2. Reorganize:

$$\left(\frac{q}{V}\right)dT_0' + \left\{-\frac{\Delta H_r}{\rho C_p T_r} k_0 C_r \exp\left(\frac{-E_a}{T'T_r}\right)\right\}dC' + \quad (16)$$

$$\left\{-\frac{q}{V} - \frac{\Delta H_r}{\rho C_p T_r} k_0 C_r \exp\left(\frac{-E_a}{T'T_r}\right)\left(C' \cdot \frac{E_a}{T_r T'^2}\right) - \frac{UA_r}{\rho C_p V}\right\}dT' = 0$$

$$\left(\frac{q}{V}\right)dC_0' + \left\{-\frac{q}{V} - k_0 \exp\left(\frac{-E_a}{T'T_r}\right)\right\}dC' + \quad (17)$$

$$\left\{-k_0 \exp\left(\frac{-E_a}{T'T_r}\right)\left(C' \cdot \frac{E_a}{T_r T'^2}\right)\right\}dT' = 0$$

3. Substitute the nominal steady-state values of $T_0'=3.5$, $C_0'=3.5$, $T'=4.6092$, and $C'=0.1525$, and the constant values tabulated in Table 3:

$$(0.01)dT_0' + (-0.0987)dT' + (-0.1124)dC' = 0 \quad (18)$$

$$(0.01)dC_0' + (0.4210)dT' + (-0.4263)dC' = 0 \quad (19)$$

4. Arrange in matrix form:

$$\begin{bmatrix} 0.01 & 0 \\ 0 & 0.01 \end{bmatrix} \cdot \begin{bmatrix} dT'_0 \\ dC'_0 \end{bmatrix} = \begin{bmatrix} 0.0987 & 0.1124 \\ -0.4210 & 0.4263 \end{bmatrix} \cdot \begin{bmatrix} dT' \\ dC' \end{bmatrix} \quad (20)$$

5. Reorganize to get dependent variables in terms of independent variables:

$$\begin{bmatrix} dT' \\ dC' \end{bmatrix} = \begin{bmatrix} 0.0987 & 0.1124 \\ -0.4210 & 0.4263 \end{bmatrix}^{-1} \cdot \begin{bmatrix} 0.01 & 0 \\ 0 & 0.01 \end{bmatrix} \cdot \begin{bmatrix} dT'_0 \\ dC'_0 \end{bmatrix} \quad (21)$$

$$\therefore \begin{bmatrix} dT' \\ dC' \end{bmatrix} = \begin{bmatrix} 0.81 & 0.21 \\ -0.80 & -0.18 \end{bmatrix} \cdot \begin{bmatrix} dT'_0 \\ dC'_0 \end{bmatrix} \quad (22)$$

These equations imply that dT' and dC' are dependent on $dT'_0$ and $dC'_0$.

Generation of Gaussian Distributions

Assumptions stated supra require that the probability distributions of the continuous-valued nodes are Gaussian. Since $dT'_0$ and $dC'_0$ represent comparatively small perturbations from steady-state values, their known distributions are assumed to be Gaussian with zero-mean and correspondingly small standard deviations. The values of the standard deviations are either provided or assumed. The nodes dT' and dC' have no discrete parents, hence α, γ, and elements of column vector β in Equation 11 are constants for both of these nodes. If the process model is assumed accurate, α=0 and γ=0. The conditional probability distributions of dT' and dC' with these parents are then represented by the elements of the vector β, which are the coefficients of $dT'_0$ and $dC'_0$ in the above-linearized equations as shown in Table 6.

In this particular embodiment of the present invention, each continuous-valued sensor-reading node has a discrete-valued parent (he sensor-status node) and a continuous-valued parent (he process-variable node). The values of α, γ, and the elements of vector β represent the conditional probability distribution for a sensor-reading node and are dependent on the sensor-status node, as discussed infra.

Multiple Modes of Faults and Fault Classification

Table 6: Representation of probability distribution for nodes dT' and dC'. The values of α, β, and γ define the conditional distribution for dT' as in Equation 11. When compared with Tables 4(a) and 4(b), this representation is seen to be more analytic and precise. However, it requires linearization. The column vector β corresponds to the parents $dT'_0$ and $dC'_0$.

Table 6(a): Values of α, β, and γ for node dT'

TABLE 6(a)

| α | 0 |
|---|---|
| γ | 0 |
| β | $\begin{bmatrix} 0.81 \\ 0.21 \end{bmatrix}$ |

Table 6(b): Values of α, β, and γ for node dC'

TABLE 6(b)

| α | 0 |
|---|---|
| γ | 0 |
| β | $\begin{bmatrix} -0.80 \\ -0.18 \end{bmatrix}$ |

Mathematical representations for some common modes of sensor operation are discussed herein; however, embodiments of the present invention are not limited by these modes. These representations are useful to develop general models, and then to represent conditional probability distributions for sensor-reading nodes.

1. Normal operation—This mode is defined as a sensor reading with a sensor error with low standard deviation and zero mean. If $N(\mu,\sigma)$ represents a normally distributed random number with mean $\mu$ and standard deviation $\sigma$, a normal sensor behavior is of the form (See, e.g., Karjala, T. W., D. M. Himmelblau, and R. Miikkulainen, "Data Rectification Using Recurrent (Elman) Neural Networks", *Proceedings of the IEEE-IJCNN*, 901 (1992):

$$X_{si}=X+N(0,\sigma_n), \quad (23)$$

where X is the actual value of the process variable under measurement, $X_{si}$ is the sensor reading for the $i^{th}$ sensor measuring variable X, and $\sigma_n$ is the standard deviation of sensor error during the normal mode of operation.

2. Bias—This mode is defined as a sensor reading with a constant offset. A bias is modeled as, for example, $$X_{si}=X+N(\mu_b,\sigma_n), \quad (24)$$

where $v_b$ is the average value of the bias, such that $v_b \neq 0$. It is represented as the mean of the sensor error.

3. Precision degradation—This mode is defined as a large increase in the standard deviation of the zero-mean Gaussian noise in the sensor readings. A representation for precision degradation is $$X_{si}=X+N(0,\sigma_{pd}), \quad (25)$$

where $\sigma_{pd}$ is the standard deviation of the sensor error in the precision degradation mode. In general, $\sigma_{pd}>>\sigma_n$.

4. Complete failure—This mode is defined as a near-constant sensor reading, irrespective of the value of the process variable under measurement. It is modeled as, for example:

$$X_{si}=N(\mu_c,\sigma_n), \quad (26)$$

where $\mu_c$ is the completely failed reading.
A general model for the sensor reading can be $$X_{si}=C_{Xi}\cdot X+\epsilon_{xi}, \quad (27)$$

where $C_{Xi}$ is the coefficient of X signifying the dependence of $X_{si}$ on X, and $\epsilon_{xi}$ is random Gaussian noise representing sensor error. In general, both $C_{Xi}$ and $\epsilon_{xi}$ are dependent on the sensor status, $S_{Xi}$. For a normally operating sensor, $C_{Xi}$ is one and $\epsilon_{xi}$ is close to zero. A faulty sensor may have $C_{Xi} \neq 1$ and/or a high error.

Table 7: Representation of conditional probability distribution for a sensor-reading node. The vales for $\mu_b, \mu_c, \sigma_n$, and $\sigma_{pd}$ have to be either specified or assumed.

TABLE 7

| | Sensor Status $S_{Xi}$ | | | |
|---|---|---|---|---|
| | Normal | Bias | Precision Degradation | Complete Failure |
| $\alpha (= \mu(\epsilon_{xi}))$ | 0 | $\mu_b$ | 0 | $\mu_c$ |
| $\gamma (= \sigma(\epsilon_{xi}))$ | $\sigma_n$ | $\sigma_n$ | $\sigma_{pd}$ | $\sigma_n$ |
| $\beta (= C_{xi})$ | [1] | [1] | [1] | [0] |

Thus far, the only states for the sensor-status nodes are Operational and Faulty. Multiple modes of faulty sensor operation are incorporated, for example, by simply introducing multiple states for the sensor-status nodes. For instance, the modes of operation of a sensor are representable by four discrete states of the sensor-status node: normal, bias, precision degradation and complete failure. A representation of the conditional probability distribution for a sensor-reading node is shown in Table 7. The mean and standard deviation of the sensor error are the values of $\alpha$ and $\gamma$, respectively, for the conditional probability distribution of $X_{si}$ (Equation 11). These values are, for example, represented as $\mu(\epsilon_{xi})$ and $\sigma(\epsilon_{xi})$ respectively. The values of $C_{xi}$ define the linear dependence of $X_{si}$ on X, and provide the values for the elements of vector $\beta$. Vector $\beta$ has dimension 1, because there is only one continuous-valued parent.

Sensor fault detection as well as fault classification are achieved by monitoring the updated distribution $P(S_{Xi})$, i.e., the updated values for $P(S_{Xi}=\text{normal})$, $P(S_{Xi}=\text{bias})$, $P(S_{Xi}=\text{precision degradation})$, and $P(S_{Xi}=\text{complete failure})$. In the normal sensor mode, $P(S_{Xi}=\text{normal})$ is close to one and the rest of the probability values are close to zero. If one of the three probability values for faulty sensor operation dises above a threshold value, a fault is declared by the BBN. The value of the threshold is set, for example, comprising experience of the operator and/or the basis of the known probability of the occurrence of any kind of fault. A higher threshold implies a lower false alarm rate, but slower declaration of faults.

Long-Term Fault Detection Via Learning

The works of Spiegelhafter, D. J., "A Unified Approach to Imprecision and Sensitivity of Beliefs in Expert Systems", *Uncertainty in Artificial Intelligence,* vol. 3, Kanal, L. N., T. S. Levitt, and J. F. Lemmer, eds., Elsevier Science Publishers B. V. (North-Holland) (1989) and Spiegelhalter D. J. and S. L. Lauritzen "Sequential Updating of Conditional Probabilities on Directed Graphical Structures", *Networks,* 20(5), 579 (1990) propose a unified approach to handling both imprecision and sensitivity to environment for the assumed probability distributions. These works are incorporated herein by reference. In a dynamic environment, sets of data may arrive over intervals of time. It is desired to process each individual case according to the current state of the network, and allow for the experience gained to be carried over to future cases. One of the approaches suggested by Spiegelhalter D. J. and S. L. Lauritzen "Sequential Updating of Conditional Probabilities on Directed Graphical Structures", *Networks,* 20(5), 579 (1990) is to generate a virtual parent for the node that needs learning. The distribution of the conditional dependence of such a node is controlled by the virtual parent. Evidence causes a change in the probabilities of the virtual parent node, as in any other uninstantiated node. In this context, this step is called "retrieval of information." Unlike other nodes, however, these updated probabilities for the virtual parent are retained and carried over to the next time step. This change in probabilities of the virtual parent affects the way the network updates itself when new evidence is presented. Thus, the network has accommodated the experience of the previous time step. This process is called "dissemination of experience". Thus, the adaptation to a dynamic environment is achieved through a two step process of retrieval and dissemination.

Dynamic Sensor-Status Nodes

Long-term fault detection is achieved by dynamically adapting to the changing status of the sensor. The sensor-status nodes are treated as virtual parents of the sensor-reading nodes, since they control the dependence of the sensor-reading node on the corresponding process-variable node. The updated beliefs of the sensor-status nodes are carried over to the next time step as new, known distributions for these nodes. Thus, experience is stored and carried over. At the next time step, the BBN disseminates this experience, propagates the evidence, and updates the beliefs of sensor-status nodes. This cycle is thus repeated to dynamically interact with the changing environment.

Figure 9:
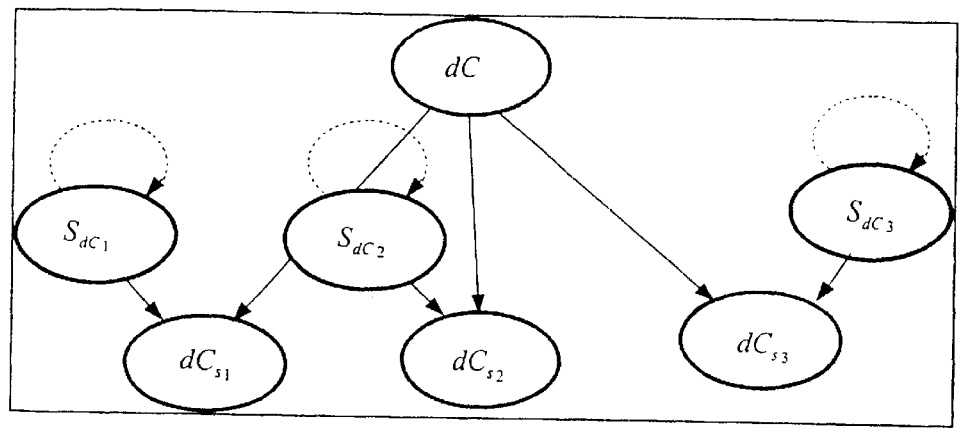
FIG. 9 is a diagram of a BBN representation for an example problem with multiple fault types.

An example of this particular embodiment of the present invention comprises a system with three sensors measuring perturbations in concentration, dC. For simplicity, only hardware redundancy is considered and the sensors are identical. For purposes of numerical experimentation, values of dC are generated using a zero-mean Gaussian random number generator while random zero-mean noise is further added to simulate sensor readings. The BBN model of this system is shown in FIG. 9. At every time step, simulated readings for sensor 1, 2, and 3 are fed to the BBN as the evidence via the instantiations of the sensor-reading nodes $dC_{s1}$, $dC_{s2}$, and $dC_{s3}$. The evidence is propagated and updated probabilities of the sensor-status nodes $S_{dC1}$, $S_{dC2}$, and $S_{dC3}$ are monitored for any detected faults in the corresponding sensors. The mean of the updated distribution of node dC is a result of fault accommodation and multi-sensor fusion and it provides a reconciled estimate of the actual value of the process variable dC. This reconciled value is close to the actual value if the fault is correctly detected, isolated, and classified.

Figure 10:
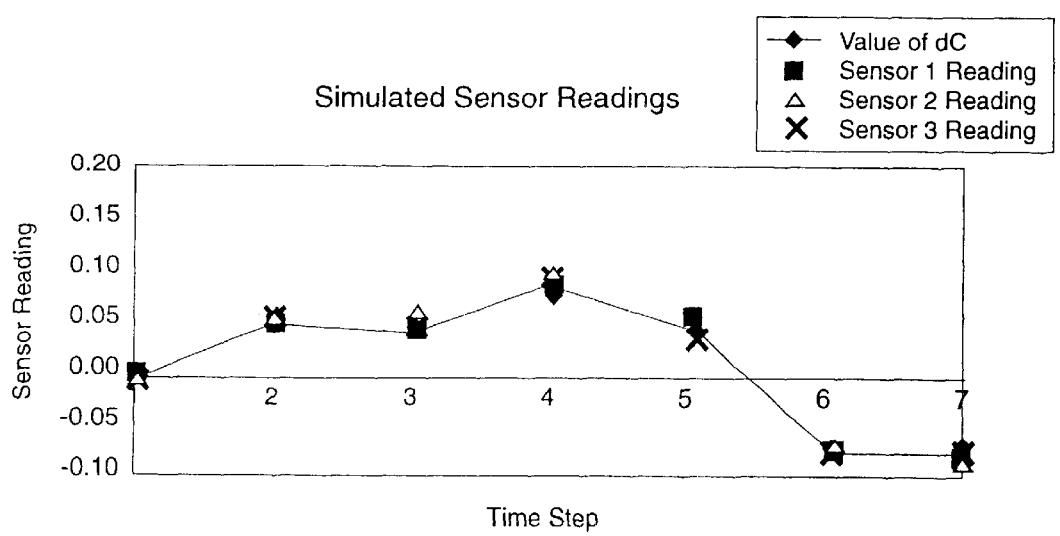
FIG. 10 is a plot of simulated sensor readings for an example problem corresponding to FIG. 9.
Figure 12:
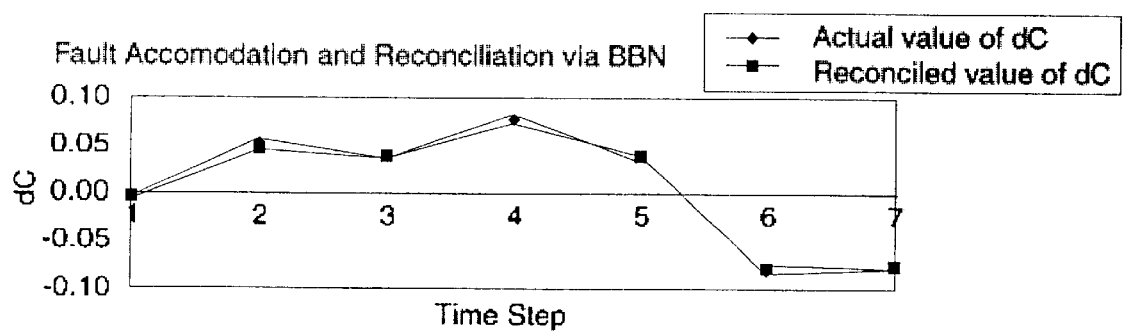
FIG. 12 is a plot of reconciled and actual values for dC, corresponding to FIG. 9.
Figure 13:
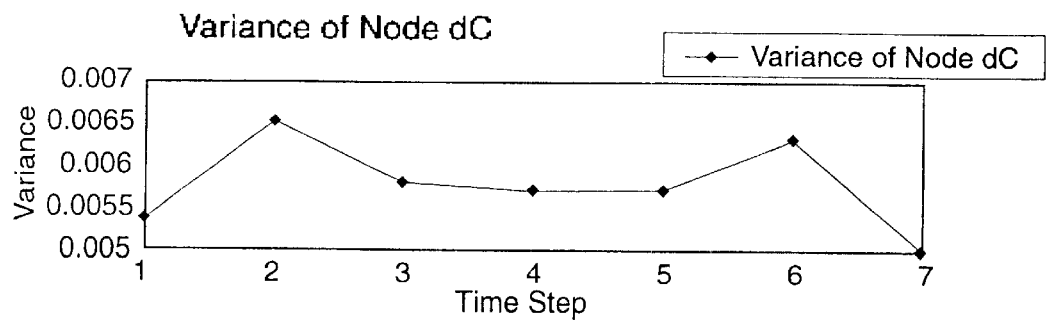
FIG. 13 is a plot of the variance of node dC, corresponding to FIG. 9.

For a bias in the $dC_{s2}$ reading at time step 2, normal operation is resumed at time step 6 as shown in FIG. 10. As seen from the graph in FIG. 11, initially the probability of $dC_{s2}$ being in the normal mode of operation is dose to unity. The probabilities of the faulty modes of operation are near zero. Thus the network has detected the initial absence of faults. When bias is introduced in the readings of $dC_{s2}$ (time step 2), the fault is immediately detected and isolated. This can be seen from the drop in P(normal) at time step 2 in FIG. 11. The network is initially uncertain of the type of fault and progressively becomes more confident as seen from the rise of P(bias) in FIG. 11. FIG. 12 shows that the accuracy of the BBN estimate of dC remains unaffected by the occurrence of the fault, thus the BBN is shown to have succeeded in accommodating the fault. The variance of the updated distribution of node dC is inversely related to the confidence of the BBN in the reconciled estimate of variable dC. The peak at time step 2 in FIG. 13 shows the uncertainty at the onset of the fault.

Figure 11:
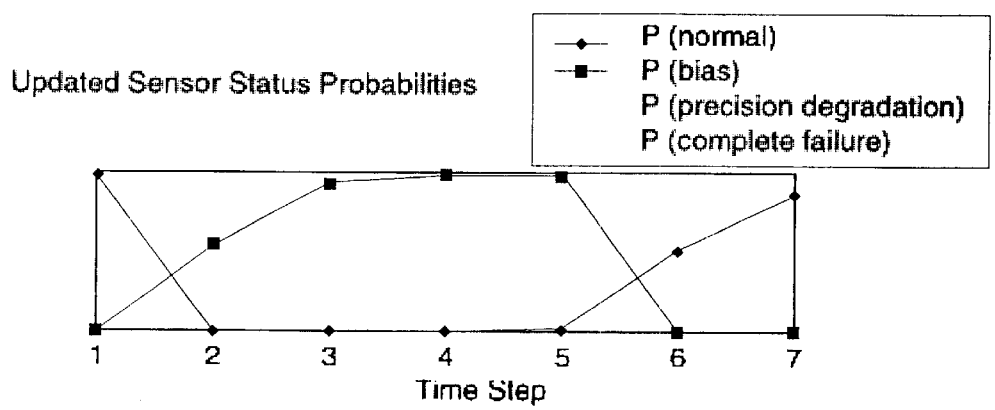
FIG. 11 is a plot of updated probabilities of the sensor-status node for sensor 2, showing fault detection and classification, corresponding to FIG. 9.

The transition from faulty to normal mode of operation at time step 6 is promptly detected as seen from the drop in P(bias) in FIG. 11. Simultaneously, P(normal) and P(precision degradation) increase, which implies that the BBN is uncertain of the cause of the observed change in sensor behavior. This is reflected in the momentary peak in the variance of node dC at time step 6 in FIG. 13. Subsequently, P(precision degradation) drops while P(normal) continues to increase, which implies that the network now has resolved this uncertainty and correctly diagnosed the transition back to the normal mode of operation of $dC_{s2}$.

Process Faults and Flowsheet Modeling

Process faults can lead to hazardous results and loss of revenue, and thus need to be detected and isolated. As has been stated before, analytical redundancy-based SFDIA makes use of a process model that encompasses the relationships among process variables. A process fault can change these relationships, and thus invalidate the model. Hence, upon detection and isolation of process faults, necessary changes need to be made in the process model assumed for sensor fault detection.

Thus far, the models of the present invention, as developed herein, have taken advantage of the functional dependencies among the process variables belonging to one single component in a process, such as a draining tank or a CSTR. Other processes involve multiple process units in series or parallel, and this structural knowledge may be incorporated in BBN representations for modeling and fault detection of entire flowsheets. Thus, under these circumstances, a larger body of redundant information is available to the BBN, leading to a wider scope of application. The feasibility of Bayesian modeling of connected equipment is discussed infra.

Detection of Process Faults and Simultaneous SFDIA

Since any cause-effect type of relationship is modelable as a Bayesian link, process faults with known events that cause them are modelable in a BBN. For example, an event X can change the functional relationship between the outlet temperature T and the inlet temperature $T_0$ and $C_0$. X comprises, for example, a malfunctioning stirrer leading to non-ideal mixing. In a BBN representation of this process fault X is modelable as a parent node of T in addition to $T_0$ and $C_0$, with the possible values "true" representing non-ideal molding, and "false" representing ideal mixing. Because conditional tables for T depend on values of X, in addition to values of $T_0$ and $C_0$, the effect of the process fault is taken into account. In evidence propagation, event X is an uninstantiated variable and its updated distribution lead to the detection of non-ideal mixing. In a similar fashion, other process faults are also suitably taken into account. This BBN inference scheme does not need an explicit procedure to distinguish between process and sensor faults when unusual readings are observed. Also, an explicit procedure to change the model used to represent analytical redundancy is unnecessary.

Figure 14:
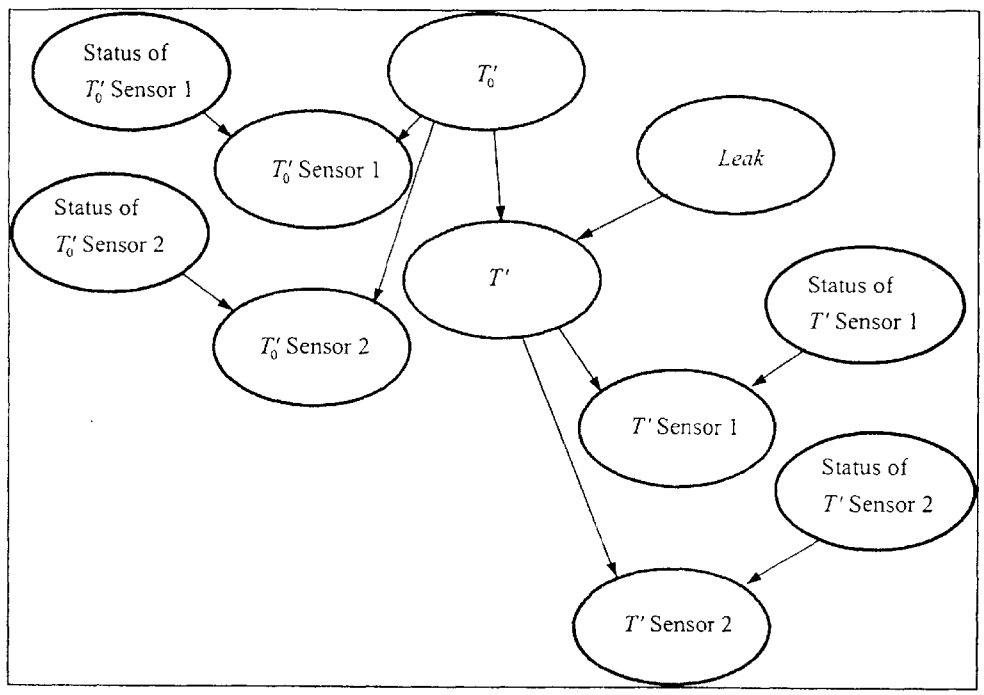
FIG. 14 is a diagram of a BBN representation of an example problem for process fault (leak) detection.

To illustrate the procedure, an adiabatic continuously stirred tank system that does not involve a reaction is assumed having a potential for development of a leak at the tank's inlet. Accordingly, the method of the present invention detects the presence or absence of this leak from the sensory data measuring inlet and outlet temperature. The fault detection also distinguishes between the leak and sensor faults. It also continues to detect, isolate, and accommodate sensor faults even during the presence of such a leak. A BBN of the present invention representing this example is shown in FIG. 14. Because the change in temperature is the only variation occurring, one differential equation characterizes the system. At steady-state, the following equation applies:

$$\frac{q}{V}(T_0' - T') - \frac{UA_r}{\rho C_p V}(T' - T_c') = 0, \tag{28}$$

where the parameters involved have been defined in supra. Keeping all other parameters except T' and $T_0$' constant, Equation 28 is representable as $$T' = k_1 T_0' + k_2, \text{ with} \tag{29}$$

$$k_1 = \frac{\frac{q}{V}}{\frac{UA_r}{\rho C_p V} + \frac{q}{v}}, \text{ and} \tag{30}$$

$$k_2 = \frac{\frac{UA_r}{\rho C_p V}}{\frac{UA_r}{\rho C_p V} + \frac{q}{V}} T_c. \tag{31}$$

Substituting the nominal aforementioned values into Equations 30 and 31, $k_1$=0.6667 and $k_2$=1.1333. Thus, in the absence of any process faults $$T'=0.6667 T_0'+1.1333. \tag{32}$$

This relationship defines the conditional dependence of node T' on its parent node, $T_0$', where both nodes are continuous-valued. Note that this linear relationship does not require linearization.

In this particular example, any process fault can affect $k_1$, $k_2$, or both. For example, a leak in the inlet pipe reduces volumetric flow rate q, and thus affects both $k_1$ and $k_2$. In such a situation, if the teak reduces the flow rate by half its nominal value, the new correlation between T' and $T_0$' in the presence of a leak is $$T'=0.5 T_0'+1.7. \tag{33}$$

If a new discrete-valued node Leak is introduced with two possible values: present and absent, his node is an additional parent for the node T'. Thus, the T' has one continuous-valued parent and one discrete parent The vector β for the conditional probability distribution for T' is, thus, of a single value. If the Equations 32 and 33 are assumed to be accurate, the value of γ will be zero. The conditional probability distribution for this example is represented in Table 8.

Table 8: Representation of the conditional probability distribution for the node T'. The quantities α, β, and γ are used to define Equation 11. They are functions of the value of the discrete-valued parent node Leak. The vector β defines the linear dependence on the continuous-valued parent node $T_0$'.

TABLE 8

|  | Leak = present | Leak = absent |
|---|---|---|
| α(= $k_2$) | 1.7 | 1.1333 |
| β(= $k_1$) | [0.5] | [0.6667] |
| γ | 0 | 0 |

During initialization and evidence propagation, P(Leak=present) and P(Leak=absent) affect which model is given more weight by the BBN to interpret given data. For example, if P(Leak=absent) is dose to 1.0, the network validates sensor readings with respect to the parameters $k_1$=0.6667 and $k_2$=1.1333. The sensor-reading evidence, in turn, validates or invalidates this model via affecting the posterior probabilities for the node Leak. These posterior probabilities are carried over to the next time step as known probabilities, and thus experience about the validity of the model is carried over to the next time step in the same fashion as the sensor status. For example, if a leak is introduced in the simulation, P(Leak=present) gradually increases over subsequent time steps and causes the BBN to make the transition to the parameters $k_1$=0.5 and $k_2$=1.7.

Figure 15:
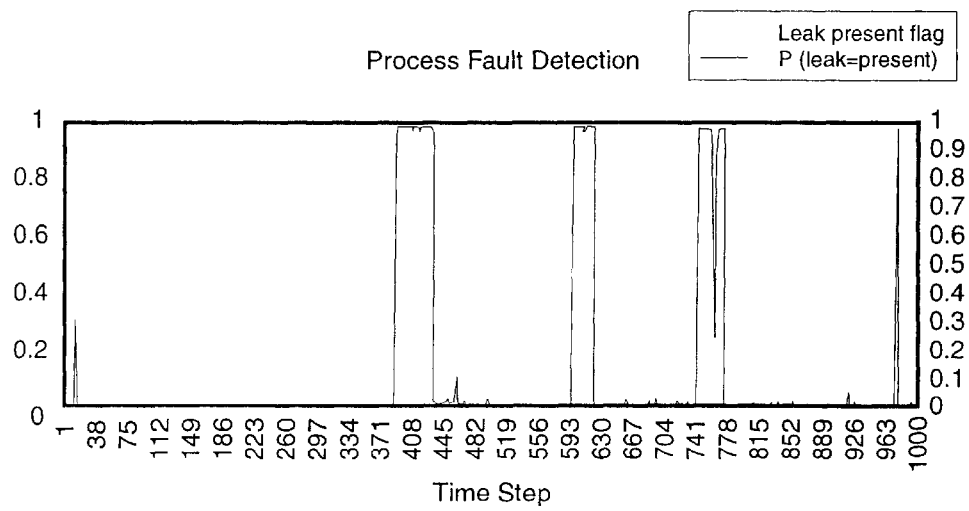
FIG. 15 is a plot of occurrence and detection of a leak over 1000 time steps, corresponding to FIG. 14.
Figure 16:
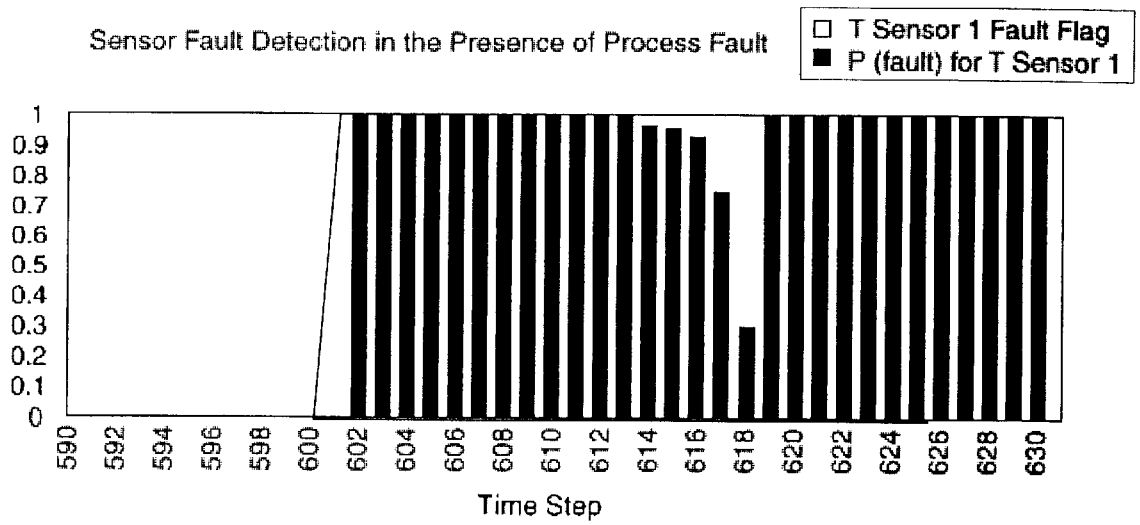
FIG. 16 is a plot of a magnified view of a portion of the plot of FIG. 15, covering time steps 590 through 630.

For purposes of numerical experimentation, a CSTR simulator, written in VISUAL Ca++™ was used while HUGIN™, API's library routines (HUGIN API version 3.0 Reference Manual, version 2.0 (1995)), provided the means of constructing and manipulating a BBN as VISUAL C++™ functions. This scheme established communication between the simulator and the BBN. Numerical experimentation demonstrates that, initially, the process behaves in a normal mode. For example, a leak in the inlet stream is introduced into and removed from the simulation randomly. In addition, sensor noise and faults are simulated as in the previous cases. For simplicity, only one type of faulty sensor operation is considered. Leak and sensor fault(s) can occur simultaneously. Presence of a leak is detected by monitoring the updated probabilities of the Leak node. The CSTR simulator uses a "Leak present" flag, which is equal to 0 when leak is absent and 1 when leak is present. As seen from FIG. 15, a leak occurred six times in a span of 1000 time steps, and was promptly detected by the BBN. FIG. 16 shows a magnified view of time steps 590 through 630. Upon occurrence of a leak, P(Leak=present) progressively increases over a span of a few time steps. The same is true for the period immediately after the repair of the leak.

Figure 17:
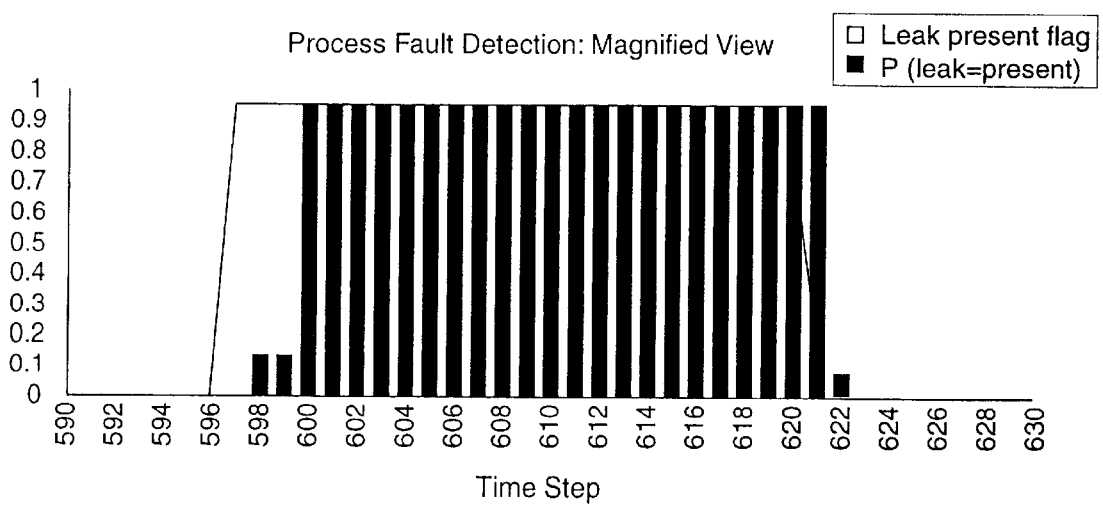
FIG. 17 is a plot, corresponding to the plot in FIG. 16, showing detection of simultaneous occurrence of process and sensor faults (time steps 600 through 620)

BBNs of the present invention are capable of detecting and accommodating sensor faults even during the presence of a process fault as shown in FIG. 17. In the foregoing example, a "Sensor fault flag" is set to one by the simulator when a sensor develops a flag. Sensor 1 measuring the outlet temperature, corresponding to node T' Sensor 1, develops a fault at time step 601. It is detected and isolated at time step 602.

Figure 18:
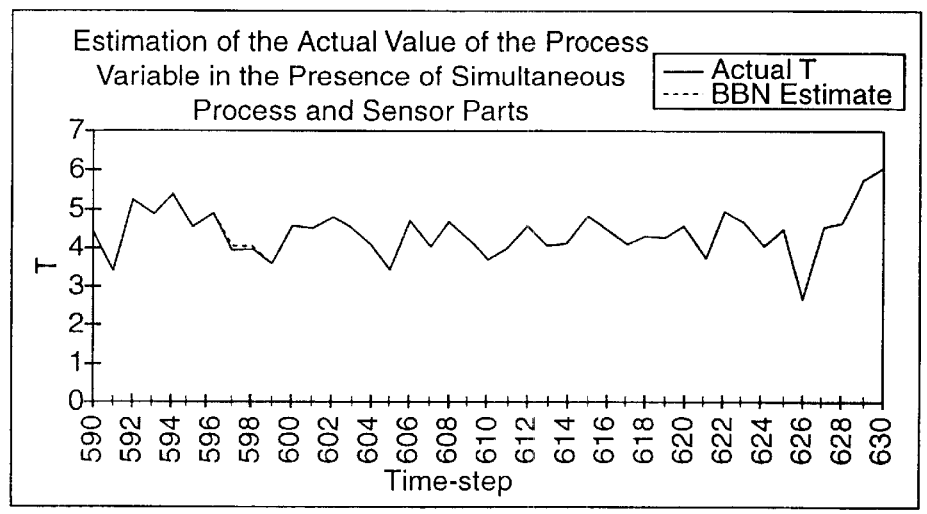
FIG. 18 is a plot of process variable estimation via integrated sensor and process fault accommodation.

The network is expected to provide accurate estimates of all process variables, even after the occurrence of process or sensor faults. Even during the presence of a leak and a fault in one of its sensors measuring outlet temperature, the BBN estimate remains faithful to the actual value of the variable as shown in FIG. 18.

BBNs in Series to Represent Connected Equipment

In many industrial processes, at least one CSTR comprises part of a system. For example, a CSTR may be linked to a heater at the inlet end and a separator at the outlet end, and these units in turn are attached to several other units. The entire assembly forms a part of the plant or laboratory setup. Such linked units are representable as a layered BBN with appropriate links between models representing different units.

Figure 19:
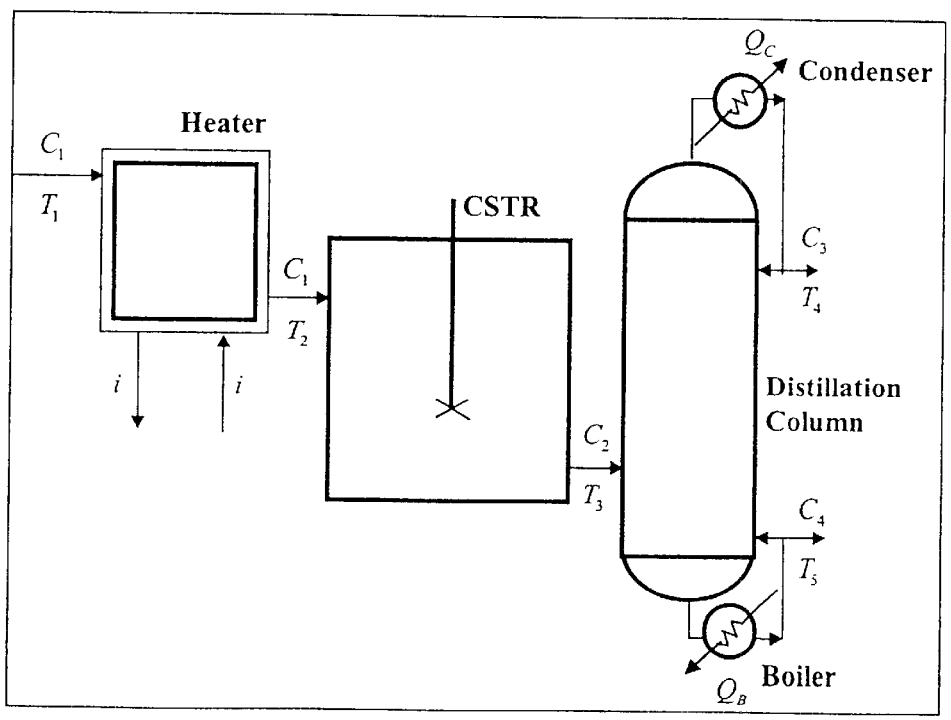
FIG. 19 is a diagram of an example flowsheet representing an assembly of an electrical heater, a CSTR, and a distillation column along with a boiler and a condenser.

A flowsheet is a typical starting point for construction of such a BBN. FIG. 19 shows a part of an example flowsheet involving an electrical heater, a CSTR, and a distillation column in series. The heater increases the temperature of the process stream from $T_1$ to $T_2$ using current i. The heated process fluid is passed on to a CSTR, where an exothermic reaction takes place. As a result, the reactant concentration of the process fluid drops from $C_1$ to $C_2$, and its temperature increases from $T_2$ to $T_3$. The resultant process fluid then enters a distillation column assembly consisting of a distillation column, a boiler, and a condenser. The purpose of the distillation column is to separate the reactant from the product. Depending on the boiling points of reactant and product, the upper cut (reactant concentration $C_3$ and temperature $T_4$) or the lower cut (reactant concentration $C_4$ and temperature $T_5$) is reactant-rich and the other cut is product-rich. The heat loads of the boiler and the condenser, $Q_B$ and $Q_C$, are the additional variables involved.

Figure 20:
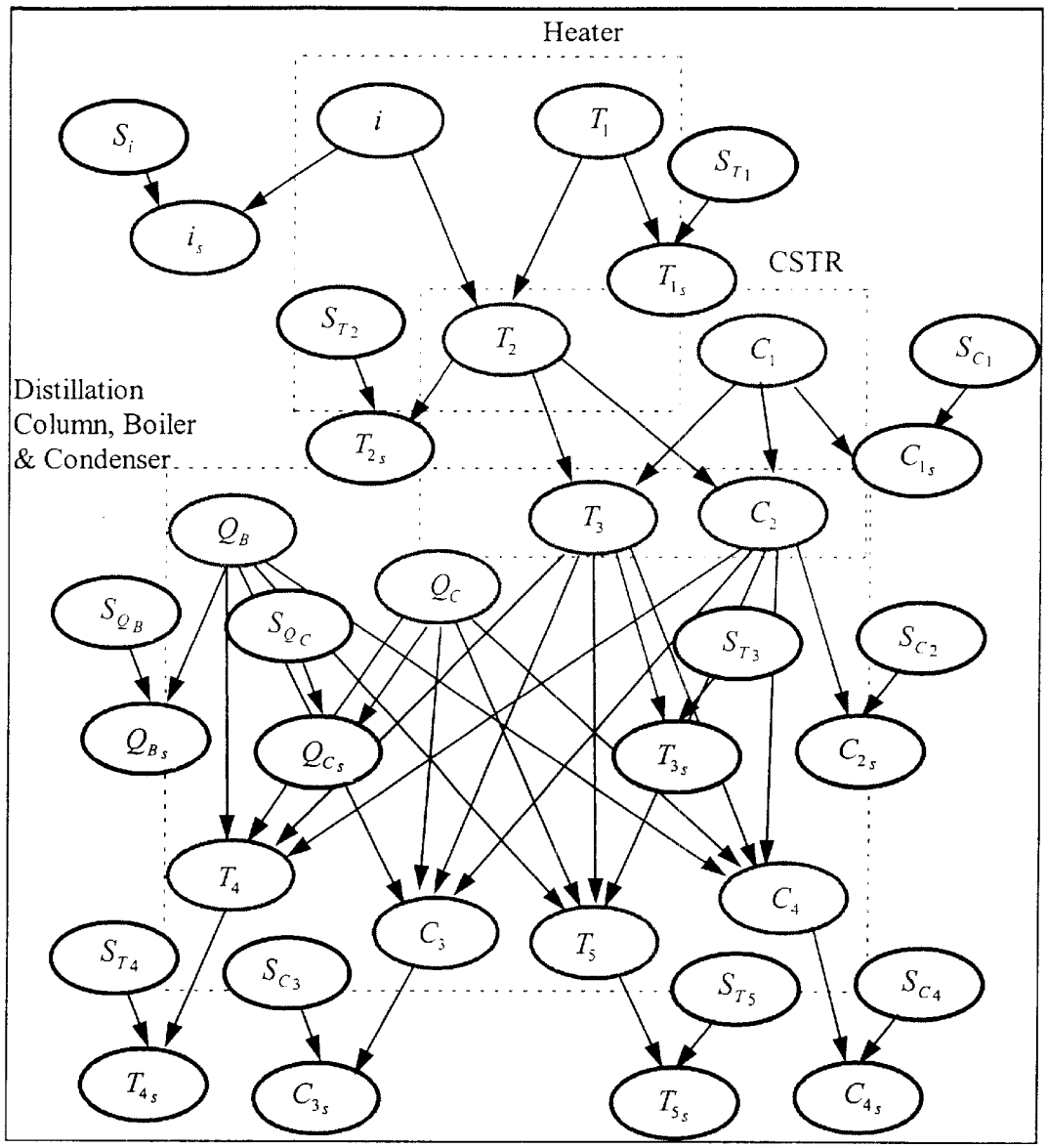
FIG. 20 is a diagram of a BBN representation of the flowsheet diagram of FIG. 19.

A BBN, of the present invention, model of the flowsheet in FIG. 19 is constructed, for example, by first constructing Bayesian models for the individual components of the system, i.e., the heater, CSTR, and the distillation assembly. These are enclosed in the dashed boxes in FIG. 20. Because the distillation assembly involves recycling, its three subcomponents—the distillation tower, the boiler, and the condenser—are modeled together. The Bayesian models for individual components are then linked such that children process-variable nodes of one BBN model form the root nodes of the other model. For example, the electrical heater and the CSTR share the node for process-variable $T_2$ in such fashion. Sensor-reading and sensor-status nodes are attached to the corresponding process-variable node as in previous examples, supra. This BBN takes advantage of the information available from the readings of sensors belonging to different components of a process.

The above development shows the feasibility of BBN-based integrated process and sensor fault detection for the complete process consisting of several pieces of equipment. Optimization and control related decisions for such connected equipment are often inter-related. A composite BBN for the entire flowsheet is one manner of providing a common platform for modeling of such relationships for the purpose of sensor and process fault detection and hence has a broader scope. As shown, Bayesian models for connected equipment are constructed individually and then connected together. In many instances, BBN models according to the present invention, for commonly occurring components such as pumps and heaters, are constructed only once and used repeatedly. This object-oriented functionality further enhances the utility of the present invention's BBN approach.

Dynamic SFDIA Using BBN Approach

BBNs of the present invention also extend to dynamic (i.e., unsteady-state) conditions. A dynamic BBN also comprises process-variable, sensor-reading, and sensor-status nodes. Sensor-reading nodes are linked with sensor-status nodes and process-variable nodes as in examples supra. A difference between dynamic and steady-state BBNs lies in the representations of the process model, which consist of the links and associated conditional probability distributions among the process-variable nodes. Similar to development of a steady-state case, a discrete model is analyzed. Two different BBN-based schemes for continuous-valued representations of unsteady-state SFDIA are provided herein. These schemes comprise at least one analytical process model and/or artificial neural networks.

Dynamic BBN Using Discrete Representation

Discrete representation has disadvantages of required approximations involved during the discretization of the process model as well as sensor readings and errors. On the other hand, the process model need not be linear, as is the case with the continuous representation, and the probability distributions are not restricted to Gaussian. As a result, a discrete representation has a simpler structure and it retains the transparency and intuitive appeal that are the main advantages of a Bayesian representation. For a state-space representation of a dynamic process model, the rate of change of state is usually defined as a function of the input and the present state of the system. For an example of such a system, $\vec{X}(k)$, the state vector at time step k, and $\vec{u}(k)$ represent the input while the resulting rate of change of state vector is $$\dot{\vec{X}}(k) = f(\vec{X}(k), \vec{u}(k)). \qquad (34)$$

A Bayesian representation of this relationship involves a node for each of the variables in $\vec{X}(k)$ and $\vec{u}(k)$. These are process-variable nodes similar to those of a steady-state case. In addition, new nodes are induced to represent $\vec{X}(k+1)$. These nodes are called the "new-process-variable" nodes. All the process variables occur only on the RHS of Equation 34. Hence, unlike the steady-state case, all process-variable nodes are root nodes. In general, each new-process-variable node has all of the process-variable nodes as its parents.

For example, a BBN of the present invention is applicable to a draining tank. In this example, dynamic behavior of the system is characterized by the equation $$dh/dt(k) = f(q_i(k), h(k)) = \psi q_i(k) - \xi \sqrt{h(k)}, \quad (35)$$

where terms are defined supra while further definitions are given in H. B. "Sensor Fault Detection, Isolation, and Accommodation Using Neural Networks, Fuzzy Logic, and Bayesian Belief Networks," M. S. Thesis, University of New Mexico, Albuquerque, N.M., August 1997, which is incorporated herein by reference. Hence, the state vector is $\vec{X}(k) = \{h(k)\}$ and the input is $\vec{u}(k) = \{q_i(k)\}$.

$$h(k+1) = f_1(q_i(k), h(k)) = h(k) + \Delta t \cdot (\psi q_i(k) - \xi \sqrt{h(k)}) \quad (36)$$

Figure 21:
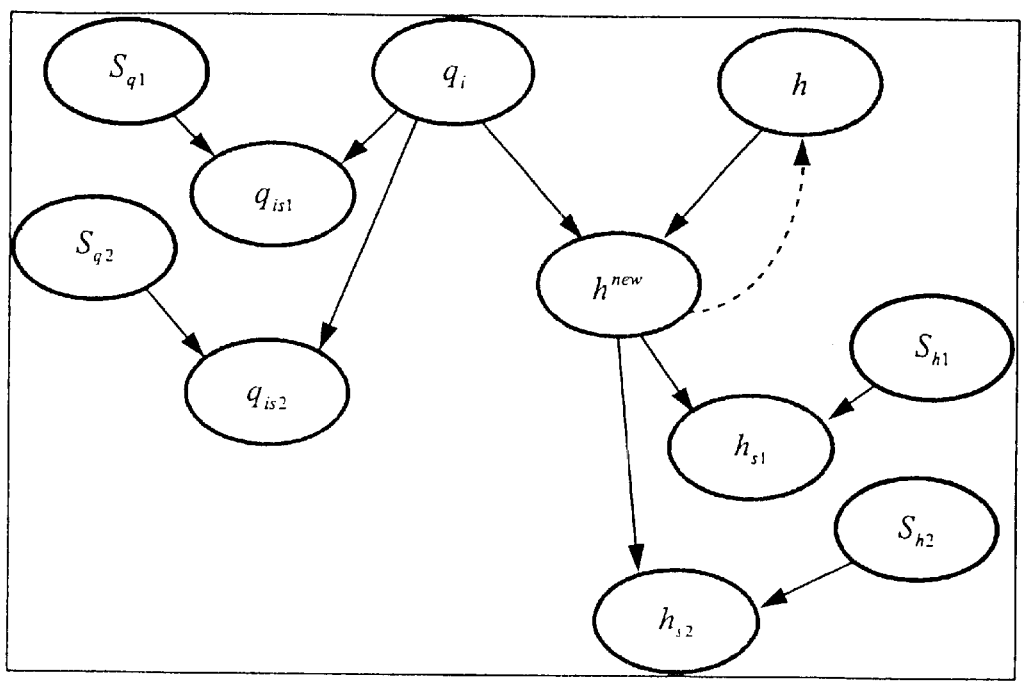
FIG. 21 is a diagram of the discrete BBN representation of a draining tank problem.

There is one node each for $h(k)$ and $q_i(k)$. These two are the process-variable nodes. In addition, there is a node to represent $h(k+1)$; referred to as $h^{new}$. This is the single new-process-variable type of node required for this system. Because values of $h(k)$ and $q_i(k)$ affect the value of $h(k+1)$, nodes h and $q_i$ form the parents for the node $h^{new}$, as shown in FIG. 21. For the case of two sensors for each variable, the sensor-reading nodes $q_{is1}$ and $q_{is2}$ represent the readings at time step k of sensors measuring $q_i$. The sensor-status nodes $S_{q1}$ and $S_{q2}$ represent the status of these sensors. Sensor-reading nodes $h_{s1}$ and $h_{s2}$ represent the readings at time step k+1 of the sensors measuring h. The status of these sensors are represented by nodes $S_{h1}$ and $S_{h2}$.

Discretization of Process Model and Sensor Faults

Upon identification of nodes in the network, the function $f_1$ (Equation 36) is represented in a discrete form. This is achieved in, for example, the following five steps:

1. A range is defined for each process variable. For the example of a draining tank, the dimensionless inlet flow and the liquid level are defined within the limits of 0 and 1.0.
2. Each variable is discretized within its range. The entire range is divisible into equal or unequal windows, slots or "bins". For example, both h and $q_i$ are divided into 10 equal bins as in Table 9. Bins for $h^{new}$ are the same as those for h.
3. For each possible combination of parents, a large number of samples is generated. For example, a total of 100 combinations are possible for the values of the parents h and $q_i$ of the node $h^{new}$. For the combination of bin 3 of h and bin 4 of $q_i$, a 1000 sample points were generated such that $0.3 \leq h < 0.4$ and $0.4 \leq q_i < 0.5$. The function $f_1$ (Equation 30) is then applied to all samples to generate 1000 values of $h^{new}$ corresponding to this combination of bins.
4. Using Table 9, these 1000 values of $h^{new}$ are discretized into bins. The number of points in each bin, which can range from 0 to 1000, is counted. The entries in the conditional probability table of the node $h^{new}$ corresponding to this example combination of its parents are then approximated, for example, as the number of points in each bin divided by 1000.
5. Steps 3 and 4 are repeated for all 100 combinations of the parent nodes.

Similar to the above discretization of the process model, discrete conditional probability tables for sensor-reading nodes are obtainable. Each sensor-status node has four possible values: normal, bias, precision degradation, and complete failure. Along with the 10 possible values or bins for the process-variable nodes, there are 40 possible combinations of the values of the parent nodes for a sensor-reading node. Sensor readings are generated using the general model of sensor faults and discretized using an algorithm similar to the steps 1–5 above. A part of the probability table corresponding to bin 4 of the process-variable node is provided in Table 10 as an example. In normal mode, the sensor error has low mean as well as standard deviation. Hence, the most probable value for the sensor reading in the normal mode of sensor operation is bin 4. The probabilities of bin 3 and 5 show the low standard deviation of sensor error in its normal mode. For a bias of one bin size, i.e., 0.1, the most probable value for the sensor reading is now bin 5, again with a low spread in bins 4 and 6. In precision degradation mode, the most probable bin is bin 4, showing the zero mean of the sensor error. The spread of the distribution is increased in precision degradation mode, representing large standard deviation of the sensor error. For complete failure with a constant reading corresponding to bin 7, the sensor-reading probability distribution peaks at bin 7. This value is independent of the value of the parent process variable bin. In general, if the value of the process-variable is bin x, the distribution of the sensor-reading node is distributed around bin x for normal and precision degradation mode and bin x+b for the bias mode, where b is the magnitude of bias in terms of bin width.

Table 9: Discretization of process variables h and $q_i$.

TABLE 9

| Bin Number | Range |
|---|---|
| 0 | [0,0.1) |
| 1 | [0.1,0.2) |
| 2 | [0.2,0.3) |
| 3 | [0.3,0.4) |
| 4 | [0.4,0.5) |
| 5 | [0.5,0.6) |
| 6 | [0.6,0.7) |
| 7 | [0.7,0.8) |
| 8 | [0.8,0.9) |
| 9 | [0.9,1.0] |

Table 10: Part of the conditional probability table for a sensor-reading node. Bin No.4 is selected for the process variable node. Probabilities of the sensor-reading node taking any of its possible values, given the value of the sensor-status, are provided.

TABLE 10

| Sensor-reading bin | Sensor Status | | | |
|---|---|---|---|---|
| | Normal | Bias | Precision Degradation | Complete Failure |
| 0 | 0.0 | 0.0 | 0.0669 | 0.0 |
| 1 | 0.0 | 0.0 | 0.0659 | 0.0 |
| 2 | 0.003 | 0.0 | 0.104 | 0.0 |
| 3 | 0.132 | 0.0 | 0.146 | 0.0 |
| 4 | 0.739 | 0.132 | 0.188 | 0.0 |
| 5 | 0.126 | 0.754 | 0.171 | 0.0 |
| 6 | 0.0 | 0.114 | 0.127 | 0.055 |
| 7 | 0.0 | 0.0 | 0.0699 | 0.881 |

TABLE 10-continued

| Sensor-reading bin | Sensor Status | | | |
|---|---|---|---|---|
| | Normal | Bias | Precision Degradation | Complete Failure |
| 8 | 0.0 | 0.0 | 0.046 | 0.064 |
| 9 | 0.0 | 0.0 | 0.015 | 0.0 |

Dynamic Relationships Between New and Current Process-Variable Nodes

The likelihood for the node h is assumed at k=0 and for each time step, sensor-reading nodes and the node h provide evidence to the BBN. Nodes $q_i$, $h^{new}$ and the sensor-status nodes are uninstantiated and their probability distributions are updated due to the presented evidence. Updated distributions of nodes $q_i$ and $h^{new}$ reflect the reconciled estimates of $q_i(k)$ and $h(k+1)$, respectively. Monitoring updated distributions of nodes $q_{is1}$ and $q_{is2}$ assists the detection of faults in the sensors measuring the inlet flow-rate at time k. Similarly, the status of the sensors for fluid level at time step k+1 is inferred, for example, by monitoring the updated distributions of the nodes $h_{s1}$ and $h_{s2}$. At time steps subsequent to k=0, updated distribution for the $h^{new}$ node is used as likelihood-type of finding for the node h at the next time step. This cyde is thus continued.

Simulation Results

The draining tank simulation was performed similar to previously mentioned cases, supra. Two sensors were used to measure the fluid level and the inlet flow rate. The inlet flow rate was subjected to random step-changes. Sensor noise and faults were simulated as Gaussian random numbers. Simulated sensor readings were provided as input to the BBN by instantiation of the corresponding sensor-reading nodes.

After evidence propagation, the expected values for inlet flow-rate and liquid level were calculated using the updated probability distributions of the corresponding nodes as given by $$q_i^{BBN}(k) = \sum_{bin=0}^{9} \bar{q}_i(bin) \cdot P(q_i = bin) \quad (37)$$

$$h^{BBN}(k+1) = \sum_{bin=0}^{9} \bar{h}(bin) \cdot P(h^{new} = bin), \quad (38)$$

where $\bar{q}_i(bin)$ and $\bar{h}(bin)$ are the average values of $q_i$ and $h^{new}$, respectively. For example, according to Table 9, average value for bin=4 is 0.45 for both $q_i$ and $h^{new}$. $P(q_i)$ and $P(h^{new})$, are, respectively, the updated distributions for nodes $q_i$ and $h^{new}$. The values $q_i^{BBN}(k)$ and $h^{BBN}(k+1)$ are the BBN estimates of $q_i(k)$ and $h(k+1)$ as a result of fault accommodation.

Figure 22:
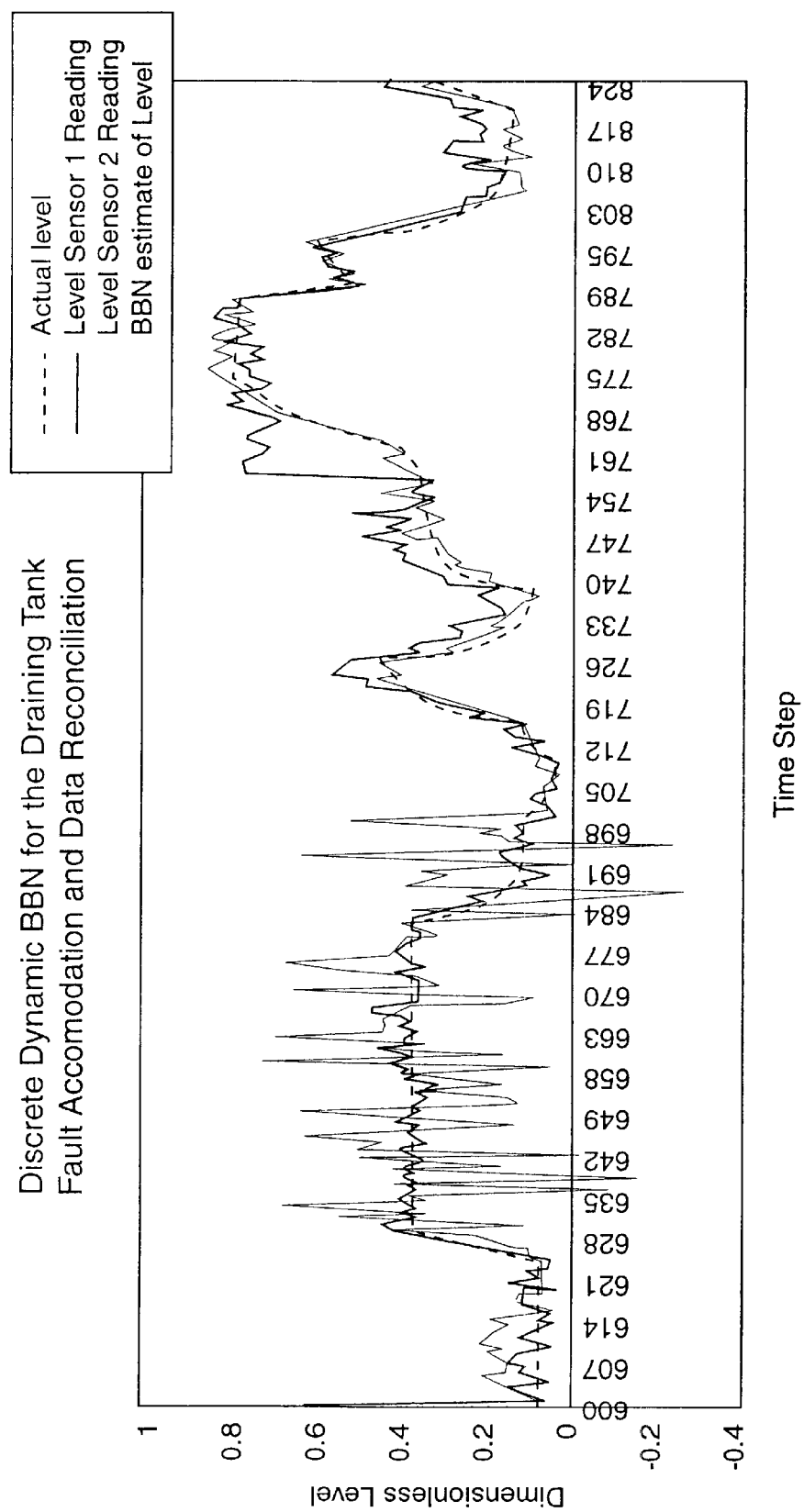
FIG. 22 is a plot of sensor readings and a BBN estimate compared to actual values for liquid level in a discrete dynamic BBN.
Figure 23:
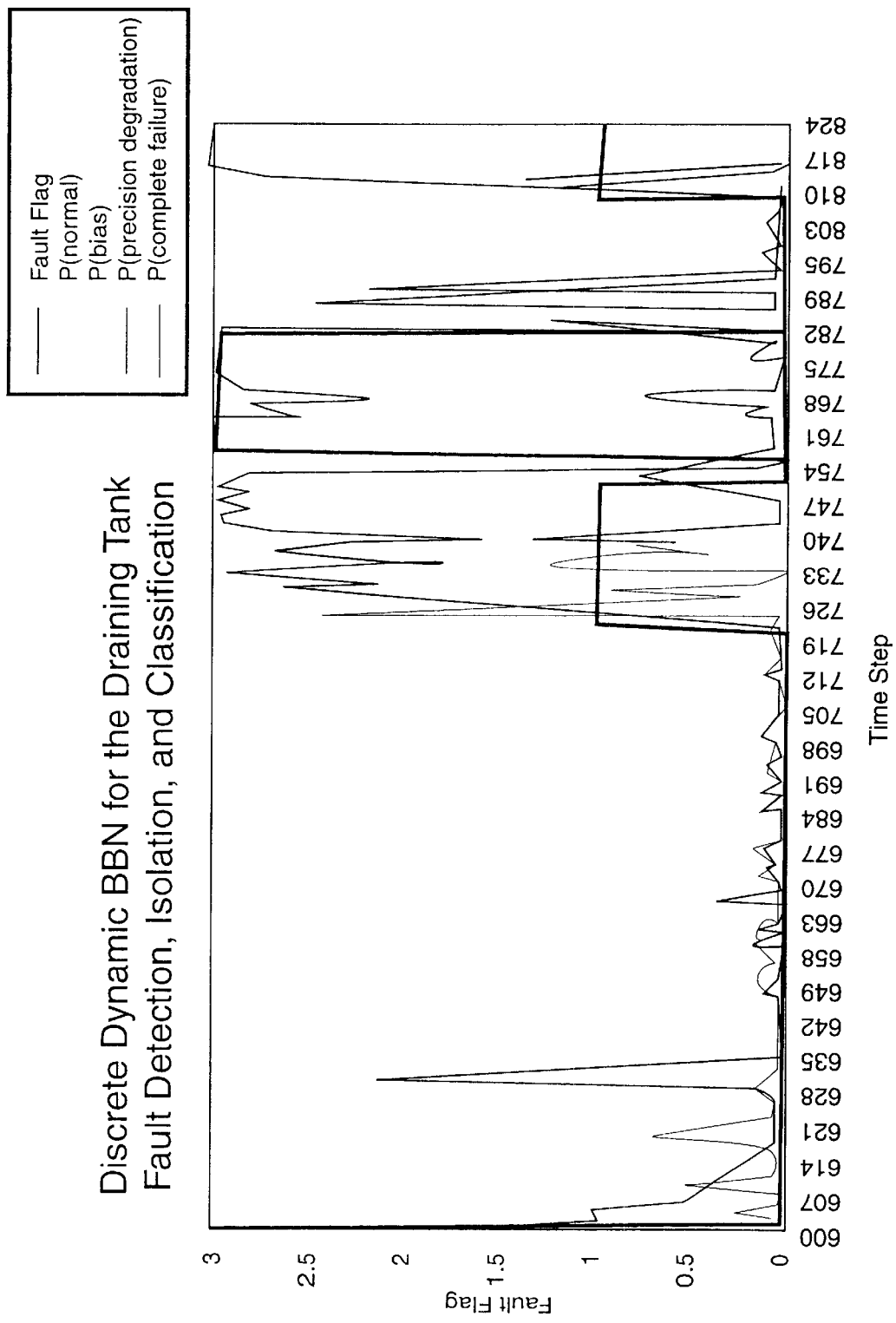
FIG. 23 is a plot of sensor fault flag and probability values corresponding to a discrete dynamic BBN.

The plots in FIG. 22 and FIG. 23 show a window from time step 600 to time step 825. This period involves the following randomly introduced and removed faults in the two level sensors:

1. A bias in sensor 2 from time step 604 to 615;
2. A precision degradation in sensor 2 from time step 631 to 702;
3. A bias in sensor 1 from time step 723 to 752;
4. A complete failure of sensor 1 from time step 759 to 782; and
5. A bias in sensor 1 from time step 811 onwards.

A "fault flag" is an internal representation of the actual sensor status used by the simulator. A value 0 of the fault flag for sensor 1 represents the normal operation of sensor 1. Similarly, the values 1, 2, and 3 for the fault flag represent the occurrence of a bias, precision degradation, and complete failure, respectively. The above-listed occurrences of introduction and removal of faults in sensor 1 can be seen from the comparison of sensor readings to actual values as seen in FIG. 22, and also from the sensor 1 fault flag in FIG. 23. FIG. 23 shows that on the onset of sensor fault, P(normal) (i.e., the probability of the sensor being in the normal state) falls and the probability of the corresponding fault type rises. For example, at time step 723, sensor 1 fault flag is stepped up to 1. This triggers the simulator to introduce a constant offset (bias) in the readings of sensor 1 which can be observed from time step 723 in FIG. 22. The BBN detects this offset, which is reflected in the fall of P(normal) and progressive rise of P(bias) that reaches a value dose to 1.0 at time step 735. This shows that the network is correctly able to detect the occurrence of a fault, isolate the faulty sensor, and classify the fault type. FIG. 22 shows that the BBN estimate of the liquid level in the tank remains close to the actual level in spite of the fault. Thus, the BBN achieves the goals of fault accommodation as well as fault detection, isolation, and classification.

Dynamic BBN Using Continuous-Valued Representation

The present invention encompasses two possible schemes for incorporating an unsteady-state in a continuous-valued BBN. In both schemes, sensor-status nodes are discrete in nature whereas the process-variable and sensor-reading nodes are continuous-valued, as was the case in the steady-state analysis.

Observer-Based Scheme

An observer is used in conjunction with the BBN to provide an estimate of each of the state variables. This estimate forms a parent node—referred to as the "estimate" node—of the corresponding process-variable node. Evidence is propagated and updated values of the sensor-status nodes result in sensor fault detection. Means of the updated distributions of the process-variable nodes are subjected to the observer, which provides estimates of the state-vector at the next time step. These estimates are used to instantiate the estimate nodes, and this cycle is repeated.

Consider the example of the draining tank system. A continuous-valued BBN corresponding to this system is presented in FIG. 24. Function $f_1$, as defined in Equation 36, is useful by an observer to provide an estimate $\hat{h}$ of h. Because the true values of $h(k-1)$ and $q_i(k-1)$ are not known, the observer uses the corresponding estimates of the BBN, i.e., the updated means of the nodes h and $q_i$, respectively, at the previous time step. These BBN estimates are referred to as $h^{BBN}(k-1)$ and $q_i^{BBW}(k-1)$, respectively. Therefore, $$\hat{h}(k) = f_1(h^{BBN}(k-1), q_i^{BBN}(k-1)). \quad (39)$$

This value $\hat{h}(k)$ is used to instantiate node $\hat{h}$ at time step k. Sensor readings are used to instantiate the corresponding sensor-reading nodes. This evidence is propagated and the distributions for the sensor-status nodes and the nodes $q_i$ and h are updated. The updated means of nodes $q_i$ and h, i.e., $q_i^{BBN}(k)$ and $h^{BBN}(k)$, respectively, are then provided to the observer to calculate the estimate $\hat{h}(k+1)$. This cycle is then repeated.

Figure 24:
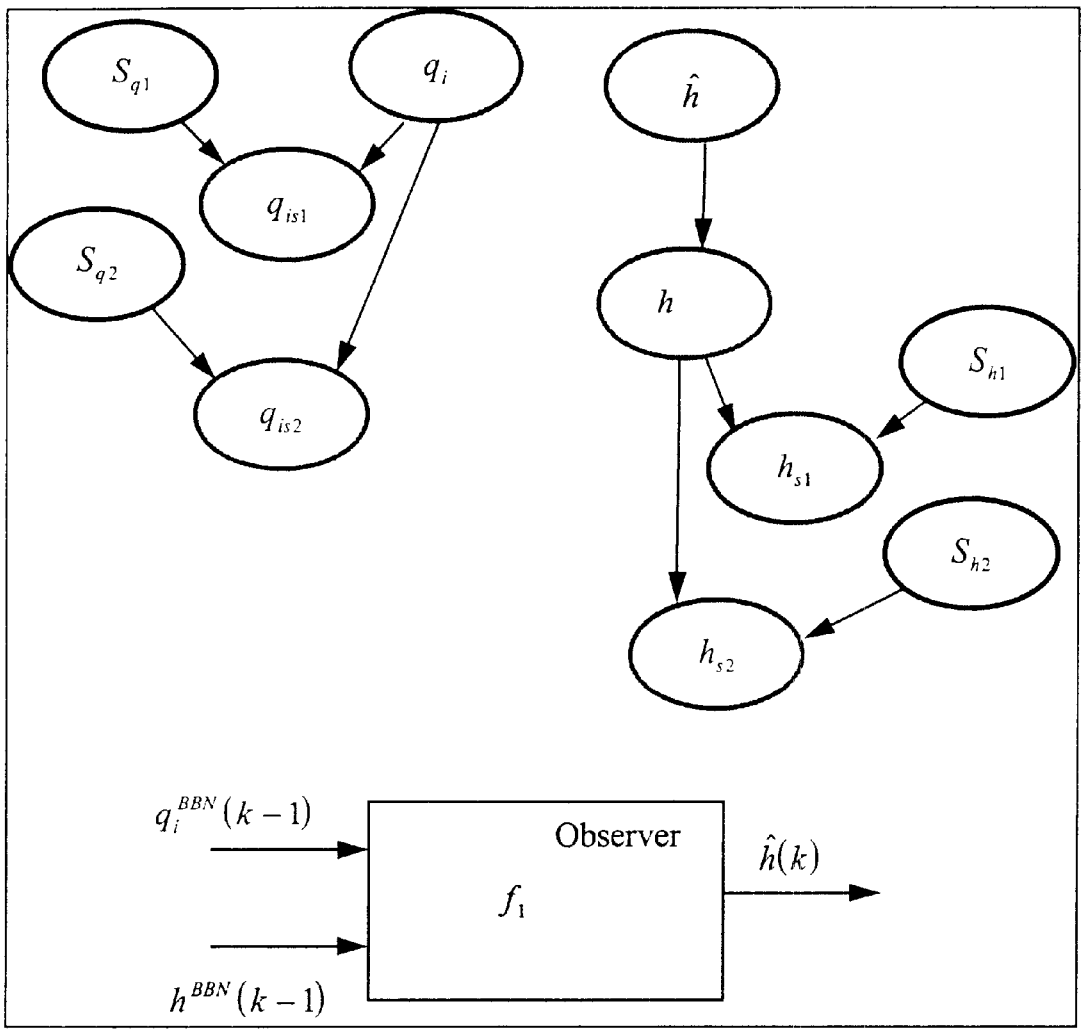
FIG. 24 is a diagram of a dynamic, continuous-valued BBN for a draining tank system.

FIG. 24 shows that the BBN implementing this scheme is divided in two parts that do not share any nodes or links. One part of the BBN deals with the input process variable $q_i$, sensors $q_{is1}$ and $q_{is2}$ that measure $q_i$, and sensor-status nodes $S_{q1}$ and $S_{q2}$ associated with these sensors. The other part concerns the state variable h, its sensors, i.e., $h_{s1}$ and $h_{s2}$, and the associated sensor-status, i.e., $S_{h1}$, and $S_{h2}$. The value of node $\hat{h}$ represents the observer estimate at the previous time step.

Figure 25:
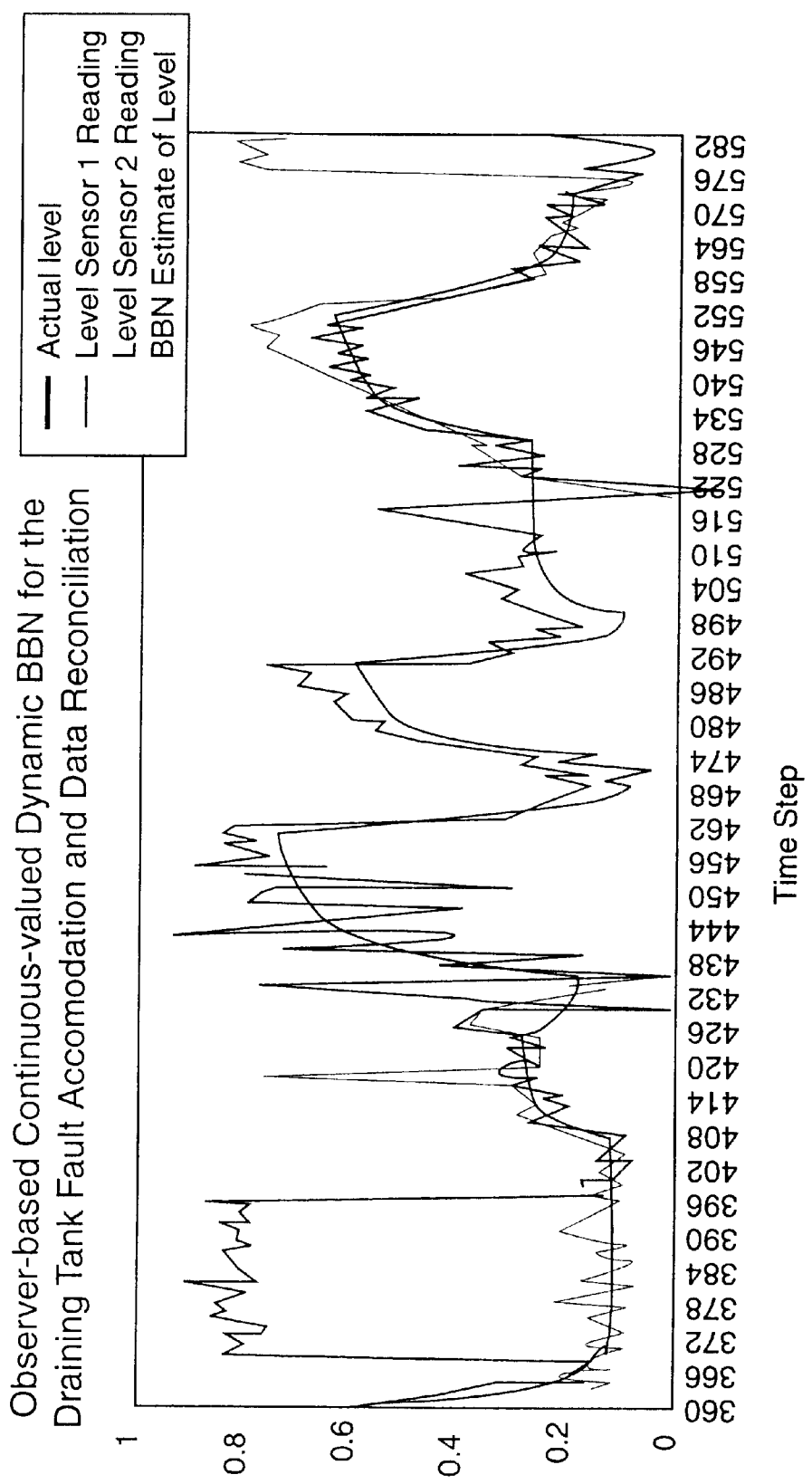
FIG. 25 is a plot of fault accommodation performance of an observer-based continuous-valued dynamic BBN system.
Figure 26:
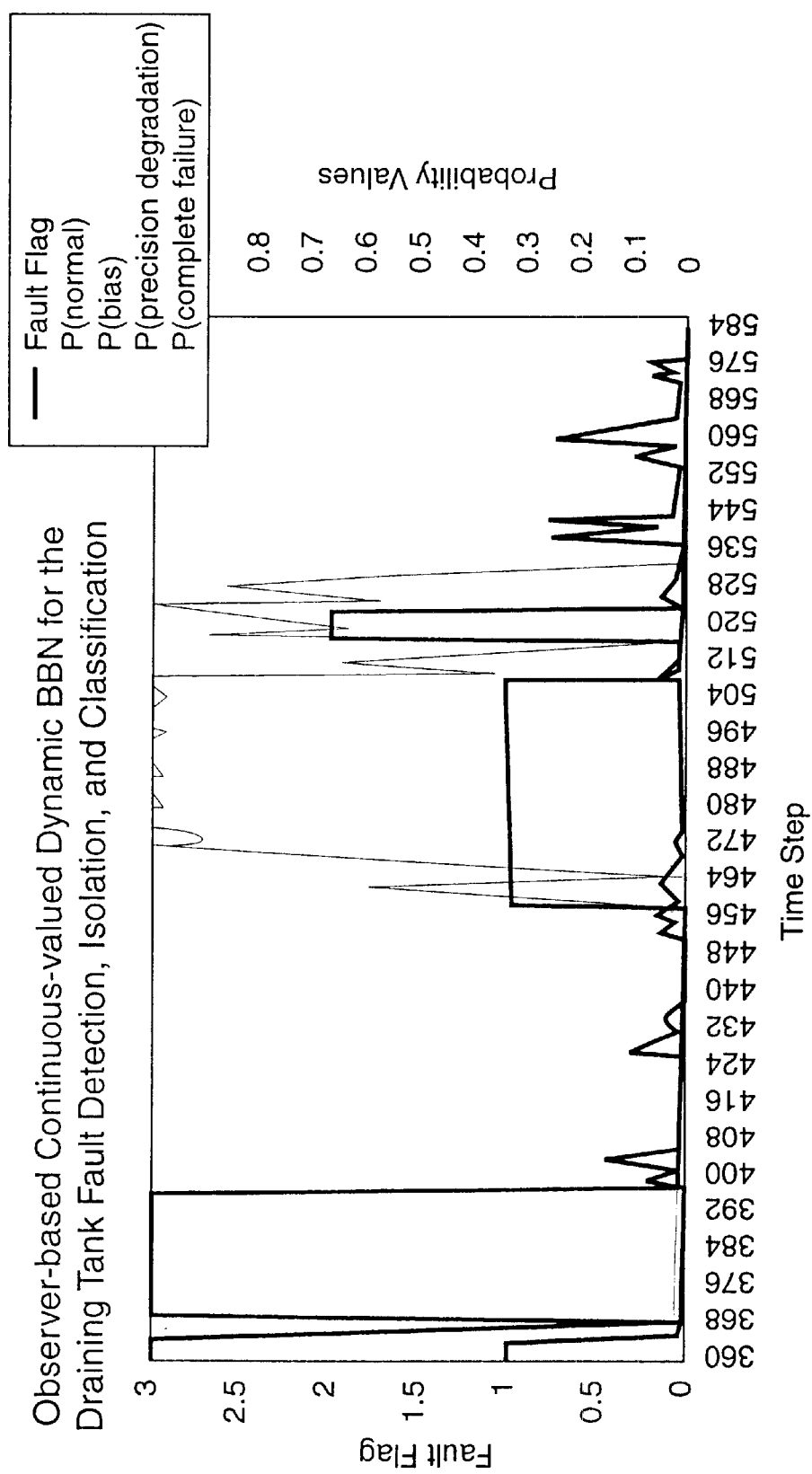
FIG. 26 is a plot of fault detection, isolation, and classification via an observer-based continuous-valued dynamic BBN system.

This network is solely dependent on hardware redundancy of SFDIA related to the input process variables, such as $q_i$ in this example. Simulation was carried out for the draining tank using the same parameters as those used previously. FIG. 25 and FIG. 26 show the capability of this network to detect, isolate, and classify faults as well as perform fault accommodation for the level sensors. In the results presented in FIG. 25 and FIG. 26, normal operation for the two sensors for $q_i$ is assumed.

This BBN of the present invention has an analytical representation of sensor noise and faults that is more flexible when compared to a representation used by the discrete structure. On the other hand, the following are some of its restrictions.

1. The BBN cannot draw any probabilistic inference about the accuracy of the observer estimate because it is external to the BBN and the process of message-passing and inference propagation is unable to reach and affect the observer.
2. It is divided into a number of smaller parts equal to the number of process variables. There are no links or common nodes between these parts and hence inference drawn in one part can not assist the propagation in the others. Thus, there is loss of information.
3. In the absence of complete hardware redundancy, it is unable to reliably detect, isolate, classify, and accommodate sensor faults in the input variables such as $q_i$.

Linearization-Based Scheme

This continuous-valued scheme attempts to circumvent some of the limitations introduced because of the use of an observer. For developing a continuous-valued Bayesian model for process dynamics, a linearization is necessary in accordance with the evidence propagation scheme for continuous-valued variables. This linearization is with respect to time, unlike the linearization around steady-state presented supra. Consider the following state-space equation:

$$\vec{X}(k) = f(\vec{X}(k), u(k)). \tag{40}$$

In terms of the components of the state-vector $$\frac{dx_i}{dt}(k) = f(x_1(k), x_2(k), \ldots, x_p(k), u_1(k), u_2(k), \ldots, u_q(k)), \tag{41}$$

where p is the number of state variables and q is the number of input variables.

If the function $f$ is nonlinear, it can be linearized as follows:

$$\frac{dx_i}{dt}(k) = \frac{dx_i}{dt}(k-1) + \Delta t \cdot \frac{d^2 x_i}{dt^2}(k-1) \tag{42}$$

$$\frac{x_i(k+1) - x_i(k)}{\Delta t} = \frac{x_i(k) - x_i(k-1)}{\Delta t} + \Delta t \cdot \frac{df}{dt}(k-1) \tag{43}$$

$$x_i(k+1) = 2x_i(k) - x_i(k-1) + \Delta t \cdot \Delta f(k-1) \tag{44}$$

$$= 2x_i(k) - x_i(k-1) + \Delta t \cdot \left( \sum_{l=1}^{p} \left. \frac{\partial f}{\partial x_j} \right|_{k-1} \cdot \Delta x_j + \sum_{m=1}^{q} \left. \frac{\partial f}{\partial u_k} \right|_{k-1} \cdot \Delta u_k \right)$$

$$= x_i(k) \cdot \left( 2 + \Delta t \cdot \left. \frac{\partial f}{\partial x_i} \right|_{k-1} \right) + x_i(k-1) \cdot$$

$$\left( \left( -1 - \Delta t \cdot \left. \frac{\partial f}{\partial x_i} \right|_{k-1} \right) + \sum_{l=1, l \neq i}^{p} \left( \left( x_j(k) \cdot \Delta t \cdot \left. \frac{\partial f}{\partial x_j} \right|_{k-1} \right) \right) + \right.$$

$$\sum_{l=1, l \neq i}^{p} \left( \left( -x_j(k-1) \cdot \Delta t \cdot \left. \frac{\partial f}{\partial x_j} \right|_{k-1} \right) \right) +$$

$$\sum_{m=1}^{q} \left( \left( u_k(k) \cdot \Delta t \cdot \left. \frac{\partial f}{\partial u_k} \right|_{k-1} \right) \right) + \sum_{m=1}^{q} (-u_k(k-1) \cdot \Delta t \cdot$$

$$\left. \frac{\partial f}{\partial u_k} \right|_{k-1} \right)$$

Consider a BBN with the continuous-valued nodes representing the values of $x_1(k), l=1, \ldots, p$; $x_l(k-1), l=1, \ldots, p$; $u_m(k), m=1, \ldots, q$; and $u_m(k-1), m=1, \ldots, q$ as the parents for the continuous-valued node representing $x_l(k+1)$. The partial derivatives in Equation 44 are evaluated at time step k−1, i.e., in terms of the quantities $x_1(k-1), l=1, \ldots, p$ and $u_m(k-1), m=1, \ldots, q$. At time step k, BBN estimates of $x_1(k-1), l=1, \ldots, p$ and $u_m(k-1), m=1, \ldots, q$ are known as the updated means of the nodes representing $x_1(k), l=1, \ldots, p$ and $u_m(k), m=1, \ldots, q$ at the previous time step. Hence, the partial derivatives are calculated and substituted into Equation 44. This equation thus becomes linear in $x_1(k), l=1, \ldots, p$; $x_1(k-1), l=1, \ldots p$; $u_m(k), m=1, \ldots, q$; and $u_m(k-1), m=1, \ldots, q$. The coefficients of these variables are used to define the conditional probabilities of the node $x_l(k+1)$.

Consider the draining tank example system. Applying the above analysis:

$$\frac{dh}{dt}(k) = f(h(k), q_i(k)) = \psi q_i(k) - \xi \sqrt{h(k)} \tag{45}$$

$$\frac{\partial f}{\partial h} = \frac{-\xi}{2\sqrt{h}}, \text{ and } \frac{\partial f}{\partial q_i} = \psi. \tag{46}$$

Substituting in the Equation 44, $$h(k+1) = h(k) \cdot \left( 2 - \frac{\xi \Delta t}{2\sqrt{h(k-1)}} \right) + \tag{47}$$

$$h(k-1) \cdot \left( -1 + \frac{\xi \Delta t}{2\sqrt{h(k-1)}} \right) + q_i(k) \cdot (\psi \Delta t) + q_i(k-1) \cdot (-\psi \Delta t)$$

Figure 27:
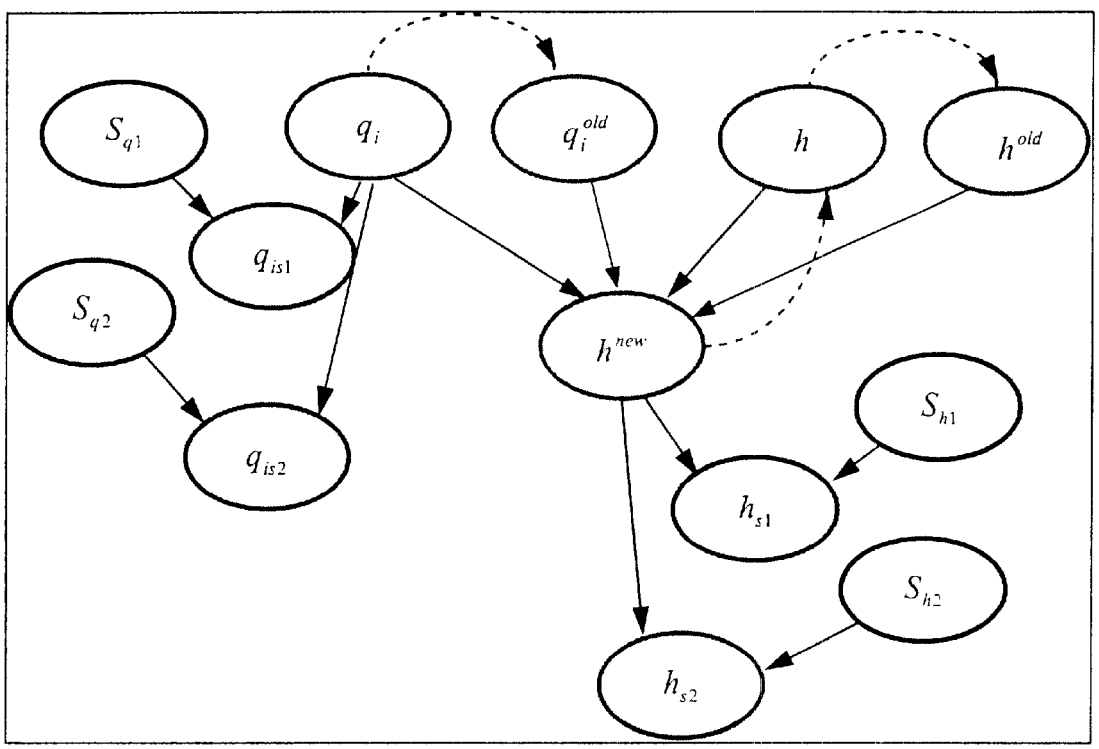
FIG. 27 is a diagram of a linearized-based, continuous-valued, dynamic BBN.

Let the continuous-valued nodes $h^{old}$ and $q_i^{odd}$, as shown in FIG. 27, represent the values $h(k-1)$ and $q_i(k-1)$, respectively. Nodes $h^{new}$, h, and $q_i$ represent the values $h(k+1)$, $h(k)$, and $q_i(k)$, respectively, which are also continuous-valued in this analysis. Based on Equation 47, nodes $h^{old}$, $q_i^{old}$, h, and $q_i$ form the parents of $h^{new}$. Conditional probability distribution for $h^{new}$ gets specified by the coefficients of variables representing the parent nodes in Equation 47.

Although the true value of h(k−1) is unknown, the coefficients can be evaluated in terms of the BBN estimate of this quantity. This is shown in Table 11. This completes the Bayesian representation of the process dynamics of this example.

Table 11: Representation of conditional probability distribution of the node $h^{new}$ in terms of the parameters in Equation 11. Because there are no discrete parents, there is only one set of the values for $\alpha$, $\beta$, and $\gamma$. The elements of column vector $\beta$ correspond to the continuous-valued parent nodes $h^{old}$, $q_i^{old}$, h, and $q_i$, and are obtained from Equation 47. At time step k, the value of $h^{BBN}(k-1)$, i.e., the updated mean of node h at time step k−1, is known. Hence, the elements of $\beta$ are constants, in accordance with the Equation 11.

TABLE 11

| $\alpha$ | 0 |
|---|---|
| $\gamma$ | 0 |
| $\beta$ | $\begin{bmatrix} -1 + \dfrac{\xi \Delta t}{2\sqrt{h^{BBN}(k-1)}} \\ -\psi \Delta t \\ 2 - \dfrac{\xi \Delta t}{2\sqrt{h^{BBN}(k-1)}} \\ \psi \Delta t \end{bmatrix}$ |

Sensor-reading nodes $q_{is1}$ and $q_{is2}$, as well as $h_{s1}$ and $h_{s2}$ are children to nodes $q_i$ and $h^{new}$. At each time step, evidence is available to the BBN via the instantiations of nodes $h^{old}$, $q_i^{old}$, and h, as well as the sensor-reading nodes $q_{is1}$, $q_{is2}$, $h_{s1}$, and $h_2$. The inference scheme updates the probabilities of the sensor-status nodes as well as nodes $q_i$ and $h^{new}$. The updated means of nodes $q_i$ and $h^{new}$ are the estimates of the BBN that reflect the result of fault accommodation and data reconciliation. At the next time step, node $h^{old}$ is instantiated to the value the node h was instantiated to previously. Nodes $q_i^{old}$ and h are instantiated to the updated means of $q_i$ and $h^{new}$ which are the results of the previous propagation. New sensor readings are presented and this cycle is continued.

Figure 28:
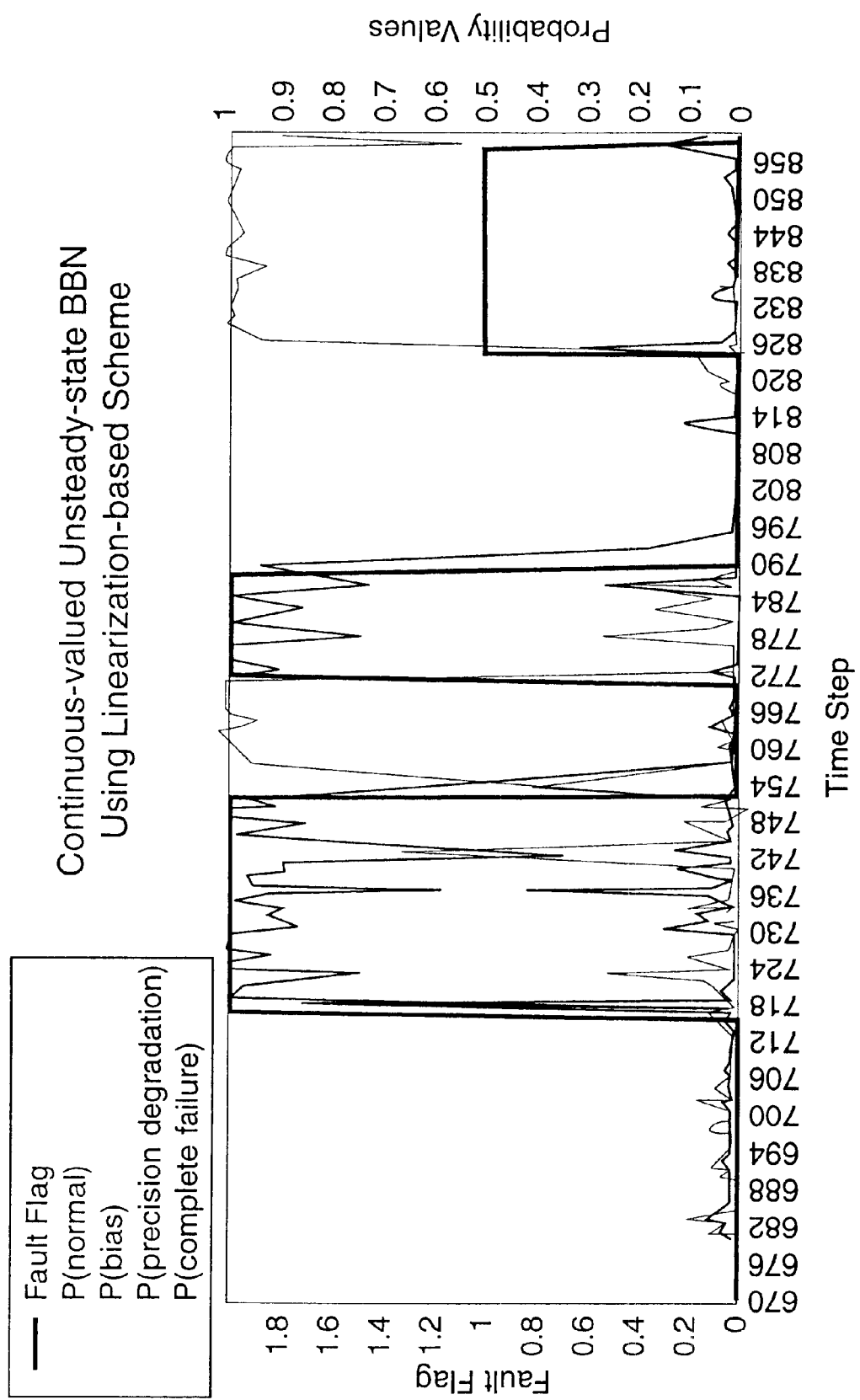
FIG. 28 is a plot of fault detection performance of a linearized-based, continuous-valued, dynamic BBN.

The network in FIG. 27 was subjected to the draining tank simulation system as in the previous sections. FIG. 28 shows the updated probabilities of various fault types for level sensor 1. Upon introduction of fault, the probability of the corresponding state of the sensor status node rises. It is not, however, steadily maintained dose to 1.0. For example, consider time steps 716 through 754 in FIG. 28. The fault flag makes a transition from 0 to 2, and then back to 0, representing an introduction and removal of precision degradation type of fault in level sensor 1. The probability P(precision degradation) rises, as expected, to a value dose to 1.0, and the value of P(normal) drops to a value close to 0.0. The BBN is, however, unable to maintain these values even though the sensor continuous to be in the precision degradation mode. This shows uncertain fault detection, isolation, and dassification.

The advantages of this type of dynamic, continuous-valued BBN are as follows:
1. This network is capable of detecting, isolating, classifying and accommodating the faults in the input variables, and thus is at an advantage when compared with the continuous-valued BBN.
2. It has an analytical representation of the process dynamics as well as the sensor noise and faults that does not require discretization, as was the case with the discrete BBN.

The draw-backs of this BBN are listed below.
1. It is less robust to sensor faults because (a) the underlying process model is based on a linear approximation, and (b) it involves three nodes—$h^{old}$, $q_i^{old}$, and h—from the past instantiations. Hence any erroneous inferences in the past have a larger possibility of corrupting present inference as well. As a result, this BBN has a larger false alarm and misclassification rate.

Exact knowledge of the analytical expressions of the partial derivatives is assumed (Equation 44). This is its draw-back relative to the discrete BBN which constructs its probability tables solely based on data, and assumes no knowledge of a process model.

Augmenting BBNs with Neural Networks

Both the schemes with continuous-valued representation of unsteady-state BBN rely on the availability of a dynamic process model. This dependency restricts the application domain of such schemes to only those processes that have well-defined dynamics. It is extendable by using the robust learning and generalization capabilities of neural networks. Though BBNs are capable of learning, it is localized and can not be used for synthesis of process models.

The following discussion presents application of neural networks in conjunction with the two continuous-valued BBN schemes discussed supra.

IRNN with Observer-Based Continuous-Valued BBN

Figure 29:
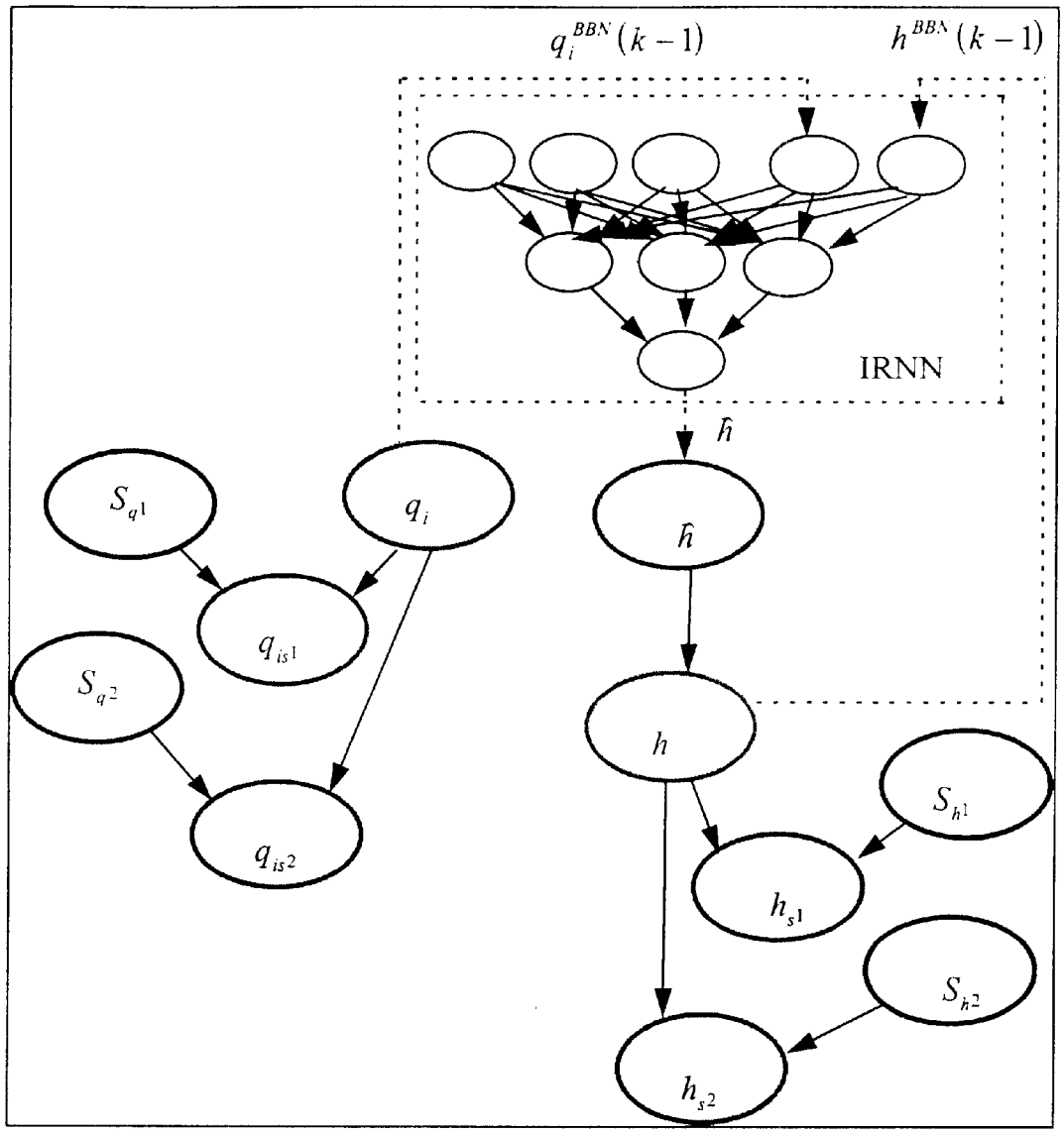
FIG. 29 is a diagram of an IRNN performance system for level prediction.

As was shown supra, an internally recurrent neural network ("IRNN") is efficient for dynamic modeling of a process. An IRNN can, thus, replace an observer in a BBN scheme as already presented. Considering the example of the draining tank, an IRNN equivalent to the observer in FIG. 24 consists of two input nodes and one output node. The number of hidden and context nodes is determined by trial and error to give best results. Once trained, the IRNN can be used along with a BBN. This setup is shown in FIG. 29.

Figure 30:
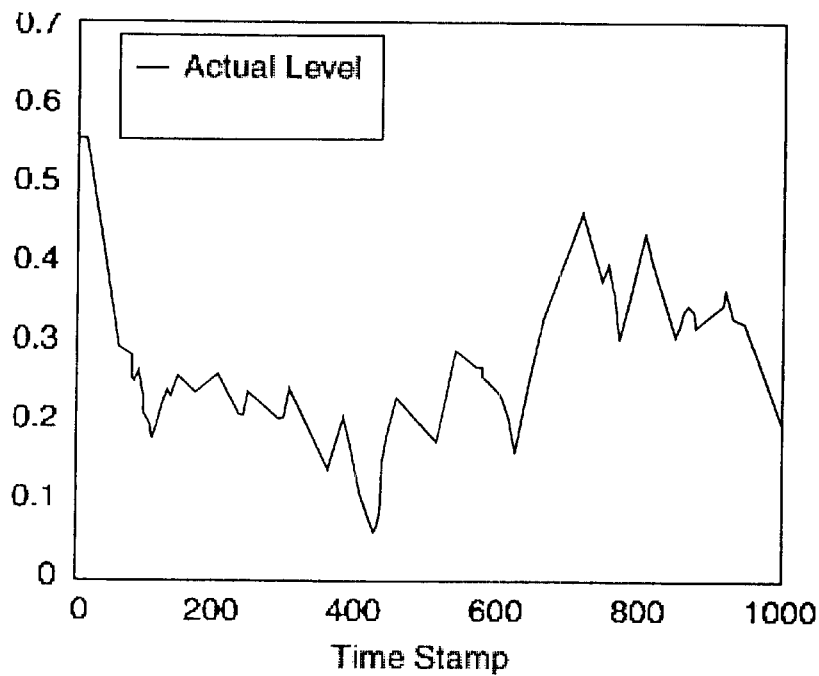
FIG. 30 is a plot of IRNN performance system for level prediction.

The input to the IRNN consists of the updated means at the previous time steps of nodes $q_i$ and h as represented by the dashed lines from the corresponding BBN nodes to the IRNN input nodes. The value of the output node of the IRNN supplies an estimate of the liquid level at the next time step. This estimate is used to instantiate the model node $\hat{h}$ for the subsequent time step. Gaussian nonlinearities and batch learning modes are used. Because input of the IRNN (i.e., BBN estimates of $q_i$ and h) is dependent on its previous output (i.e., $\hat{h}$), training data for such an inter-linked system is not available. Hence the IRNN is trained according to the method established supra, i.e., by using sensor readings for $q_i$ and h at the current time step as the input and the sensor reading for h at the next time step as the desired output. The IRNN succeeds in modeling the system; however, it does not succeed in reducing the noise below the point of sensor error due to reduced redundancy. FIG. 30 shows the performance of the IRNN in predicting the sensor readings.

Figure 31:
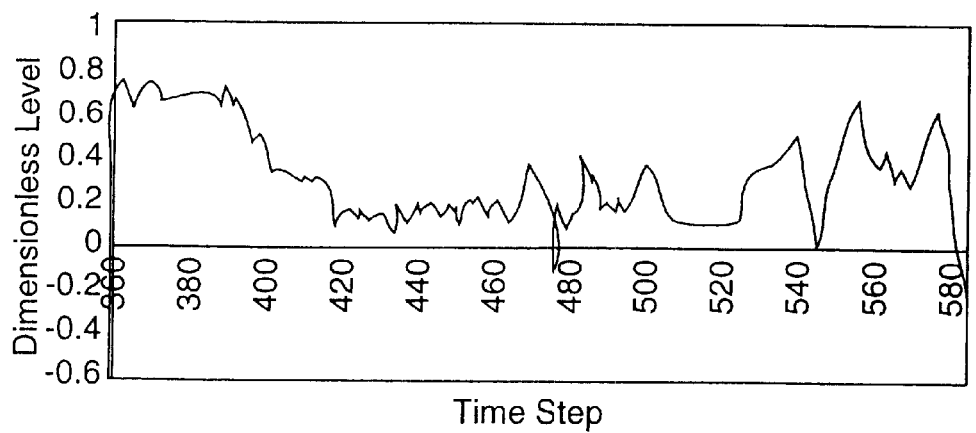
FIG. 31 is a plot of fault accommodation performance of the IRNN-based dynamic BBN of the diagram of FIG. 29.

As shown in FIG. 31, sensor faults are seen by comparing the sensor readings with the actual value of the level. Irrespective of the sensor faults, the BBN estimate of the level, i.e., the updated mean of the node h, remains dose to the actual value. Thus, the IRNN-augmented BBN removes the dependency on the availability of a model without degradation in performance.

NN-Based Function Approximation for Unearization-Based BBN

The dynamic BBN-based on the linearization scheme depends on availability of the partial differentials $$\frac{\partial f}{\partial h}$$

and $$\frac{\partial f}{\partial q_i}$$

as analytical expressions for the definition of the conditional probability distribution of the node $h^{new}$ (Table 11). To eliminate this dependence on the availability of a model, the function approximation capabilities of a neural network can be used to estimate the value of the function $f$ given estimates of h and $q_i$. The neural network thus takes two inputs, $h_{old}^{BBN}$ and $q_{old}^{BBN}$, which are means of the nodes $h^{old}$ and $q_i^{old}$, respectively. Its output $\hat{f}_{NN}$, is an estimate of the value of $f(h(k-1), q_i(k-1))$, which can be used to numerically approximate the partial derivatives as $$\left(\left(\frac{\partial f}{\partial h}(k-1) \cong \frac{\Delta \hat{f}}{\Delta h_{old}^{BBN}}\right)\right)_{q_i=constant} = \frac{\hat{f}_{NN}(h^{BBN}, q_{i,old}^{BBN}) - \hat{f}_{NN}(h_{old}^{BBN}, q_{i,old}^{BBN})}{h^{BBN} - h_{old}^{BBN}} \tag{48}$$

$$\left(\left(\frac{\partial f}{\partial q_i}(k-1) \cong \frac{\Delta \hat{f}}{\Delta q_i^{BBN}}\right)\right)_{h=constant} = \frac{\hat{f}_{NN}(h_{old}^{BBN}, q_i^{BBN}) - \hat{f}_{NN}(h_{old}^{BBN}, q_{i,old}^{BBN})}{q_i^{BBN} - q_{i,old}^{BBN}}. \tag{49}$$

These values are then used to define the conditional probability distribution instead of the analytical $$\frac{\partial f}{\partial h}$$

and $$\frac{\partial f}{\partial q_i}$$

(Table 12). Thus, the neural network provides a way to circumvent the necessity of the assumption of an analytical process model.

Table 12: ANN-based representation of conditional probability distribution of the node $h^{new}$. The elements of column vector β correspond to the continuous-valued parent nodes $h^{old}$, $q_i^{old}$, and $q_i$, and are obtained from Equations 48 and 49. Because the calculations of the elements of β are based on a function approximating neural network instead of the analytical model, the BBN based on this conditional probability distribution (FIG. 28) is independent of a process model.

TABLE 12

| α | 0 |
|---|---|
| γ | 0 |
| β | $\begin{bmatrix} -1 + \frac{\Delta \hat{f}}{\Delta h_{old}^{BBN}} \\ -\frac{\Delta \hat{f}}{\Delta q_{i,old}^{BBN}} \\ 2 - \frac{\Delta \hat{f}}{\Delta h_{old}^{BBN}} \\ \frac{\Delta \hat{f}}{\Delta q_{i,old}^{BBN}} \end{bmatrix}$ |

Figure 32:
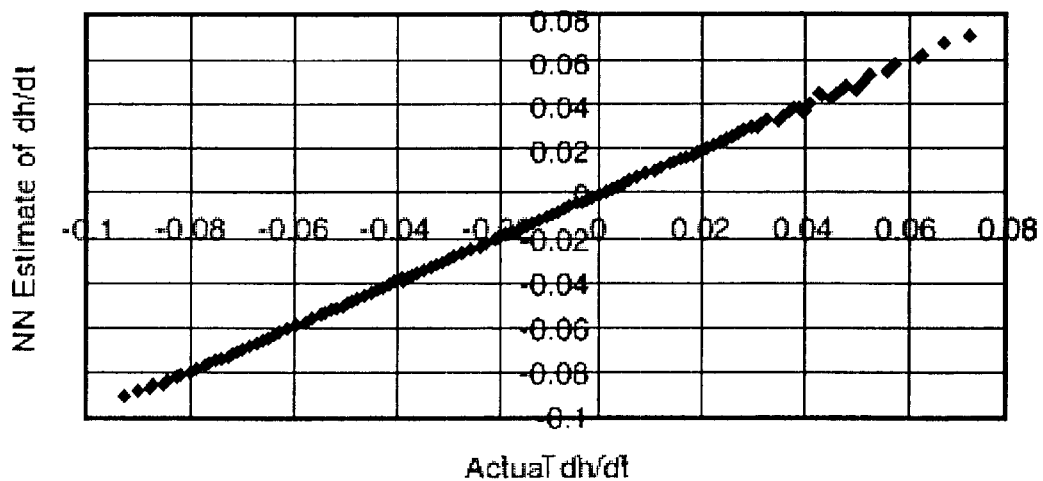
FIG. 32 is a plot of performance of a function approximating neural network, see also Table 12.

A standard feedforward neural network with one hidden layer is used with sigmoid nonlinearity function. The neural network is capable of approximating the function that can be seen from FIG. 32, which shows a plot of actual versus estimated $$f\left(i.e., \frac{dh}{dt}\right).$$

Because the points lie close to a line with slope 1, a low estimation error is implied.

Figure 33:
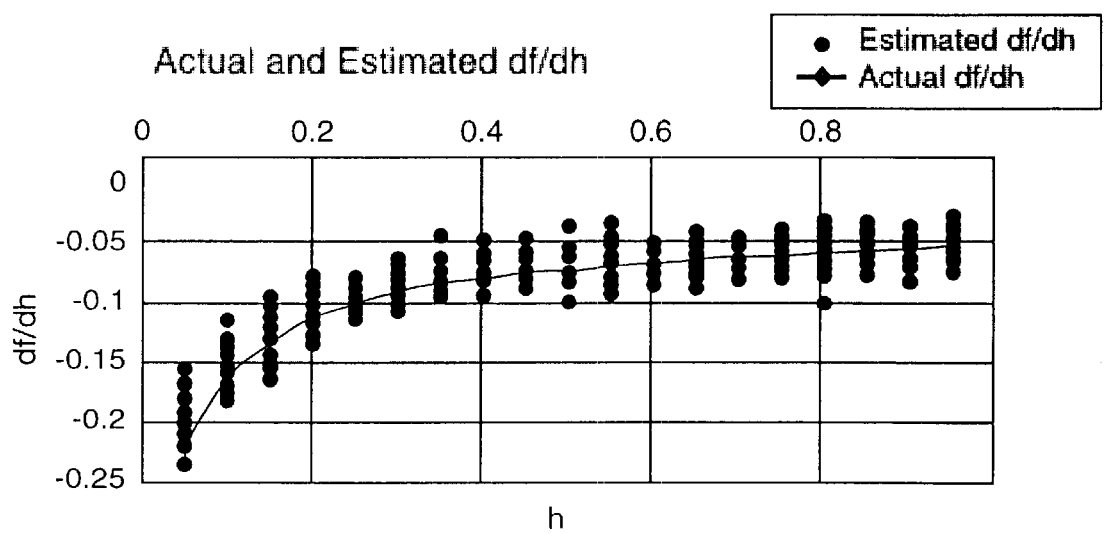
FIG. 33 is a plot of accuracy of an ANN-estimated partial derivative of f with respect to h, see also Table 12.
Figure 34:
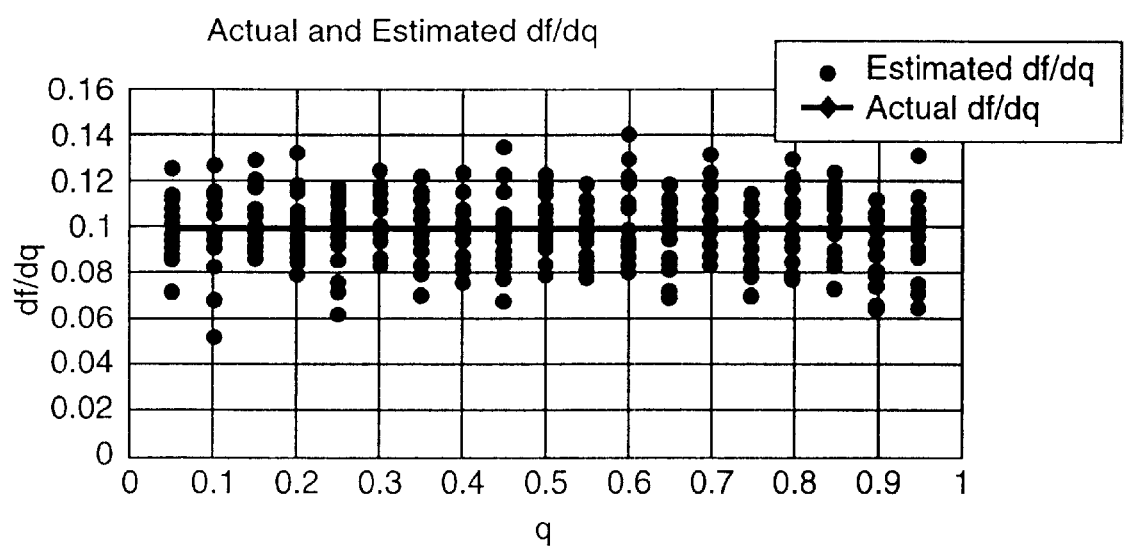
FIG. 34 is a plot of accuracy of an ANN-estimated partial derivative of f with respect to q, see also Table 12.

The accuracy of these approximations is evaluated from FIG. 33 and FIG. 34. FIG. 33 shows the results of an experiment where actual values of $$\frac{\partial f}{\partial h} = \frac{-\xi}{2\sqrt{h}}$$

are plotted with the estimated values. For each value of h, different values of $q_i$ were used. This leads to a distribution of estimates for each actual value. Estimates were found to be within a certain error range with respect to the actual value. Similarly, in FIG. 34, the actual values of $$\frac{\partial f}{\partial q_i} = \Psi$$

are plotted with the estimated values (Equation 49).

At each time step, these estimates are then used by the BBN to define the conditional probability distribution for the node $h^{new}$. Evidence propagation and dynamic updating of nodes is carried out similar to the method supra. Results show that the error in the estimates for the conditional probability values enhances the error due to linearization, and as a result the BBN is unable to reliably carry out SFDIA. Training of the neural network in a noise-free environment may improve its performance but such a solution is not feasible in a real-life situation.

Apparatus of the Present Invention

Figure 35:
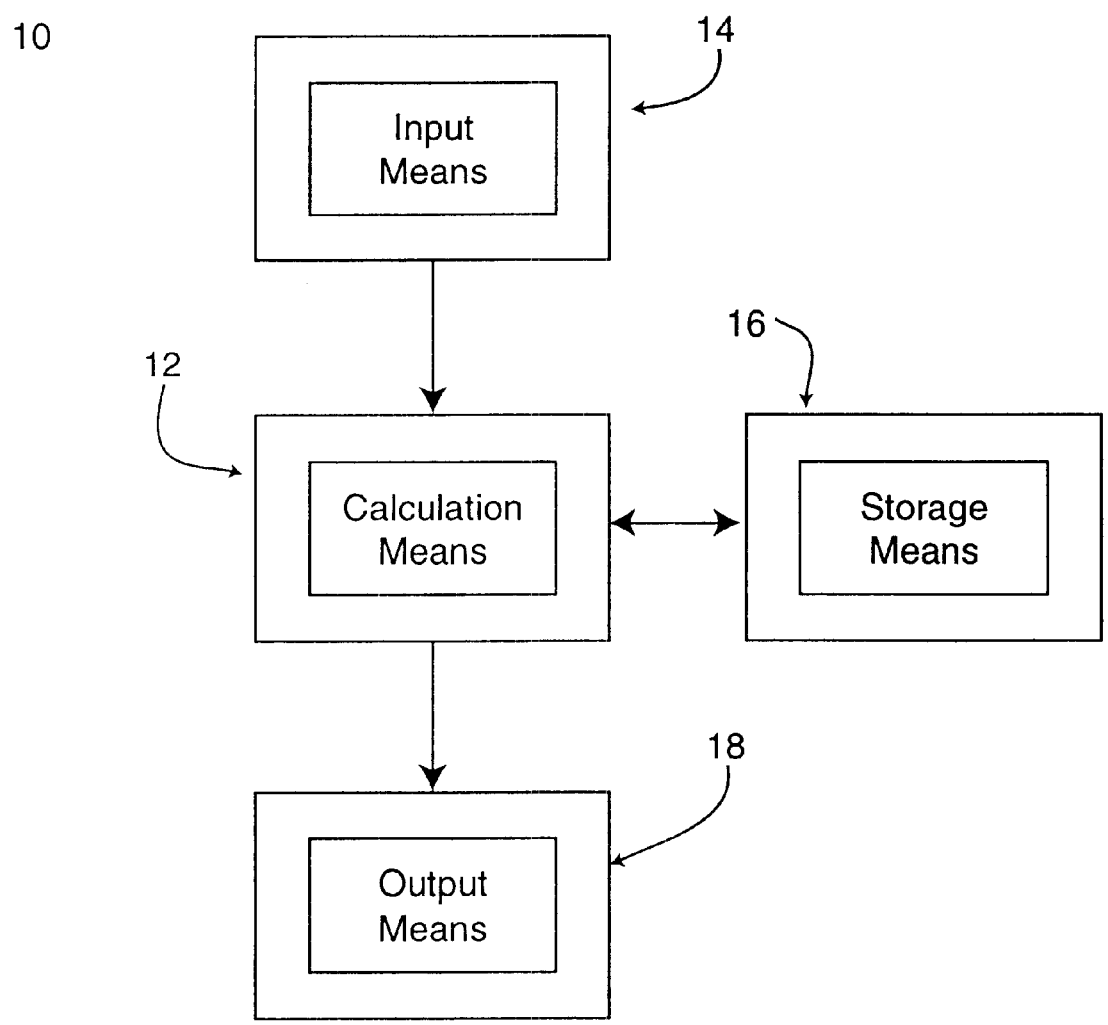
FIG. 35 is a diagram of an apparatus of the present invention.

A diagram of an apparatus of the present invention 10 appears in FIG. 35. The apparatus, as represented by the diagram, comprises calculation means 12, input means 14, storage means 16, and output means 18. Calculation means 12 comprises means for processing data, such as, for example, calculating probabilities of a Bayesian belief network wherein the network comprises at least one sensor-status node, at least one process-variable node, and at least one sensor-reading node. Digital and/or analog computers are suitable for providing for a calculation means for processing data. Input means 14 comprises means for inputting information to the calculation means 12. Input means 14 are achieved, for example, through connections for transmission of digital and/or analog information. Information input to the apparatus 10 includes information or data related to, but not limited to, processes, sensors, feedback, measurements, and the like. Such information can comprise data from an external observer and/or information from a reading from at least one member selected from the group consisting of temperature sensors, concentration sensors, pH sensors, level sensors, flowrate sensors, and volume sensors. Storage means 16 comprise at least one manner for storing information, such as, but not limited to, digital and/or analog devices commonly used in the digital and/or analog computer industry. For example, RAM, floppy drives, hard drives, optical drives, and the like and their associated storage medium are suitable for use with the apparatus of the present invention. Output means 18 comprise at least one means for transmitting information to, for example, an operator, a display device, a printer, a radio transmitter, and the like. In some instances, such information is used to change at least one process parameter or setting, thereby achieving feedback to a process.

Calculation means 12 also comprise solution means for solving at least one process model; estimating means for estimating at least one value of at least one process variable; updating means for updating at least one known probability table; monitoring means for monitoring of at least one updated probability table for assessing at least one member selected from the group consisting of sensor fault detection, sensor fault classification, process fault detection, and process fault classification; and, in general, process modeling. According to preferred embodiments of the present invention, process modeling comprises at least one member selected from the group consisting of continuous-value model, discrete-value model, linearized model, neural network model, fuzzy logic model, steady-state model, unsteady-state model, static model, and dynamic model.

Comparison of Embodiments of the Present Invention

The performance of a total of five BBN schemes for unsteady-state SFDIA are presented herein. The discrete scheme does not assume a model and constructs its probability tables solely based on data. It does not restrict its data to be normally distributed and can deal with those that are inaccurate. It can also detect, isolate, and accommodate faults present in the sensors measuring the input disturbances. Bin size is an important attribute that is determined via trial and error, or through previous experimentation. Smaller bin sizes improve precision but increase the number of bins and hence the size of the conditional probability tables. This scheme does not enforce any linearization on the functional relationships between variables. The scheme based on an external observer does not require linearization of the process model. It can analytically represent sensor error and the dependence of a sensor reading on its status and process variable. The scheme based on linearization retains the functionality of the discrete scheme, does not involve any external observer, can handle analytical representations, and can accommodate faults in the input variable sensors. Linearization process assumes a process model.

Using neural networks in conjunction with continuous-valued BBNs removes the requirement of a known process model, such as the system of differential equations that represent a CSTR. Due to the different needs of the two aforementioned continuous-valued BBN schemes, two different kinds of neural networks are connected. For example, the observer-based scheme is augmented with a predictive internally recurrent neural network (IRNN). It is trainable, for instance, with Gaussian nonlineafties in a batch mode. The linearization-based scheme is useable with a function approximating two-layer feedforward neural network. Such a network uses the logistic sigmoid function as the nonlinearity and is trained in a pattern mode. Both of these networks achieve the objective of removing the necessity of a known process model. The IRNN could sustain the performance of the BBN up to the level achieved with an assumed model.

Since these schemes make different assumptions and hence have their disadvantages, a parallel existence of two or more schemes benefit each other. Sharing of sensor-status nodes can also represent a combined inference.

Examples presented herein of the present invention demonstrate that Bayesian belief networks provide a unified platform for qualitative as well as analytical representations. BBNs are based on a mathematically sound inference scheme and allow heuristic rules and system-specific knowledge to be incorporated in their structure, which facilitates the capture of both hardware redundancy and functional or analytical redundancy. Through methods and corresponding apparatuses implementing such methods, the goals of sensor fault detection, faulty sensor isolation, fault classification, multi-sensor fusion, and fault accommodation are achieved via a single inference scheme. A variety of preferred embodiments of the present invention alleviate the need to construct separate modules to achieve each of the aforementioned functions.

Because sensor readings and values of process variables are real numbers, a discrete representation of these quantities involves a loss in precision. Furthermore, the relationships between sensor readings and values of process variables as well as the relationships among the process variables have to be discretized. This is an approximation of the true relationships. Therefore, continuous-valued representation embodiments of the present invention are at an advantage over discrete representation embodiments in some applications that may require high precision. The present invention also accommodates multiple fault types, for example, introduced as states of sensor status nodes, which facilitate fault classification. Retrieval of information and dissemination of experience is also carried out, for example, by retaining the posterior probabilities of the sensor status nodes as known probabilities for a subsequent inference cycle. Changes in process conditions induced due to malfunctions in hardware or process equipment may affect relationships between process variables and, at times, detection of these faults is necessary for optimum performance and safe operation. Also, a process model may be invalidated due to such changes. Hence, for reliable SFDIA, process fault detection is important.

BBNs allow a simple representation of the events that cause the process faults as virtual parents. BBNs define dependence among process-variable nodes. For representation of multiple equipment, Bayesian networks are, for example, developed separately for each piece of equipment, which can then be connected to each other to represent an entire flowsheet, as demonstrated supra.

Steady-state is a special case of unsteady state, usually requiring dynamic modeling. Dynamic modeling is particularly important for processes with slow transient behavior. Hence, a BBN model for SFDIA during the unsteady state of a process is desirable. The ability to detect faults in all process variables, without the need for complete hardware redundancy and to flexibly represent the relationships between sensor readings and process variables, is beneficial. In addition, approximations in Bayesian representation of dynamic behavior of the process are avoided. BBN schemes that learn or construct the conditional probability tables solely based on data are at an advantage over schemes that require the specification of a process model. Based on these considerations, one discrete and two continuous-valued dynamic BBN schemes were disclosed supra. Both the continuous-valued schemes were based on a process model. Attempts to broaden their scope included utilization of internally recurrent neural networks and feedforward neural networks along with the BBNs and associated results were demonstrated.

The present invention, as used for SFDIA, is designed to comprise a blend of BBN and neural network approaches. This development has the following characteristics:

1. does not assume a model and learns the process dynamics via the IRNNs;
2. detects introduction and removal of sensor faults of the types precision degradation and bias;
3. isolates faulty sensor and accommodates fault taking advantage of the hierarchical nature of the scheme; and
4. provides reduction in sensor noise during both normal and faulty operation of sensor.

As demonstrated, a BBN-based SFDIA system of the present invention:

1. handles uncertain, imprecise, or incomplete input data and imprecise process models;
2. incorporates system-specific, qualitative knowledge such as sensor reliability as well as quantitative relationships such as a process model;
3. propagates evidence and carries out steady or unsteady-state sensor validation related inference in a mathematically sound manner;
4. maintains transparency, intuitive structure, and explainable inference without forgoing the mathematical basis;
5. represents hardware and analytical redundancies on a unified platform without exponential rise in network size;
6. provides functions of sensor fault detection, isolation, classification, accommodation, flowsheet modeling, process fault detection, and control in one, unified inference scheme, which obviates the need for developing separate modules for each function; and
7. incorporates addition, replacement, and removal of sensors. This affects only the concerned sensor-reading and connected nodes, and not the structure or function of the rest of the network.

One of the main bases for the above-stated benefits for a BBN method of the present invention is that they allow any node to be instantiated and infer, probabilistically, the states of the rest of the nodes: BBNs function if a subset of the measurement vector is available. Imprecise sensor readings are entered as a likelihood type of finding, which allows uncertain instantiations.

A link between two continuous-valued nodes represents an analytical relationship, whereas a link involving a discrete node represents a qualitative dependence. Thus, a BBN of the present invention is a natural medium to represent systems involving a combination of analytical and qualitative knowledge.

BBNs allow the definition of the problem in a "forward" manner, and use of the inference scheme to solve the "inverse" problem, which may be more difficult to define. For example, consider the five-sensor example, presented supra. Definition of the probability distribution of individual sensors conditional on the value of the process variable and the distribution of the sensor error is intuitive. Thus, problem definition progresses from root nodes to children nodes. However, children nodes (sensor-readings) are the ones that provide the evidence to the network, which calculate updated distributions of parent nodes (sensor-status and the process-variable). This requires a more explicit and less intuitive procedure that covers the possible combinations of the values of all sensor readings and conclusions that can be drawn from each case.

Next, there are no "hidden" nodes in a BBN. Nodes in a BBN are, in essence, events with associated probabilities. In a BBN for SFDIA, nodes represent values of sensor readings, process variables, sensor status, or events regarding process faults. Thus, all nodes have physical meanings and inference about each node is explainable in terms for the states of all other nodes. This leads to the transparency of the BBN. For a flowsheet comprising multiple components such as heat exchangers, pumps, distillation columns, reactors, and similar equipment, BBN models are developed for each of these prototypes which are then connected as they appear in the flowsheet. The ease of providing a single platform for a wide range of tasks involved in SFDIA, process fault detection, and control is mainly due to the emphasis of the BBN on declarative semantics as opposed to procedural Procedural methods have the bulk of the knowledge represented as procedures for using the method. Major advantages of declarative representation in the context of SFDIA include: Minimized need for fact storage (usually facts are only stored once, regardless of the number of ways used, hence, a BBN can make use of a node to simultaneously achieve different functions related to SFDIA); Ease of adding new facts to the system, without changing the other facts or the general procedures (thus, new sensors can be added or old ones can be removed or replaced without affecting the structure or function of the rest of the network); and removal, addition, or replacement of any component does not require any substantial reconstruction and retraining.

The present invention presents a feasible and valid Bayesian probabilistic representation and solution of sensor and/or process fault detection problems. The study of results obtained by using the methods of neural networks as a combination provided the necessary means of better understanding of the multiple aspects of the problem. The BBN-based approach, as demonstrated, achieves a broader goal via a single skeleton inference scheme and, for some application, such approaches are enhancable through use of neural networks.

The BBN-based SFDIA system of the present invention integrates sensor and process fault detection with process control. Detection and accommodation of unforeseen faults or faults developing overtime are objects also within the scope of the present invention. Extreme process conditions may be the cause of a sensor failure. On the other hand, sensor faults can lead to process malfunctions due to wrong control actions. Modeling of such system-specific, interdependent faults is also possible along the lines of Bayesian analyses presented herein.

Some industrial or laboratory applications require a clear-cut distinction between different modes of sensor operation, such as normal, bias, precision degradation, and complete failure. Use of these distinctions is within the scope of the present invention. In addition, the present invention can encompass use of fuzy logic to represent overlapping sensor behavior. Some modes transit into each other over time, which are represented by introducing virtual parents for the sensor-status nodes.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for diagnosis of sensors comprising:
   a) providing at least one sensor-status node wherein each sensor-status node comprises a known probability table;
   b) providing at least one process-variable node wherein each process-variable node comprises a known probability table;
   c) providing at least one sensor-reading node wherein each sensor-reading node comprises a probability table conditional on at least two known probability tables;
   d) providing the at least one sensor-reading node with at least one sensor reading;
   e) inferring a status of at least one sensor.

2. The method of claim 1 wherein steps a) through e) comprise at least one Bayesian belief network.

3. The method of claim 1 further comprising estimating at least one value of at least one process variable.

4. The method of claim 1 further comprising updating at least one known probability table after providing the at least one sensor-reading node with at least one sensor reading.

5. The method of claim 4 further comprising monitoring of the at least one updated probability table for assessing at least one member selected from the group consisting of sensor fault detection, sensor fault classification, process fault detection, and process fault classification.

6. The method of claim 1 wherein inferring further comprises process modeling.

7. The method of claim 6 wherein process modeling comprises at least one member selected from the group consisting of continuous-value model, discrete-value model, linearized model, neural network model, fuzzy logic model, steady-state model, unsteady-state model, static model, and dynamic model.

8. The method of claim 1 further comprising inputting data from an external observer.

9. The method of claim 1 wherein providing at least one sensor reading comprises providing a reading from at least one member selected from the group consisting of temperature sensors, concentration sensors, pH sensors, level sensors, flowrate sensors, and volume sensors.

10. A sensor diagnostic apparatus comprising:
    calculation means for calculating probabilities of a Bayesian belief network wherein said network comprises at least one sensor-status node, at least one process-variable node, and at least one sensor-reading node;
    input means for inputting information to said calculation means;
    storage means for storing information; and
    output means for outputting information from said calculation means.

11. The apparatus of claim 10 wherein said calculation means further comprises solution means for solving at least one process model.

12. The apparatus of claim 10 wherein said calculating means further comprises estimating means for estimating at least one value of at least one process variable.

13. The apparatus of claim 10 wherein said calculating means further comprises updating means for updating at least one known probability table.

14. The apparatus of claim 10 wherein said calculating means further comprises monitoring means for monitoring of at least one updated probability table for assessing at least one member selected from the group consisting of sensor fault detection, sensor fault classification, process fault detection, and process fault classification.

15. The apparatus of claim 10 wherein said calculating means further comprises process modeling.

16. The apparatus of claim 15 wherein said process modeling comprises at least one member selected from the group consisting of continuous-value model, discrete-value model, linearized model, neural network model, fuzzy logic model, steady-state model, unsteady-state model, static model, and dynamic model.

17. The apparatus of claim 10 wherein said information comprises data from an external observer.

18. The apparatus of claim 10 wherein said information comprises information from a reading from at least one member selected from the group consisting of temperature sensors, concentration sensors, pH sensors, level sensors, flowrate sensors, and volume sensors.

* * * * *